United States Patent
Miwa et al.

(10) Patent No.: US 6,204,774 B1
(45) Date of Patent: Mar. 20, 2001

(54) METHOD AND SYSTEM OF TRANSMITTING/RECEIVING SERVICE INFORMATION AND RECEIVING APPARATUS

(75) Inventors: Kenji Miwa; Kosei Kawamoto; Yasumasa Matsumoto; Kousou Hayashi, all of Higashihiroshima; Kazuhiro Kishimoto, Hiroshima; Katsuhiro Tochihara, Higashihiroshima, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/034,028

(22) Filed: Mar. 2, 1998

(30) Foreign Application Priority Data

| Mar. 7, 1997 | (JP) | 9-053658 |
| Mar. 7, 1997 | (JP) | 9-053664 |
| Mar. 7, 1997 | (JP) | 9-053668 |

(51) Int. Cl.⁷ .................................................. G07D 7/00
(52) U.S. Cl. ............................ 340/825.31; 340/825.34; 714/746; 714/25; 380/23; 380/25; 379/93.02
(58) Field of Search ................ 340/825.31, 825.34; 714/746, 25; 348/5.5; 705/16; 380/23, 25; 379/93.02

(56) References Cited

U.S. PATENT DOCUMENTS

| 5,051,899 | * | 9/1991 | Ikoma et al. ................ 714/25 |
| 5,668,876 | * | 9/1997 | Falk et al. .................. 380/25 |
| 5,758,326 | * | 5/1998 | Ishikawa .................... 705/16 |

FOREIGN PATENT DOCUMENTS

| 8-149027 | 6/1996 | (JP). |
| 8-186549 | 7/1996 | (JP). |
| 8-256071 | 10/1996 | (JP). |

* cited by examiner

*Primary Examiner*—Brian Zimmerman
*Assistant Examiner*—Yves Dalencourt

(57) ABSTRACT

A system provides service information through a restricted broadcasting using an FM teletext multiplex broadcasting. When providing a reception authorization code that enables each receiver terminal to receive the service information, terminal unique information such as a production number is stored in a user file at the provider's end, such as an FM broadcast station. Further, a processing circuit encodes reception authorization information showing an expiration date of a reception authorization period or contract contents after appending an error detection sign using the terminal unique information, which is notified to the user via mail of the like. Upon input of the notified reception authorization code through an input device, a processing circuit at the receiver terminal's end decodes the reception authorization code using the terminal unique information stored in its memory and corrects an error. Then the processing circuit makes the restricted broadcasting available only when the decoded reception authorization information shows reception authorization and no error is detected therein, so that the decoded teletext information is displayed on a display service.

34 Claims, 30 Drawing Sheets

LAYER 7  
(APPLICATION)　　　NEWS, WEATHER FORECAST, TRAFFIC INFORMATION

LAYER 6  
(PRESENTATION)　　8-UNIT SIGN SYSTEM, TRANSPARENT SYSTEM

LAYER 5  
(PROGRAM)　　　　DECODE PROGRAM DATA FROM DATA GROUP

LAYER 4  
(DATA GROUP)

LAYER 3  
(DATA PACKET)　　| PREFIX | DATA BLOCK |

LAYER 2  
(ERROR CORRECTION)　ERROR CORRECTION, ERROR DETECTION

LAYER 1  
(TRANSMISSION PATH)　MULTIPLEX SIGNAL (16kbit/s)

FIG. 8

| TERMINAL UNIQUE INFORMATION | | |
|---|---|---|
| COMPANY CODE | MACHINE CODE | PRODUCT INFORMATION OF RECEIVER TERMINAL |

FIG. 9

| MANUFACTURER'S NAME | COMPANY CODE |
|---|---|
| COMPANY A | 0 |
| COMPANY B | 1 |
| COMPANY C | 2 |
| ⋮ | ⋮ |

FIG. 10

| MANUFACTURER'S NAME | COMPANY CODE |
|---|---|
| COMPANY A | a |
| COMPANY B | b |
| COMPANY C | c |
| ⋮ | ⋮ |

FIG. 11

| MACHINE MODEL | MACHINE CODE |
|---|---|
| A A A | 0 |
| B B B | 1 |
| C C C | 2 |
| ⋮ | ⋮ |

FIG. 12

| MACHINE MODEL | MACHINE CODE |
|---|---|
| A A A | a |
| B B B | b |
| C C C | c |
| ⋮ | ⋮ |

FIG. 13

| PRODUCT INFORMATION OF RECEIVER TERMINAL (PRODUCTION No., etc.) | | | | | | |
|---|---|---|---|---|---|---|
| PRODUCTION PLACE | | PRODUCTION LOT | | PRODUCTION SERIAL No. | OTHERS (VERSION INFORMATION, etc.) | |
| PRODUCTION PLACE | CODE | PRODUCTION DATE | CODE | | VERSION | CODE |
| PLANT A | a | JANUARY, 1997 | 7 1 | 0 0 1 ~ | V 1 | 0 0 |
| PLANT B | b | FEBRUARY, 1997 | 7 2 | 0 0 1 ~ | V 1 | 0 0 |
| PLANT C | c | MARCH, 1997 | 7 3 | 0 0 1 ~ | V 2 | 0 1 |
| ⋮ | ⋮ | ⋮ | ⋮ | ⋮ | ⋮ | ⋮ |
|  |  | OCTOBER, 1997 | 7 X |  |  |  |
|  |  | NOVEMBER, 1997 | 7 Y |  |  |  |
|  |  | DECEMBER, 1997 | 7 Z |  |  |  |

FIG. 14

| PRODUCT INFORMATION OF RECEIVER TERMINAL | | |
|---|---|---|
| PRODUCTION LOT | | PRODUCTION SERIAL No. |
| PRODUCTION DATE | CODE | |
| JANUARY, 1997 | 7 1 | 0 0 1 ~ |
| FEBRUARY, 1997 | 7 2 | 0 0 1 ~ |
| MARCH, 1997 | 7 3 | 0 0 1 ~ |
| ⋮ | ⋮ | |
| OCTOBER, 1997 | 7 X | ⋮ |
| NOVEMBER, 1997 | 7 Y | |
| DECEMBER, 1997 | 7 Z | |

| RECEPTION CHARGE | ADDITIONAL RECEPTION PERIOD | EXPIRY DATE OF RECEPTION AUTHORIZATION PERIOD |
|---|---|---|
| 0 | 0 | B0 |
| A*C1 | B | B0 + B |
| 2A*C2 | 2B | B0 + 2B |
| 3A*C3 | 3B | B0 + 3B |
| ⋮ | ⋮ | ⋮ |
| nA*Cn | nB | B0 + nB |

A: BASIC RECEPTION CHARGE
B: BASIC RECEPTION VALID PERIOD
B0: CURRENT RECEPTION AUTHORIZATION EXPIRY DATE
C: DISCOUNT RATIO FOR LONG-TERM RECEPTION CONTRACT
$(C_n \leq \cdots \leq C_3 \leq C_2 \leq C_1 = 1)$

FIG. 17

|      | b8 | b7 | b6 | b5 | b4 | b3 | b2 | b1 |
|------|----|----|----|----|----|----|----|----|
| PBa1 | UNDEFINED ||||| BLOCK No. |||
| PBa2 | BLOCK No. |||||| DATE ||
| PBa3 | DATE ||||||||
| PBa4 | DATE ||||||| HOUR |
| PBa5 | HOUR |||| MINUTE ||||
| PBa6 | MINUTE ||| LOCAL TIME OFFSET |||||

FIG. 18

|    | b8 | b7 | b6 | b5 | b4 | b3 | b2 | b1 |
|----|----|----|----|----|----|----|----|----|
| C1 | UNUSED ||| SECOND DATA |||||
| C2 | MINUTE DATA (SECOND DIGIT) |||| MINUTE DATA (FIRST DIGIT) ||||
| C3 | UNUSED |||| TIME DATA ||||
| C4 | UNUSED (OR DAY OF THE WEEK) |||| DATE ||||
| C5 | YEAR (FIRST DIGIT) |||| MONTH ||||
| C6 | YEAR (THIRD DIGIT) |||| YEAR (SECOND DIGIT) ||||

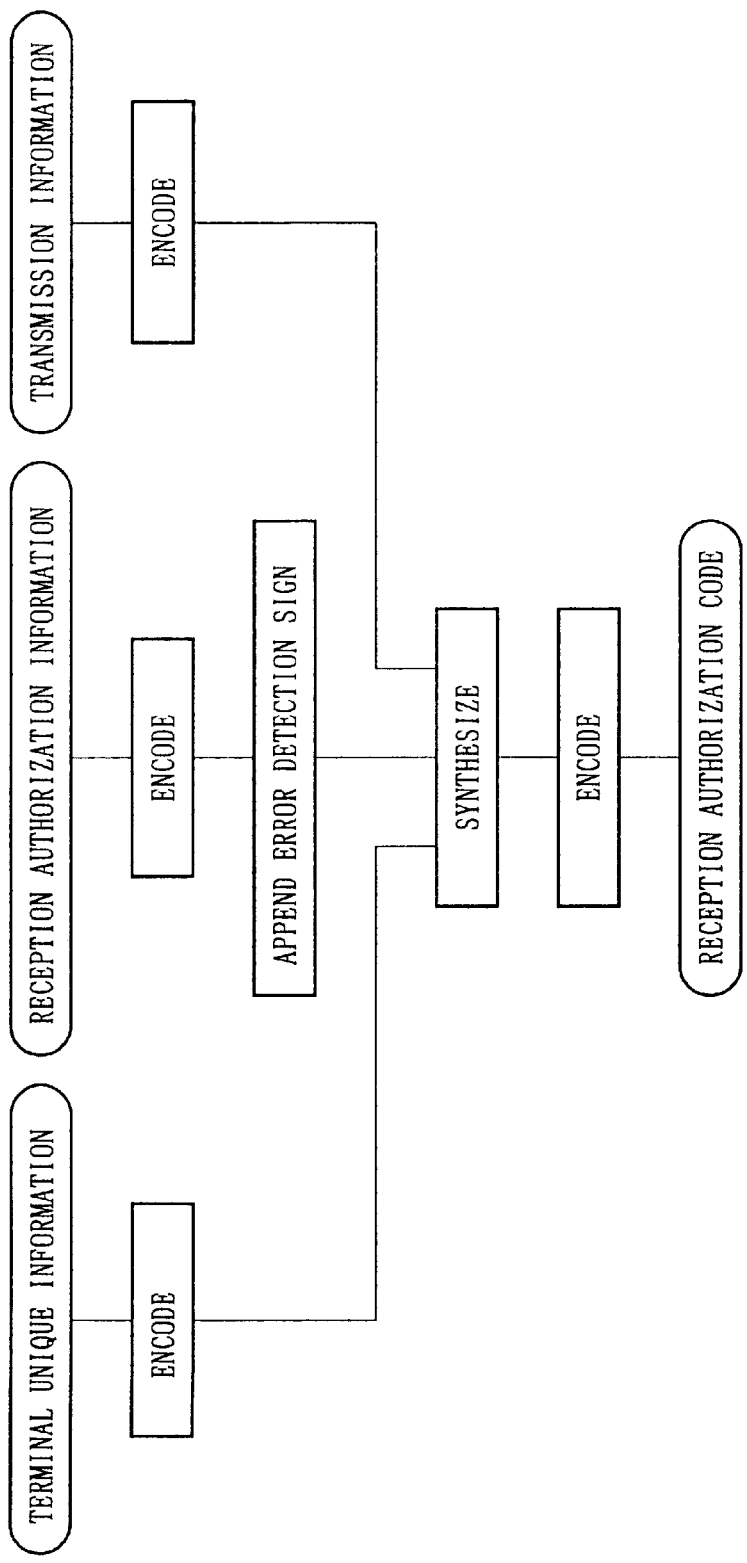
F I G. 32

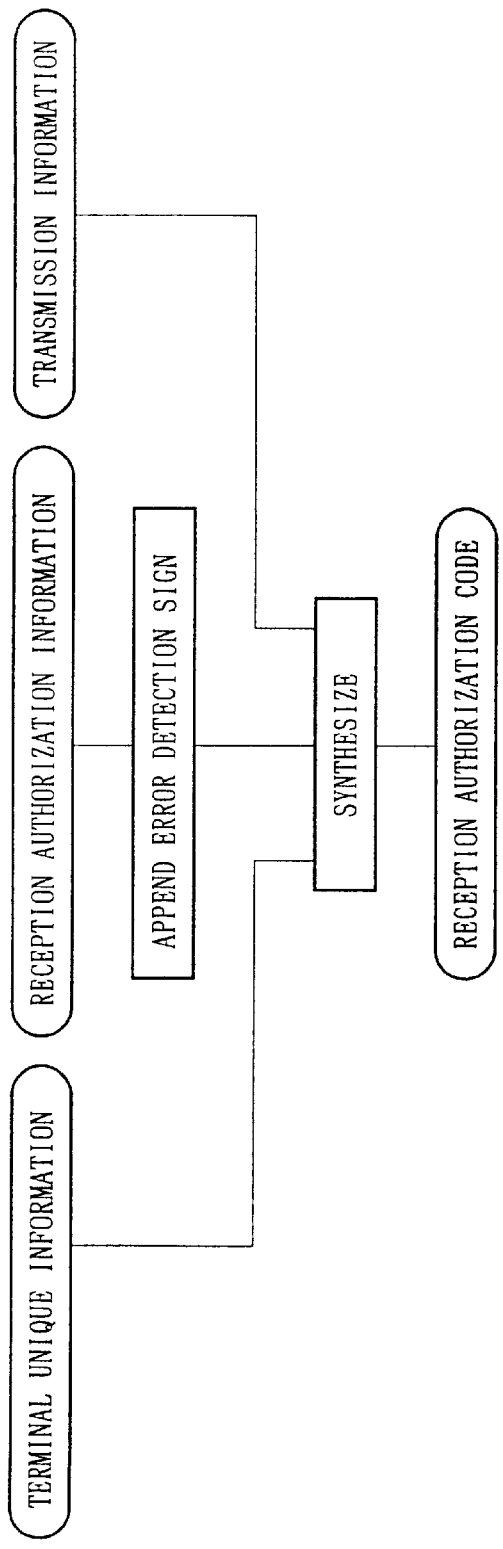
F I G. 34

FIG. 37

| RECEPTION AUTHORIZATION CODE ||
|---|---|
| UNIT RECEPTION AUTHORIZATION CODE 1 | UNIT RECEPTION AUTHORIZATION CODE 2 |

METHOD AND SYSTEM OF TRANSMITTING/RECEIVING SERVICE INFORMATION AND RECEIVING APPARATUS

FIELD OF THE INVENTION

The present invention relates to method and system of transmitting/receiving service information and a receiving apparatus which are suitably applied to a restricted broadcasting using an FM (Frequency Modulation) teletext multiplex broadcasting which provides service information using blank periods (intervals) among broadcasting waves, so that information is provided to particular users alone.

BACKGROUND OF THE INVENTION

A technique of transmitting the service information through the multiplex operation using blank periods among the broadcasting waves has been used extensively. Particularly, in recent years, a service to provide information related to a program being on the air or other kinds of information, such as news and weather forecast, has become popular and known as a so-called visible radio.

The FM teletext multiplex broadcasting roughly includes two kinds: one is a free broadcasting in which anyone can use information, such as news and weather forecast, once he has purchased an adaptable receiver terminal; and the other is a restricted broadcasting in which only those who have purchased special-purpose receiver terminals and paid the reception charge can use the information.

A service identification is appended to the service information provided through the FM teletext multiplex broadcasting. A general radio receiver used as the visible radio is arranged to decode only the service information appended with a free broadcasting service identification so as to display the text, and not to capture the rest of the service information appended with a restricted broadcasting service identification. In contrast, the receiver terminal for the restricted broadcasting is arranged to decode the service information appended with all the operable service identifications so as to display the text. The receiver terminal of this type may be arranged to also display the text of the service information provided through the free broadcasting.

In the restricted broadcasting, anyone who wishes to use the service information is requested to purchase the special-purpose receiver terminal and pay the reception charge, and it must be arranged in such a manner that only the user who has paid the reception charge and signed up the reception contract is authorized to use the service information.

In case of VICS (Vehicle Information Communication System) which has been already provided as a restricted broadcasting using the FM teletext multiplex broadcasting, the price of a vehicle navigation device includes the reception contract charge. Thus, once the user has purchased the vehicle navigation device, he can receive the information without any additional charge.

However, in this charging system, a reception authorization period depends on the usable period of the receiver terminal or the operating life of the product. Thus, the benefits depends on the usable period or the operating life of the product the user has purchased, and therefore, the users do not necessarily appreciate the benefits equally. In addition, if the receiver terminal is upgraded to have a longer operating life, the user replaces the receiver terminal less frequently, which causes a falloff of revenues from the reception charge. Further, this charging system is not applicable in case that each user does not receive the same service information, but different kinds of service information.

Thus, to enable only the users who have duly paid the reception charge periodically to receive the service information commensurate with the reception charge, it is necessary to periodically reset the contents of the receivable services and the reception authorization period for each user or each receiver terminal.

A typical conventional technique to meet such a demand is disclosed in, for example, Japanese Laid-open Patent Application Nos. 149027/1996 (Tokukaihei 8-149027) and 186549/1996 (Tokukaihei 8-186549). In Japanese Laid-open Patent Application No. 149027/1996, after the user paid the reception charge through the financial institutions, a provider of the restricted broadcasting, such as an FM broadcast station, transmits an individual ID code assigned to each user and a pay ID code used as encoding information to enable the user to receive the charged service information on the multiplex broadcasting waves. Each receiver terminal is arranged to detect the individual ID code that matches with its own ID code, capture the pay ID code following the individual ID code, and display the texts of the transmitted service information after confirming the same pay ID code is set in itself.

In the above Japanese Laid-open Patent Application No. 186549/1996 (Tokukaihei 8-186549), the user purchases a prepaid IC card, and the receiver terminal is arranged to display the texts of the service information in accordance with the reception control information, such as the validity and service contents, stored in the IC card inserted therein.

In the technique disclosed in above Japanese Laid-open Patent Application No. 149027/1996 (Tokukaihei 8-149027), a reception authorization code is transmitted from the broadcast station in the similar manner as the widely spread satellite broadcasting using broadcast satellites or communications satellites. For this reason, the receiver terminal must include a circuit to decode the reception authorization code. Thus, there is a problem in that the arrangement of the receiver terminal becomes complicated, thereby increasing the cost. Also, since the reception authorization code must be transmitted to each receiver terminal within a limited transmission capacity of the broadcasting waves, the technique may not be used if the number of the receiver terminals exceeds a certain level. In addition, an amount of information increases as program service is upgraded. But on the other hand, the service information is repeatedly transmitted to eliminate adverse effects, such as noise. Thus, there is a problem in that the number of the users or the kinds of services can not be increased under these conditions. This problem is especially obvious in the FM teletext multiplex broadcasting having a very small transmission capacity (16 kbps) compared with the satellite broadcasting. Further, the user can not receive the service information unless he receives the reception authorization code. Thus, before the actual reception of the service information starts, the user has to keep the receiver terminal turned ON for a predetermined time during a contract update unit period, for example, a month, so that the receiver terminal is in a reception state when its own individual ID code and pay ID code are transmitted.

In the case of the arrangement of above Japanese Laid-open Patent Application No. 186549/1996 (Tokukaihei 8-186549) using the prepaid IC card or the like, the receiver terminal must include interface mechanism for reading/writing the information from/in the prepaid card or the like. Thus, there is a problem in that the arrangement becomes complicated, and not only the cost but also the power consumption increases. Although the prepaid cards or the like are readily available as they are sold at convenience stores, electrical appliance stores, etc., the reception charge increases because the producing costs of the cards and the sales charge are added thereto. Also, the medium compatible with many types of receiver terminals, such as the prepaid card, may be forged or altered no matter how well the security system is improved except for the medium employing an exceptional arrangement such that automatically destroys the memory content when the validity expires as disclosed in Japanese Laid-open Patent Application No. 256071/1996 (Tokukaihei 8-256071).

SUMMARY OF THE INVENTION

It is therefore an object of the present invention to provide method and system of transmitting/receiving service information and a receiving apparatus which can set reception authorization information precisely in each receiver terminal in accordance with their respective service contents without decreasing a transmission capacity of the service information nor increasing the cost of the receiver terminal.

To fulfil the above object, a method of transmitting/receiving service information of the present invention is a method of transmitting/receiving the service information suitably applied to a restricted broadcasting using an FM teletext multiplex broadcasting, wherein, at the provider's end, such as a broadcast station, reception authorization information indicating the expiration date of a reception authorization period and available service contents is generated in accordance with the payment condition of the reception charge and the contract contents of each user, and after an error detection sign is appended to the reception authorization information thus generated, a reception authorization code is generated by synthesizing the above reception authorization information and terminal unique information unique to each receiver terminal, and notified to the user via mail or through the personal computer communications, whereas at the receiver terminal's end, such as a listener, upon input of the reception authorization code from the user through input means, such as station selection buttons, the reception authorization code is decoded to the reception authorization information using the pre-stored terminal unique information and the error detection is carried out using the error detection sign, and when the decoded reception authorization information shows the reception authorization and no error is detected, the receiver terminal is enabled to receive the service information with the service identification corresponding to the reception authorization information.

Thus, since the reception authorization code is not transmitted on the broadcasting waves, a transmission capacity of the service information is not reduced. Also, since a microcomputer or the like, which decodes the received service information and converts the same to character data or the like, is used to decode the reception authorization code to the reception authorization information, and the station selection buttons or the like are used to input the reception authorization code, the cost increase of the receiver terminal can be curbed. Further, if the user inputs the reception authorization code erroneously or tries to use the same fraudulently, the reception of the service information is not authorized, thereby ensuring high security.

A system of transmitting/receiving service information of the present invention is a system of transmitting/receiving the service information suitably used as a transmitting/receiving system suitably applied to a restricted broadcasting using an FM teletext multiplex broadcasting, wherein, at the provider's end, such as a broadcast station, reception authorization information indicating the expiration date of a reception authorization period and available service contents is generated in accordance with the payment condition of the reception charge and the contract contents of each user, and after an error detection sign is appended to the reception authorization information thus generated, a reception authorization code is generated by synthesizing the above reception authorization information and terminal unique information unique to each receiver terminal and notified to the user via mail or through the personal computer communications, whereas at the receiver terminal's end, such as a listener, upon input of the reception authorization code from the user through the input means, such as station selection buttons, the reception authorization code is decoded to the reception authorization information using the pre-stored terminal unique information and the error detection is carried out using the error detection sign, and when the decoded reception authorization information shows the reception authorization and no error is detected, the receiver terminal is enabled to receive the service information with the service identification corresponding to the reception authorization information.

Thus, since the reception authorization code is not transmitted on the broadcasting waves, a transmission capacity of the service information is not reduced. Also, since a microcomputer or the like, which decodes the received service information and converts the same to character data or the like, is used to decode the reception authorization code to the reception authorization information, and the station selection buttons or the like are used to input the reception authorization code, the cost increase of the receiver terminal can be curbed. Further, if the user inputs the reception authorization code erroneously or tries to use the same fraudulently, the reception of the service information is not authorized, thereby ensuring high security.

In addition, a receiving apparatus of service information of the present invention is a receiving apparatus of the service information suitably used as a receiving apparatus suitably used for a restricted broadcasting using an FM teletext multiplex broadcasting, wherein, upon receipt of a reception authorization code given from the provider, such as a broadcast station, via mail or through personal computer communications, the user inputs the reception authorization code, and in response to the input, the reception authorization code is decoded to reception authorization information using terminal unique information pre-stored therein, after which the error detection is carried out using an error detection sign, and the receiving apparatus is enabled to receive the service information with the service identification corresponding to the reception authorization information when the decoded reception authorization information shows the reception authorization and no error is detected.

Thus, the reception authorization code is not transmitted with the service information, more specifically, in case of the FM teletext multiplex broadcasting, the reception authorization code is not transmitted on the broadcasting waves. Instead, it is sent to authorized users only via mail or through personal computer communications. Consequently, a transmission capacity of the service information is not reduced. In addition, a microcomputer or the like, which converts the service information received at receiving means to a format usable by the user, is used to decode the reception authorization code to the reception authorization information. Thus, the cost increase of the receiver terminal can be curbed.

Further, the reception authorization information is encoded with the terminal unique information. Therefore, if the user inputs the reception authorization code erroneously, or tries to use the same fraudulently, the user is not authorized to receive the service information unless he inputs a correct reception authorization code. Consequently, only the service information under contract can be received from the provider for exactly the contracted period, thereby ensuring high security.

For a fuller understanding of the nature and advantages of the invention, reference should be made to the ensuing detailed description taken in conjunction with the accompanying drawings.

BRIEF DESCRIPTION OF THE DRAWINGS

FIG. 8 is a view showing example terminal unique information used in the present invention;

FIG. 9 is a view showing an example company code, which forms the terminal unique information and is given to a manufacturer of each receiver terminal;

FIG. 10 is a view showing another example company code, which forms the terminal unique information and is given to a manufacturer of each receiver terminal;

FIG. 11 is an example model code assigned to each model of the receiver terminal in the terminal unique information;

FIG. 12 is another example model code assigned to each model of the receiver terminal in the terminal unique information;

FIG. 13 is a view showing an example product information given to each receiver terminal in the terminal unique information;

FIG. 14 is a view showing another example product information given to each receiver terminal in the terminal unique information;

FIG. 17 is a view showing a data structure of time information transmitted through the FM teletext multiplex broadcasting;

FIG. 18 is a view showing an example data structure for a calendar and clock function provided in each receiver terminal;

FIG. 32 is a view showing a procedure of generating a reception authorization code in accordance with a sixth embodiment of the present invention;

FIG. 34 is a view showing a procedure of generating a reception authorization code in accordance with a seventh embodiment of the present invention;

FIG. 37 is a view showing an example structure of a reception authorization code in accordance with an eighth embodiment of the present invention;

DETAILED DESCRIPTION OF THE PREFERRED EMBODIMENTS

Referring to FIGS. 1 through 20, the following description will describe a first embodiment of the present invention.

Figure 1:
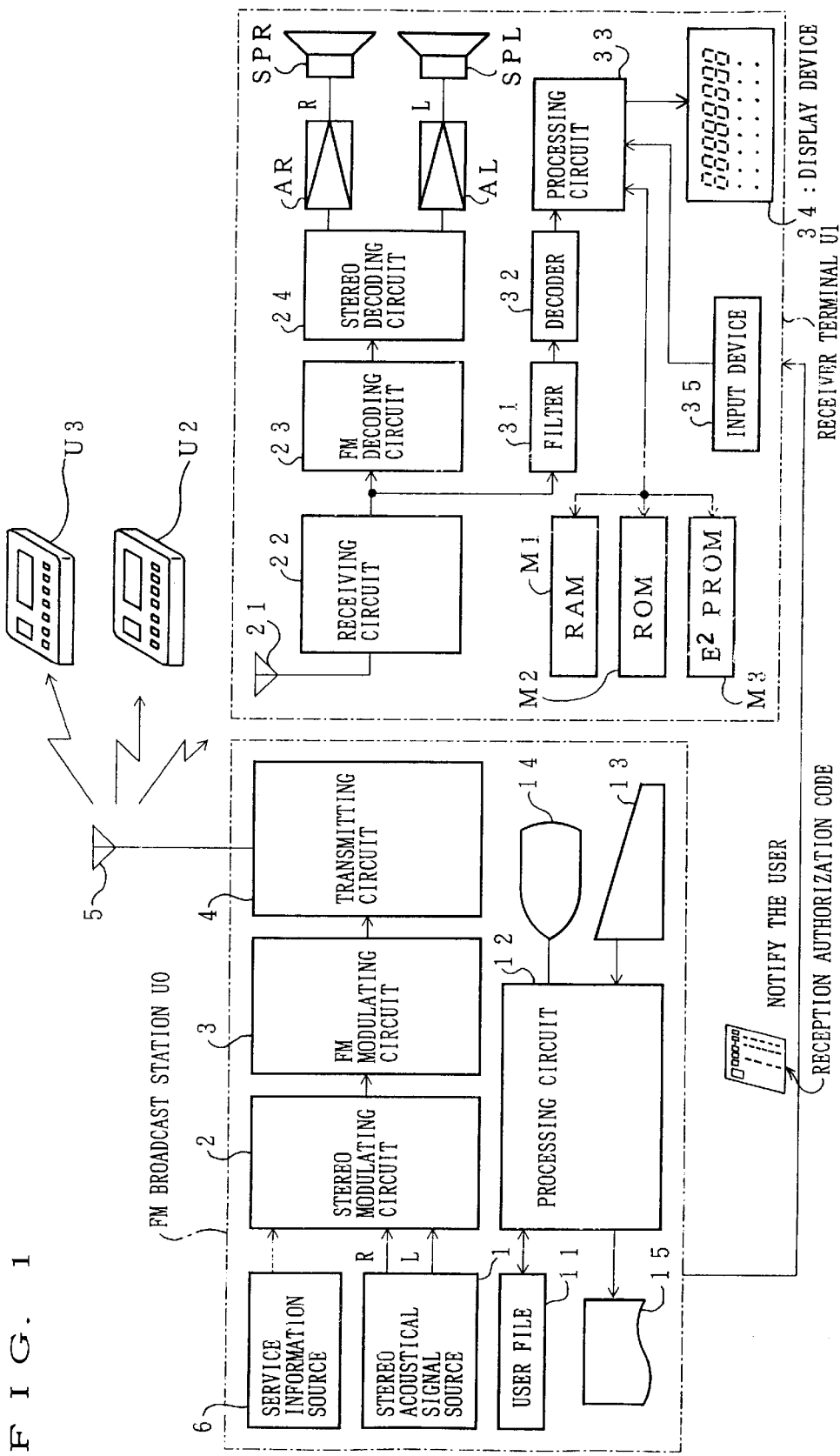
FIG. 1 is a view depicting a system arrangement for a restricted broadcasting using an FM teletext multiplex broadcasting in accordance with an example embodiment of the present invention.

FIG. 1 is a view showing a system arrangement of an example of restricted broadcasting using an FM teletext multiplex broadcasting of the present invention. An FM broadcast station U0, namely, the provider of the restricted broadcasting, transmits the service information which can be reproduced and displayed only by particular receiver terminals indicated U1, U2, U3, . . . (hereinafter, referred to as receiver terminal U when the explanation applies to each) in FIG. 1 on a multiplex acoustical signal, which carries music and sound and is reproducible with any type of FM receiver.

In the FM broadcast station U0, a two-channel (right and left) stereo acoustical signal carrying music and sound is inputted into a stereo modulating circuit 2 from a stereo acoustical signal source 1, and modulated to L+R and L−R signals. Further, a transmission signal is produced by frequency-modulating a carrier wave having a unique frequency to the FM broadcast station U0 by an FM modulating circuit 3. The transmission signal is transmitted from a transmitting circuit (transmitting means) 4 through an antenna 5.

The transmission signal is received at the receiver terminal U through an antenna 21, and a carrier wave component of an FM broadcast station the user wishes to use is extracted and amplified by a receiving circuit 22. The carrier wave component is removed from the resulting signal by an FM decoding circuit 23, and decoded to the two-channel (right and left) stereo acoustical signal by a stereo decoding circuit 24. The decoded two-channel (right and left) stereo acoustical signal is power amplified by amplifiers AL and AR and outputted as sounds through two-channel (right and left) speakers SPL and SPR, respectively, whereby music and sounds through a conventional free broadcasting become audible to the users.

A service information source (information generating source) 6 is provided in the FM broadcast station U0. The service information source 6 outputs ±4 kHz teletext multiplex data within a 100 kHz base bandwidth in such a manner to have 76 kHz as the center frequency and be spaced apart from a spectrum of the acoustical signal component up to 53 kHz. The teletext multiplex data are superimposed on the acoustical signal by the stereo modulating circuit 2 and outputted to the FM modulating circuit 3.

Further, an information processing device, such as a so-called work station, is provided in the FM broadcast station U0. More specifically, the information processing device includes a user file 11 for storing terminal unique information and contract contents of each receiver terminal U owned by individual users, a processing circuit (reception authorization code generating means) 12 for generating a reception authorization code for each user using the stored data in the user file in a manner described below, a man-machine interface of the processing circuit 12, such as a keyboard 13 and a display device 14, and a printing device 15 for printing out the desired data from the processing circuit 12.

In the FM broadcast station U0, the data as to the payment state to the financial institutions, or applications or notice of change from the users are inputted through the keyboard 13, so that information as to the address, name, telephone numbers, facsimile number, etc., of each user, the contract content, such as the expiry date of a reception authorization period described below and receivable programs, and the terminal unique information are stored into the user file 11. In the FM broadcast station U0, a coded reception authorization code is generated based on the contract content for each user stored in the user file 11, and notified to the user via mail as shown in FIG. 1 or through personal computer communications.

Explained in the above is a case where the provider of the restricted broadcasting using the FM teletext multiplex broadcasting is the FM broadcast station U0. In case of VICS or the like where the provider is not a broadcast station, the system for managing each receiver terminal U, such as the work station, and the service information source 6 are provided to the provider's end.

On the other hand, at the end of the receiver terminal U, the received signal is inputted into a filter 31, and a frequency component of the teletext multiplex data is extracted. Then, the signal is reproduced into the teletext multiplex data by a decoder 32. The teletext multiplex data are decoded to character data by a processing circuit 33 realized by a microcomputer or the like, and displayed in the form of characters, such as letters and symbol marks, by a display device 34 realized by a liquid crystal display panel or the like, only when the reception of the restricted broadcasting is possible, that is, when the teletext multiplex data are the service information with a service identification available with the receiver terminal U, and an adequate reception contract is established with the provider. In this manner, for example, a message function or a paging function for calling out a particular receiver terminal can be realized, thereby realizing an amalgam of communications and broadcasting.

Further, an input device 35 is provided in association with the processing circuit 33. The input device 35 is realized by a key switch or the like, and used for a station selecting manipulation, a program page selecting manipulation of the restricted broadcasting, and an input manipulation of the reception authorization code indicating the establishment of the reception contract.

Furthermore, three memories M1, M2, and M3 are provided in association with the processing circuit 33. The memory M1 is realized by a readable/writable memory, such as an S-RAM, a D-RAM, and a flash memory, and used to store the received teletext multiplex data, manage the teletext multiplex data, store the display data, manage the key switch data, etc. The memory M2 is realized by a non-volatile read-only memory, such as a mask ROM and a UVEP/ROM, and used to store a decoding procedure of the teletext multiplex data and the like. The memory M3 (storing means) is realized by a non-volatile readable/writable memory, such as a flash memory, and used to record the terminal unique information of each receiver terminal U when it is shipped from the manufacturer or sold at the shop, and store the setting condition of the receiver terminal U, such as a frequency currently being received as well as the reception authorization information which will be described below.

The memory M3 is used when the memory M1 is not a non-volatile memory, and can be omitted when the memory M1 is a non-volatile memory. The memories M1 an M2 may be enclosed in the processing circuit 33.

Thus, the processing circuit 33 decodes the reception authorization code inputted from the input device 35 to the reception authorization information by carrying out the decoding processing stored in the memory M2 using the terminal unique information of the receiver terminal U stored in the memory M3, the detail of which will be described below. Then, of all the teletext multiplex data inputted from the decoder 32, the processing circuit 33 captures the teletext multiplex data of the receivable programs that fit in a reception authorization period corresponding to the reception authorization information and stores the same into the memory M1. Then, the captured teletext multiplex data are outputted to the display device 34 and displayed in response to the input manipulation of the input device 35. In this manner, the reception of the restricted broadcasting using the FM teletext multiplex broadcasting is made possible.

Figure 2:
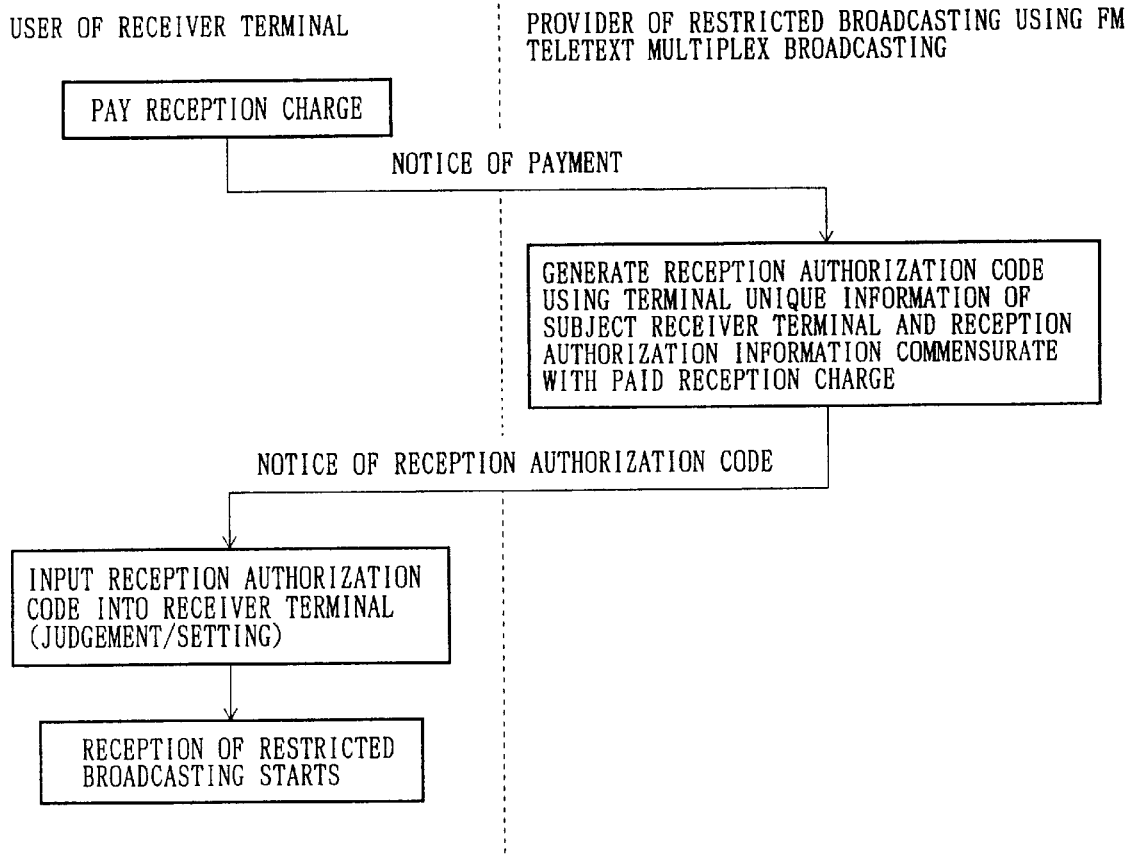
FIG. 2 is a view detailing an operation flow of the restricted broadcasting using the FM teletext multiplex broadcasting of the present invention.

FIG. 2 is an operation flow of the restricted broadcasting using the FM teletext multiplex broadcasting arranged in the above manner. The owner or user (hereinafter, referred to collectively as the user) of the receiver terminal U pays a predetermined reception charge corresponding to the desired service contents, that is, the kinds of the desired programs or the desired expiration date of the reception authorization period, to the provider through the financial institutions.

Upon receipt of the notice of payment of the reception charge from the financial institutions, the provider generates reception authorization information of the contract content commensurate with the paid reception charge, generates a reception authorization code from the reception authorization information using the terminal unique information of the subject receiver terminal, and notifies the same to the user via mail or through personal computer communications in a manner described below. Therefore, the reception authorization code is not decoded to the reception authorization information correctly when used in any receiver terminal other than the subject receiver terminal because the terminal unique information is different.

Upon receipt of the reception authorization code, the user inputs the reception authorization code through the input device (input means) 35 which also serves as the station selection keys. In response to the input, as previously mentioned, the processing circuit 33 of the receiver terminal U reads out the terminal unique information from the memory M3, and decodes the reception authorization code to the reception authorization information in accordance with the procedure read out from the memory M2, after which the processing circuit 33 judges whether the decoding result is correct or not. When the decoding result is correct, the new reception authorization information is stored into the memory M3, whereupon the reception of the restricted broadcasting appended with the service identification corresponding to the reception authorization information becomes possible.

In the following, the data structure for the FM teletext multiplex broadcasting will be explained with reference to FIG. 3. A further detailed explanation is set forth in the Japanese official gazette (No. 164 of Aug. 25, 1994). As shown in the drawing, a packet, namely a data unit, is composed of a 16-bit synchronizing sign for judging the synchronization, information bits following the 16-bit synchronizing sign for judging the synchronization, and a check sign for correcting and detecting an error. The information bits are 190 bits and the check sing is 82 bits, making a total of 272 bits.

As shown in the drawing, the information bits are composed of a prefix indicating the identification information or correlation of the data, and a data block into which a main body of program information or control information of various kinds is stored.

As shown in the drawing, the prefix is composed of a 4-bit service identification data, 1-bit decoding identification data, 1-bit information end data, 2-bit update flag data, data group number data, and data packet number data.

The service identification data are the first 4 bits in the prefix, and includes the data of 16 kinds, that is, 00–15 (00h–0Fh). Here, 0–3 (00h–03h) are allocated to programs of the free broadcasting; 4–12 (04h–0Ch) are allocated to the restricted broadcasting and reserves; and 13, 14, and 15 (0Dh, 0Eh, 0Fh) are allocated to additional information, such as time and identifications of the broadcast stations, program index information, and a broadcasting operation signal, respectively.

Thus, in the present invention, of all the service identifications for the restricted broadcasting and reserves, the provider can provide the service information using the service identifications excluding 4–6 (04h–06h) used for the VCIS information and 7 (07h) used by some of the broadcast stations, for example, the provider can use the service identification 12(0Ch).

The decoding identification data are the data to indicate whether the following data are of a recording type or a consecutive type. The data of the recording type are the data which are displayed only when all the data groups described below are received without an error, and the data of the consecutive type are the data which are displayed consecutively unless the received data have no error even when the data groups have not been received completely. The information end data are the data indicating whether the subject data packet is the data somewhere in the middle of the data group or at the end of the data group. The update flag data are the data indicating the 2 bits, that is, 0, 1, 2, and 3, cyclically. The update flag data are updated each time the data are updated. Thus, if the update flag data remain the same, it means that the newly received data are the same data that have been received before.

Further, the data group number data and data packet number data are the data indicating the assembly structure of the service information together with the information end data, which will be explained in the following with reference to FIG. 4.

Figure 4:
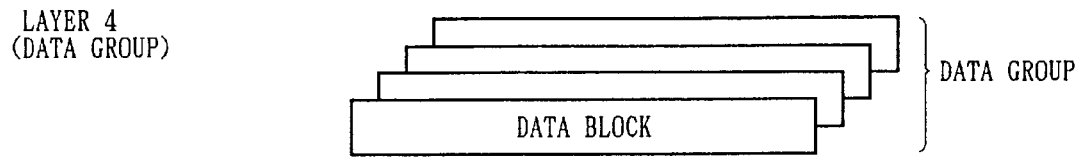
FIG. 4 is a view explaining a multi-layer structure of the above data.

FIG. 4 is a view showing a multi-layer hierarchical structure of the teletext multiplex data to explain a receiving action in the FM teletext multiplex broadcasting. The 16 kbps multiplex signal in Layer 1 transmitted from the FM broadcast station U0 is inputted into the decoder 32 from the receiving circuit (receiving means) 22 through the filter 31, and reproduced into the data and a clock by a signal decoding processing section in the decoder 32. Then, the processing, such as synchronization detection, is applied and the packet is extracted from the data transmitted in series by a synchronization judgement processing section in the decoder 32. The error correction and the error detection for a unit of the packet data is carried out by an error correcting and detecting processing section in the decoder 32 using the check sign, and then the error correction per frame is carried out, whereby the error correction and error detection is carried out as shown in Layer 2. Then, the data packet becomes the one corresponding to the information bits as shown in Layer 3. Then, the data packet is inputted into the processing circuit (decoding means) 33 from the decoder 32 after status information including the error detection judgment result is appended thereto.

In Layer 4, one or more than one data packet forms a data group in accordance with the prefix, and in Layer 5, one or more than one data group are decoded to program data. The program data are decoded to the character data and displayed by the display device 34 in Layer 6. The character information displayed in Layer 6 is recognized as information in Layer 7 by being recognized at the provider's and user's ends. The processing actions in Layers 4–6 are carried out by the processing circuit 33 in the following manner.

Figure 5:
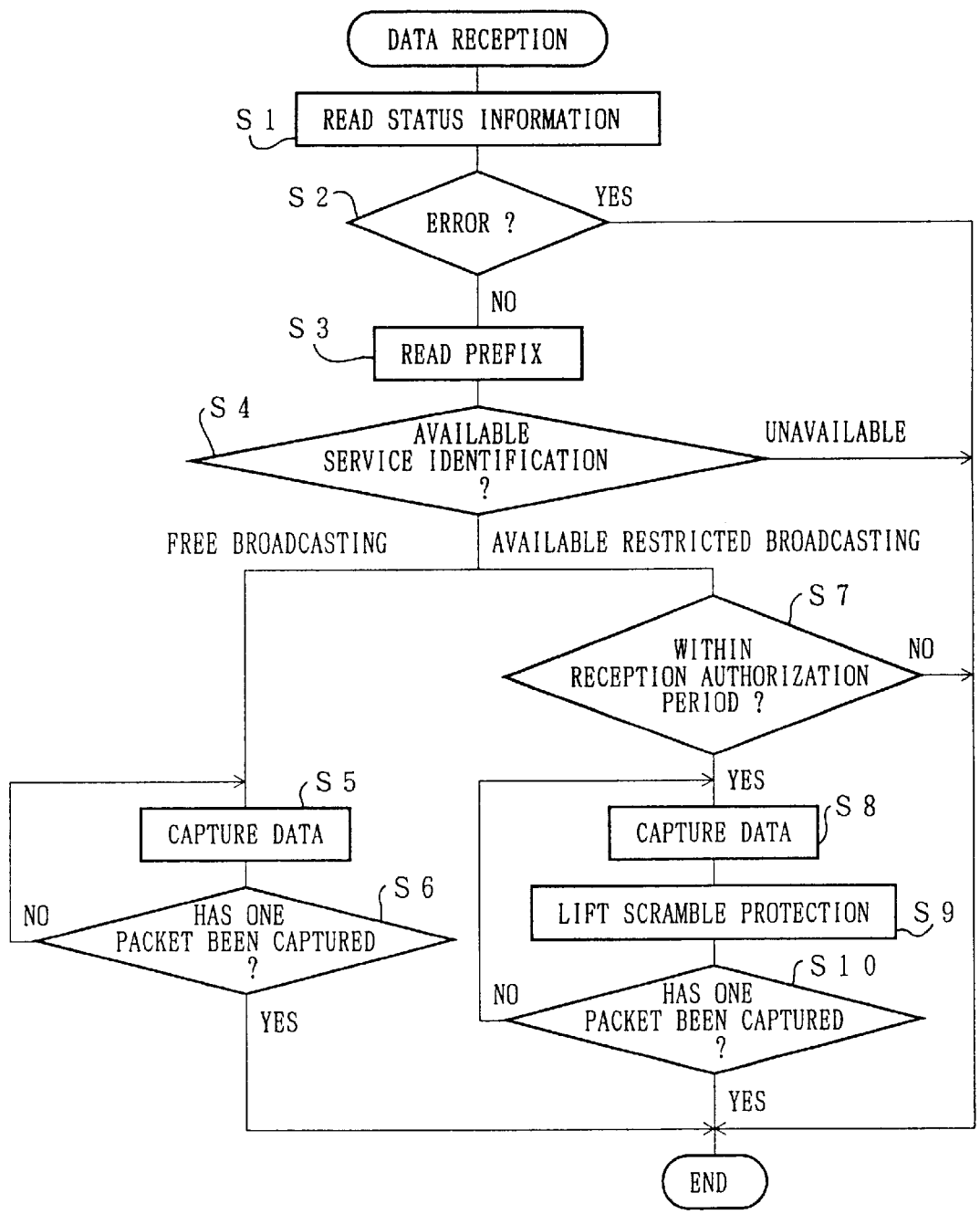
FIG. 5 is a flowchart detailing an example capturing action of program data for every received packet.
Figure 6:
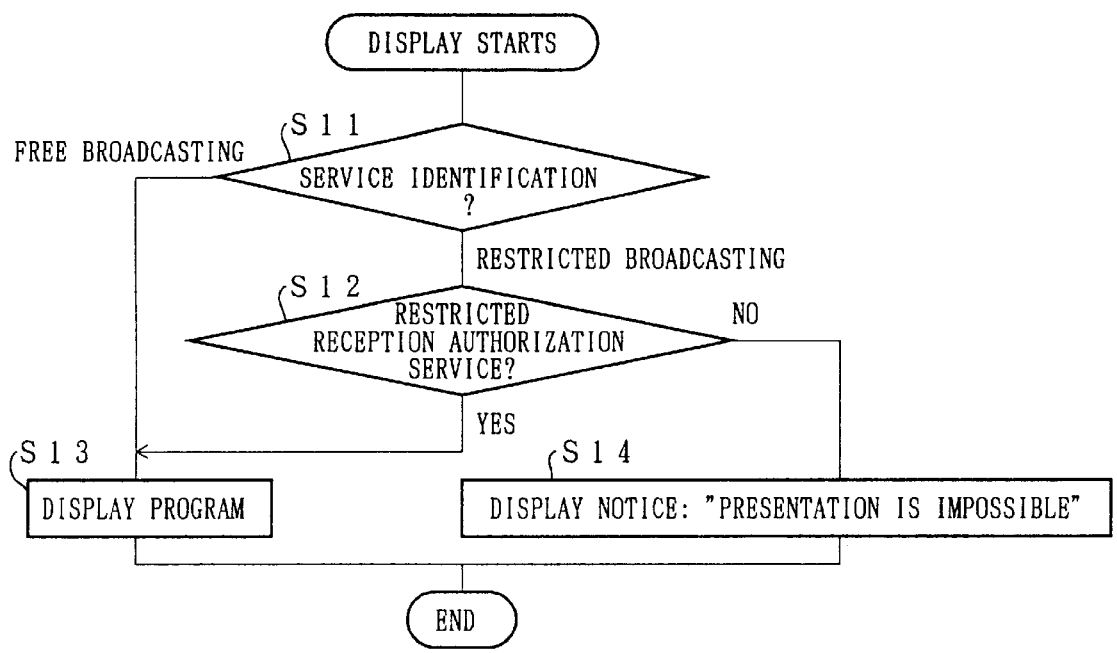
FIG. 6 is a flowchart detailing a display action for the captured program data.

FIGS. 5 and 6 are the flowcharts detailing the processing action of the processing circuit 33. FIG. 5 is the flowchart detailing the receiving action for each packet. In the drawings, Step is abbreviated to S. In Step 1, the status information appended to the data packet is read out from the decoder 32. In Step 2, whether an error is caused or not is judged from the status information. When an error is caused, the action is terminated and no data are captured. When no error is caused in Step 2, the flow proceeds to Step 3.

In Step 3, the prefix in the data packet is read out, and in Step 4, whether the service identification in the prefix matches with any of the available service identifications or not is judged. When the service identification is the one for the free broadcasting or the service identification for one of the additional information, program index information, and operation signal, the flow proceeds to Step 5. When the service identification is the one for the available restricted broadcasting, the flow proceeds to Step 7, and when the service identification is the one for the unavailable restricted broadcasting or reserves, the action is terminated and no data are captured.

In Step 5, the data block is captured, and in Step 6, whether one packet has been captured or not is judged. When one packet has not been captured, the flow returns to Step 5 until the data block for one packet will be captured completely.

In Step 7, even when the service identifications match with each other, whether it is in the predetermined reception authorization period (which will be described below) or not is judged using the control information. When it is not in the reception authorization period, the action is terminated; otherwise, the flow proceeds to Step 8.

In Step 8, the data are captured in the same manner as Step 5, and the scramble protection of the captured data is lifted in Step 9. In Step 10, whether the certain data have been captured or not is judged in the same manner as Step 6. When the certain data have not been captured yet, the flow returns to Step 8 until the data block for one packet will be captured completely.

FIG. 6 is the flowchart detailing the display action of the program data thus captured. In Step 11, the service identification of the program is judged. When the service identification is the service identification for one of the additional information, program index information, and operation signal, the program data are not related to the program display. Also, the data with the service identification for the unavailable restricted broadcasting and reserves are eliminated in advance when the data are received. Thus, in Step 11, whether the service identification is the one for the free broadcasting or the available restricted broadcasting is judged. In case of the free broadcasting, the flow proceeds to Step 13 and the program is displayed, whereas in case of the available restricted broadcasting, the flow proceeds to Step 12.

In Step 12, even when the service identification is judged to be the one for the available restricted broadcasting from the control information, whether the program can be displayed in the current state or not is judged. When the program can not be displayed in the current state, the flow proceeds to Step 14, and a notice, "PRESENTATION IS IMPOSSIBLE", is displayed. When the program can be displayed in the current state, the flow proceeds to Step 13, where the program is displayed as the service information of the restricted broadcasting.

The restricted broadcasting data are encoded, and it is arranged in such a manner that the data can not be decoded unless an encoding method and a decoding key are revealed. However, the encoding method and decoding key are kept confidential and are not readily obtained. Therefore, even if a receiver terminal for the free broadcasting receives the restricted broadcasting data, the received data are useless. Thus, when the service identification of the restricted broadcasting is judged in Step 4, the restricted broadcasting data are not captured and neglected at the receiver terminal for the free broadcasting.

In case that the algorithm of the processing circuit 33 is arranged to capture the data after the scramble protection is lifted, the order of Steps 8 and 9 are reversed. In case that the algorithm of the processing circuit 33 is arranged to lift the scramble protection by capturing the data, whether the received data are the receivable service information in Step 12 or not is judged, and the data capturing action in Step 8 and thereafter is carried out only when the received data are the receivable service information in Step 12.

Figure 7:
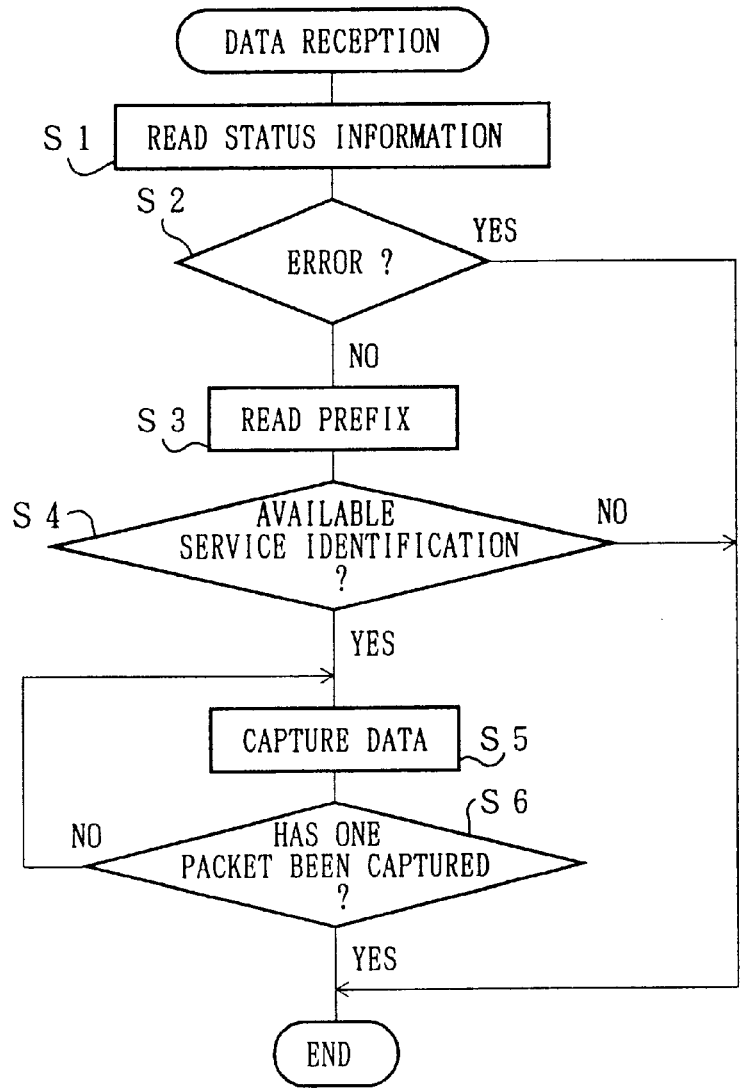
FIG. 7 is a flowchart detailing another example capturing action of program data for every received packet.

Further, when a decoder having the scramble protection lifting function in Step 9 is used as the decoder 32, or a circuit having the scramble protection lifting function is provided between the decoder 32 and processing circuit 33, so that the scramble protection lifting processing ends by the time the data are captured by the processing circuit 33, the scramble protection lifting processing is not carried out during the processing, such as generating the data group from the received data packet(s), producing and displaying a program. Thus, the action detailed in FIG. 5 is modified to the one shown in FIG. 7. The action detailed in FIG. 7 is the same as the one for the receiver terminal for the normal free broadcasting.

The following description will describe the terminal unique information, which is used in a transmission/reception system of the restricted broadcasting using the FM teletext multiplex broadcasting arranged as above. More specifically, at the provider's end, the terminal unique information is stored in the user file 11 and used to manage each receiver terminal U, whereas at the receiver terminal U's end, it is written into the memory M3 when shipped or sold. The terminal unique information is the information unique to each receiver terminal U, thereby enabling the provider to manage each receiver terminal U separately. Thus, as shown in FIG. 8, for example, the terminal unique information can be composed of a company code, a machine code, and production information of the receiver terminal.

The company code that is a code the provider assigns to each manufacturer who produces the special-purpose receiver terminals under contract with the provider, and can be numerals as shown in FIG. 9 or alphabets as shown in FIG. 10.

The machine code that is a code the provider or each manufacturer sets arbitrarily to each kind of the receiver terminals. Like in the case shown in FIGS. 9 and 10, the machine code can be numerals as shown in FIG. 11 or alphabets as shown in FIG. 12.

Further, the production information is a code that each manufacturer assigns to individual receiver terminal, and as shown in FIG. 13, it is composed of: a production place code indicating a country of origin, a production plant, and production line, etc.; a production lot code indicating a production date and a lot number; a production serial number code which is a production serial number in each lot; a code indicating other kinds of information, such as a version. Of all these codes, the codes at least necessary to identify the receiver terminal, for example, the production lot code and production serial number are used as the production information as shown in FIG. 14.

Of all the three codes forming the terminal unique information shown in FIG. 8, when the manufacturer and/or machine model can be specified from the production information, either or both can be omitted. A terminal unique number given from the provider to each manufacture may be used as the terminal unique information instead of the number, such as the production serial number, given at the manufacturer's end. Also, a contract number assigned to each user may be used as the terminal unique information. In short, the number determined at the provider's end can be used as the terminal unique information. The terminal unique information thus generated is encoded to information with a predetermined bit length by increasing the number of bits or removing some bits, and stored in both the user file 11 at the provider's end and the memory M3 in the receiver terminal U.

Figures 15, 16:
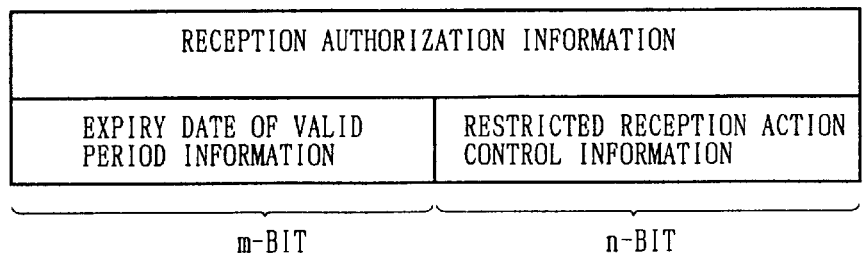
FIG. 15 is a view showing a structure of reception authorization information managed at the provider's end.
FIG. 16 is a table showing a reception charge for an additional reception period the user applies when making a contract or renewing the contract, and the expiry date of a reception authorization period.

On the other hand, as shown in FIG. 15, the reception authorization information is composed of m-bit information as to the expiration date of a valid period (hereinafter, referred to as expiration date information) and n-bit information as to a restricted reception action control. The expiration date information, which is used at the judgment in Step 7 of FIG. 5, is the information indicating the expiration date of a reception authorization period for each user.

As shown in FIG. 16, the expiration date of the reception authorization period is computed based on the reception charge paid from each user. The reception charge commensurate with the desired additional reception period is presented to the user as instructions when the contract is established, and the provider finds the additional reception period the user desires based on the reception charge the user has paid, and updates the expiration date of the reception authorization period by adding the computed additional reception period to the current expiration date of the reception authorization period. The additional reception period can be set based on, for example, a 3-month basic reception valid period B, and the current expiration date of the reception authorization period is extended to the updated expiry date of the reception authorization period by adding an integral multiple of the basic reception valid period B to the current expiration date $B_0$ of the reception authorization period.

The current expiration date $B_0$ of the reception authorization period is 0 (nil) when a contract is established. If a predetermined period is set as the current expiration date $B_0$ of the reception authorization period, the user can receive the service information free during that particular period. The reception charge may be set on a proportional basis to the additional reception period, or a basic reception charge A corresponding to the basic reception valid period B may be multiplied with a predetermined discount ratio C (C=C1, C2, . . . , Cn, Cn≦ . . . C2≦C1=1) for a long-term reception contract as shown in FIG. 16.

The restrict reception action control information is arranged for the use at the judgment in Step 12 of FIG. 6. More specifically, the restricted reception action control information can be used when selecting receivable broadcasting from more than one kind of restricted broadcasting, when selecting receivable broadcasting based on the time zones, or when selecting the receivable broadcasting based on the kinds of programs. When these selections are not available, in other words, whether the reception of the restricted broadcasting is authorized or not should be merely selected, the restricted reception action control information can be omitted.

Although it will be described below, the receiver terminal U decodes the reception authorization code to the reception authorization information using the terminal unique information composed as shown in FIG. 8 and the reception authorization information composed as shown in FIG. 15, and carries out the reception action for the corresponding restricted broadcasting. At this point, the reception terminal U compares the expiration date information with the date (day, month, and year) information managed at the terminal's end and judges whether to authorize/inhibit the reception. However, if the date information is incorrect, the judgment control on the authorization/inhibition can not be carried out correctly. For example, in case that the user sets the date information, if he backdates the date information fraudulently, a receiver terminal whose reception authorization period already expires is enabled to receive the service information. On the other hand, if the user has set the date information inaccurately, the date information may pass the expiration date of the valid period even when the actual reception authorization period is still valid, thereby making the reception of the restricted broadcasting impossible.

Thus, in the present invention, to ensure the reliability of the date information managed at each receiver terminal U's end, the date information is matched with the date information transmitted through the FM teletext multiplex broadcasting. If the receiver terminal U is furnished with a calendar function, the date information of the calendar function is calibrated with the date information of the FM teletext multiplex broadcasting before being used as the date information. In this manner, the date information is arranged so as not be changed by the user.

The date information transmitted through the FM teletext multiplex broadcasting is stored in a data packet of additional information with the service identification 13, and transmitted as time information composed as shown in FIG. 17. The time information is 34-bit data of the modified Julian day (MJD) combined with the coordinated universal time (UTC).

In the following, a generation method of the data MJD in the modified Julian day representation, which is used also as the expiry date information, will be explained. Let Y, M, and D be the year, month, and day of the current date or the expiration date of the valid period, respectively, then, MJD is found as:

MJD=14956+D+int[(Y−L)×365.25]+int[(M+1+L×12)× 30.6001], where a constant number L=1 when Y=1, or 2; otherwise, L=0.

Subsequently, Y' and M' are found using the above data MJD as:

Y'=int[(MJD−15078.2)/365.25]

M'=int{[MJD−14956.1−int(Y'×365.25)]/30.6001} where K=1 when M'=14 or 15; otherwise K=0. The current date, or the expiration date of the valid period can be found using Y' and M' as:

Y=Y'+K

M=M'−1−K×12

D=MJD−14956−int(Y'×365.25)−int(M'×30.6001).

Then, the receiver terminal U computes the date (day, month, and year) information using the modified Julian day data MJD used as the time information, and then computes the hour and minute information from the coordinated universal time and local time offset. The date, hour, and minute information thus computed is converted into a data format used by the calendar and clock function of the receiver terminal U, and stored or set in a calendar and clock circuit.

FIG. 18 is a view showing an example structure of the data used to realize the calendar and clock function at the receiver terminal U's end. The calendar and clock data are generated at the receiver terminal U's end in the following manner. To begin with, 1-second timing can be generated by dividing a clock signal generated by an oscillating circuit with a dividing circuit. More specifically, when the frequency of the clock signal is 32.768 kHz, $32768=2^{15}$. Thus, the 1-second timing can be generated by dividing the 32.768 kHz clock signal using a 15-stage dividing circuit.

Then, as shown in FIG. 18, a second counter can be realized by a 6-bit (00(00h)–59(3Bh)) cyclic counter. The second counter is incremented for every 1-second timing. In case decimal data are used to display the second data, the second counter is composed of a counter for the first digit, and a cyclic counter for the second digit. The former is realized by a 0–9 cyclic counter, and the latter is a 0–5 cyclic counter incremented when the first digit is carried to the second digit (when 9 changes to 0).

A minute counter can be realized by a 6-bit cyclic counter in the same manner as the second counter. When the minute data are the decimal data, the minute counter is composed of a 0–9 cyclic counter for the first digit and a 0–5 cyclic counter for the second digit.

An hour counter can be realized by, for example, a 5-bit (0(00h)–23(17h)) cyclic counter. The hour counter is incremented when the counter for the second digit of the minute counter changes from 5 to 0 (carried up). For example, the hour counter may be a combination of 1-bit A.M/P.M judging bit and 4-bit (0(00h)–11(0Bh)) cyclic counter, or a decimal counter which can count from 0 to 23. In short, any counter having a display format, such as an AM/PM mode and a 12:00/24:00 mode, can be used.

The date counter can be realized by a counter which can start the counting from 1(01h) and whose upper limit can be changed in accordance with the date information. The date counter is incremented when the hour counter changes from 23(17h) to 0(00h). The upper limit is set to 28(1Ch) for February generally and to 29(1Dh) in a leap year, 30(1Eh) for the months having a small remaining after February, and 31(1Fh) for the months having a large remaining. If the count value of the date counter is reset to 0, it can be used as a detection state code when the date has not been set.

A day-of-the-week counter can be generally realized by a 0–6 or 1–7 cyclic counter, and each day of the week can be correlated to the count value, for example, 0 is assigned to Sunday, 1 is assigned to Monday, and so forth. The day-of-the-week counter and the date counter has the same increment timing.

Here, 0 can be also used as a non-set detection state code in the day-of-the-week counter, and in this case, the counter values are 1–7.

A month counter can be realized by a 1(01h)–12(0Ch) cyclic counter, and is incremented when the date counter is changed from the upper limit to one. Again, 0 can be also used as a non-set detection state code in the month counter.

A year counter is a counter omitting the fourth digit in the dominical year, and can be realized by 3-digit decimal counter. The year counter is incremented when the month counter changes from 12 to 1.

These counters are calibrated with the time information shown in FIG. 17.

The processing circuit 33 compares the date (day, month, and year), hour, minute, and second information obtained by these counters with the expiration date information, and stores the judgment result into the memory M3 as an enable flag for the restricted broadcasting reception authorization. The comparison judging processing is carried out when the power source of the receiver terminal U is turned ON, when the reception starts, when a program is displayed, or every time the clock is updated, that is, every minute, every hour, every day, etc. Before the reception of the restricted broadcasting starts, the enable flag for the restricted broadcasting reception authorization is referred, after which the judgment in S7 is carried out. When the date information obtained by the counters passes the expiration date of the reception authorization period, the reception authorization flag is reset to the reception inhibited state. The reception authorization flag is set to the reception inhibited state at the initial state, for example, when shipped or sold. For this reason, the expiration date information in the reception authorization information shown in FIG. 15 is set to the date information before the receiver terminal U was produced or unreal date information.

Also, when the reception authorization code for the restricted broadcasting is inputted, the enable flag for the restricted broadcasting reception authorization may be set temporarily, so that the comparison judgment is carried out at the timing to update the clock, display a program, etc. If the actual date information can be obtained immediately, the expiration date information in the reception authorization information found from the input reception authorization code may be compared with the actual date information.

Accordingly, the receiver terminal shifts to the reception authorized state as soon as the reception authorization code is inputted. If a correct reception authorization code within the reception valid period is set, the reception of the information service becomes possible thereafter.

Once the enable flag for the restrict broadcasting reception authorization is reset to the inhibited state, the flag remains in the inhibited state until the reception authorization code is inputted again. An initial state flag, which is reset upon input of the reception authorization code, may be additionally provided, so that the reception of the restricted broadcasting is inhibited in the initial state and a message indicating impossible display, such as "RECEPTION CONTRACT PERIOD IS NOT SET", is shown when a program is displayed.

Even if the enable flag for the restricted broadcasting reception authorization is not provided in the processing circuit 33, the similar effect can be obtained. More specifically, the expiration date of the reception authorization period is compared and judged without using a particular flag every time the calendar information is updated by inhibiting the reception of the restricted broadcasting not only when the reception authorization period expires, but also when all the expiry date information is set to 0.

Figure 19:
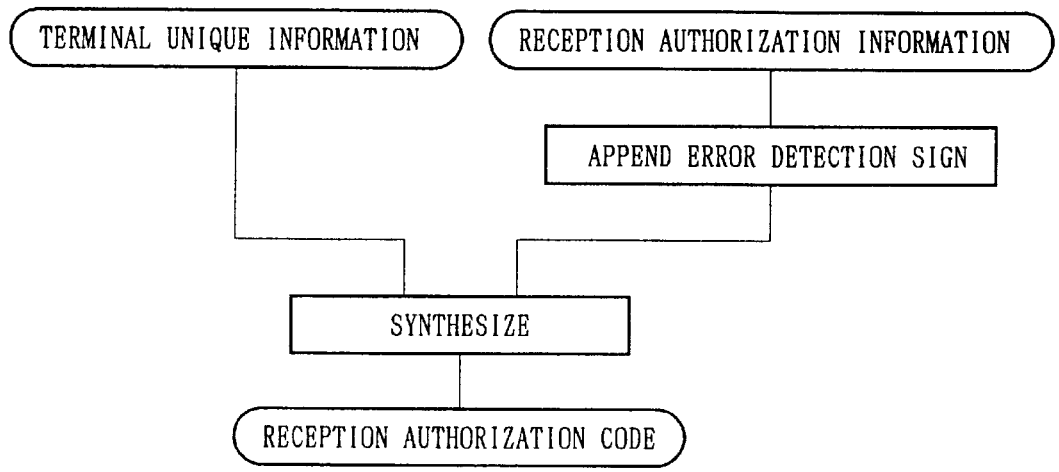
FIG. 19 is a view showing a procedure of generating a reception authorization code in accordance with a first embodiment of the present invention.
Figure 20:
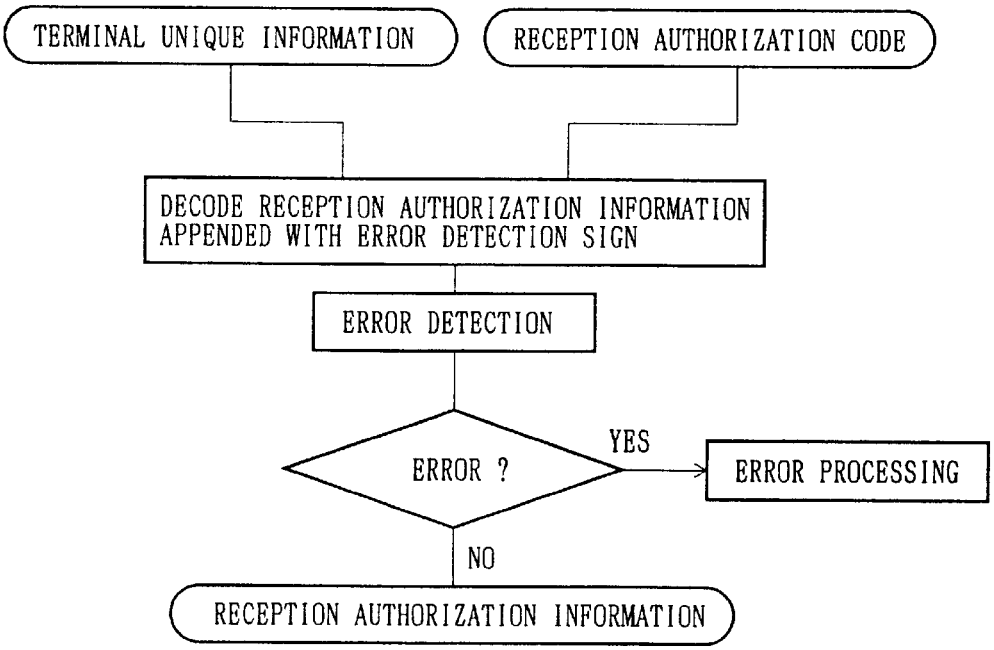
FIG. 20 is a view showing a procedure of decoding the reception authorization code generated in the manner of FIG. 19.

FIGS. 19 and 20 are flowcharts detailing the procedures for generating and decoding a reception authorization code in accordance with the first embodiment of the present invention used in the transmitting/receiving system for the restricted broadcasting using the FM teletext multiplex broadcasting arranged as above. FIG. 19 shows the procedure for generating the reception authorization code, which is carried out at the work station or the like at the provider's end upon receipt of the notice of payment of the reception charge from the financial institutions or the application from the user.

As has been explained, at the provider's end, the terminal unique information shown in FIG. 8 is generated based on the information unique to each receiver terminal U shown in FIGS. 9 through 14, and stored in the user file 11.

On the other hand, the expiration date of the reception authorization period computed in the manner shown in FIG. 16 using the paid reception charge and the contract content are read out from the user file 11, based on which the reception authorization information is generated in the manner shown in FIG. 15. An error detection sign, such as a CRC (Cyclic Redundancy Check) sign, is appended to the reception authorization information thus generated.

The reception authorization information appended with the error detection sign is synthesized with the terminal unique information, whereby the reception authorization code is generated. The reception authorization code is, for example, a 48-bit code composed 12-digit hexadecimal 4 bits, 0h–Fh. The provider notifies the user of the reception authorization code via mail or through data communications using the personal computer communications or telephone lines.

The reception authorization information appended with the error detection sign and the terminal unique information may be synthesized directly, or the terminal unique information may be used as the initial value of a predetermined random number generating circuit, and an exclusive-OR of a random number pattern generated by the random number generating circuit and the reception authorization information appended with the error detection sign may be computed. The reception authorization code thus found is used as the code unique to each receiver terminal.

FIG. 20 shows the procedure for decoding the reception authorization code, which is carried out in response to the input of the reception authorization code from the user through the input device 35. Upon input of the reception authorization code, the processing circuit 33 reads out the terminal unique information stored in the memory M3, and decodes the reception authorization code to the reception authorization information appended with the error detection sign by carrying out the signal processing in a manner reverse to the manner of the synthesizing shown in FIG. 19. The decoded reception authorization information is subjected to error detection using the error detection sign. When no error is detected, the decoded reception authorization information is stored into the memory M3. When an error is detected, error processing, such as making an error sound or showing an error display, is carried out to notify the user of the error.

Thus, when the user inputs a correct reception authorization code, the reception authorization information is set without detecting any error. However, if the user inputs an incorrect reception authorization code, for example, if the user makes an input manipulation mistake or he inputs a reception authorization code for another reception terminal, the input reception authorization code is judged to have an error.

As has been explained, the reception authorization information is transmitted to the user (each receiver terminal) not by using the broadcasting waves of the FM teletext multiplex broadcasting, but via mail or through the personal computer communications. Consequently, it has become possible to provide a more amount of service information, or more accurate service information without reducing a transmission capacity of the restricted broadcasting.

In this case, although the user has to set the reception authorization code, the erroneous input can be prevented in a secure manner because the error detection sign is appended to the reception authorization information.

Further, since the reception authorization information is encoded using the terminal unique information, if any unauthorized person tries to use the service information, he can not input the correct reception authorization code. Thus, only the service information under contract can be received from the provider at the contracted receiver terminal until the expiration date of the contract. Consequently, forgery of the reception authorization code, for example, misappropriation to another unauthorized receiver terminal, can be prevented, thereby ensuring high security.

An example method of transmitting the reception authorization code without using a medium for transmitting/receiving the service information is: sending a paper medium or the like on which the reception authorization code is recorded via mail or telegraph; notifying the reception authorization code through a telephone line; etc. To be more specific, e-mails through the personal computer communications or a computer inter-network, a telephone, a facsimile or the like are available.

Further, the processing circuit 33 for assembling the character data by decoding the data of the restricted broadcasting using the FM teletext multiplex broadcasting is used to decode the reception authorization code to the reception authorization information, and the input device 35 realized by a switch key for station selection or volume control is used to input the reception authorization code. Thus, a typical receiver terminal for the FM teletext multiplex broadcasting can be used without providing any additional component, thereby suppressing an increase of the cost.

Figure 21:
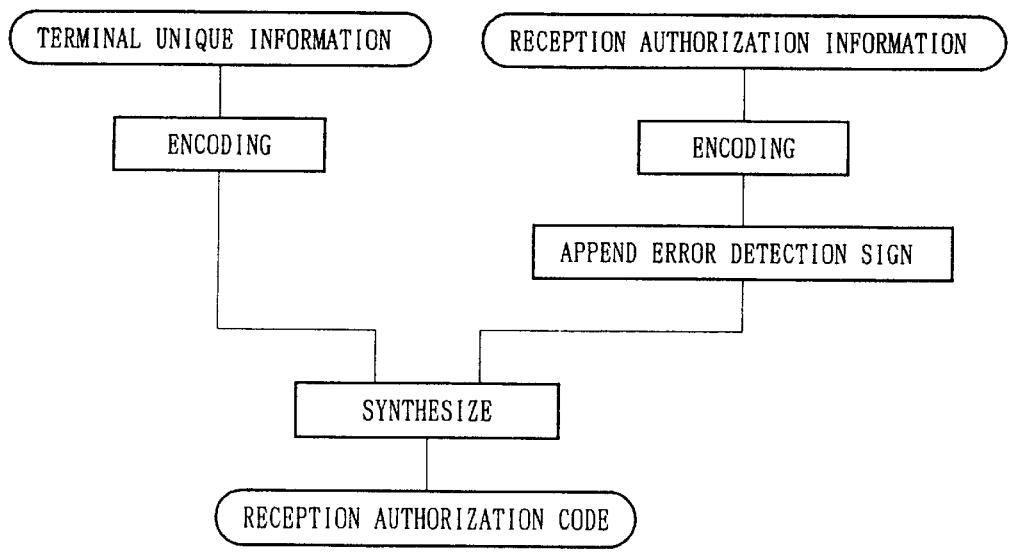
FIG. 21 is a view showing a procedure of generating a reception authorization code in accordance with a second embodiment of the present invention.
Figure 22:
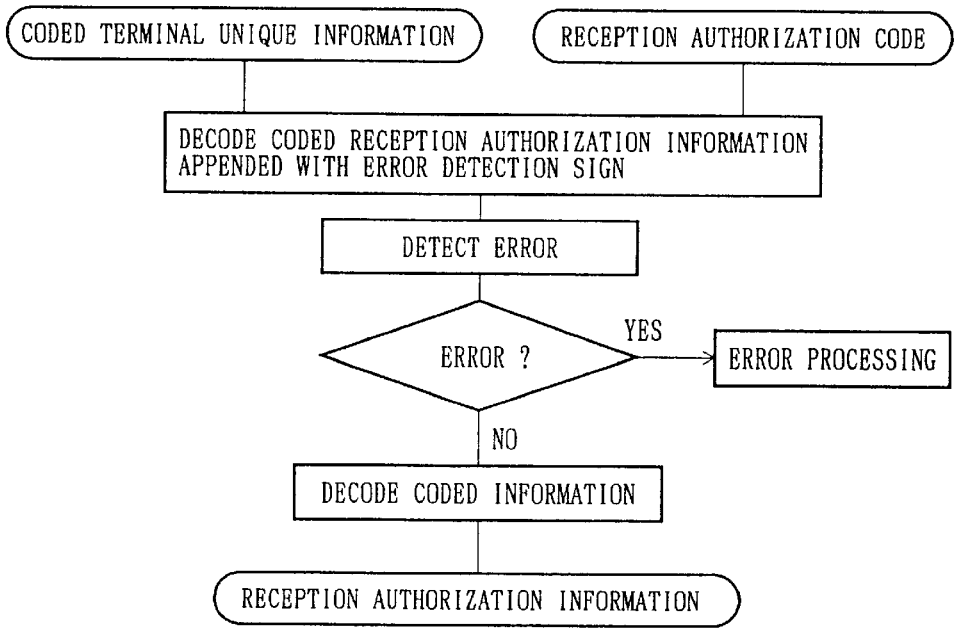
FIG. 22 is a view showing a procedure of decoding the reception authorization code generated in the manner of FIG. 21.

Referring to FIGS. 21 and 22, the following description will describe a second embodiment of the present invention. Hereinafter, like components are labeled with like reference numerals with respect to the first embodiment, and the description of these components is not repeated for the explanation's convenience.

FIG. 21 is a view showing a procedure for generating a reception authorization code in accordance with the second embodiment of the present invention. FIG. 22 is a view showing a procedure for decoding the reception authorization code. In the present embodiment, the terminal unique information and reception authorization information are encoded separately and then used to generate the reception authorization code. In response to the above encoding, the terminal unique information set in each receiver terminal U is encoded, and the decoded reception authorization information is subjected to the decoding processing in a manner reversed to the coding processing after the error judgment.

The encoding processing is carried out by, for example, rearranging the data rows of the terminal unique information and reception authorization information in a predetermined order, or by logically synthesizing the data rows and a pattern generated by a PN code generating circuit, which is in effect a predetermined random number generating circuit. In short, any method will do as long as the reception authorization code is not readily decoded to the reception authorization information.

When arranged in the above manner, even if the terminal unique information is generated based on the information the user can learn, such as the production number, and the user finds out the error detection sign, such as the CRC sign, he can not obtain correctly decoded reception authorization information, thereby making it possible to improve the confidentiality and further ensure the prevention of unauthorized use.

In the above example, both the terminal unique information and reception authorization information are subjected to the encoding processing; however, both do not have to be encoded. Encoding either one will do. In addition, the similar effect can be obtained when the encoding processing of the reception authorization information is carried out after the error detection sign is appended. However, if the error detection sign is appended after the reception authorization information is encoded as has been described above, the reception authorization code is decoded to the reception authorization information after the error is judged, and hence an erroneous input of the reception authorization code can be judged faster.

Figure 23:
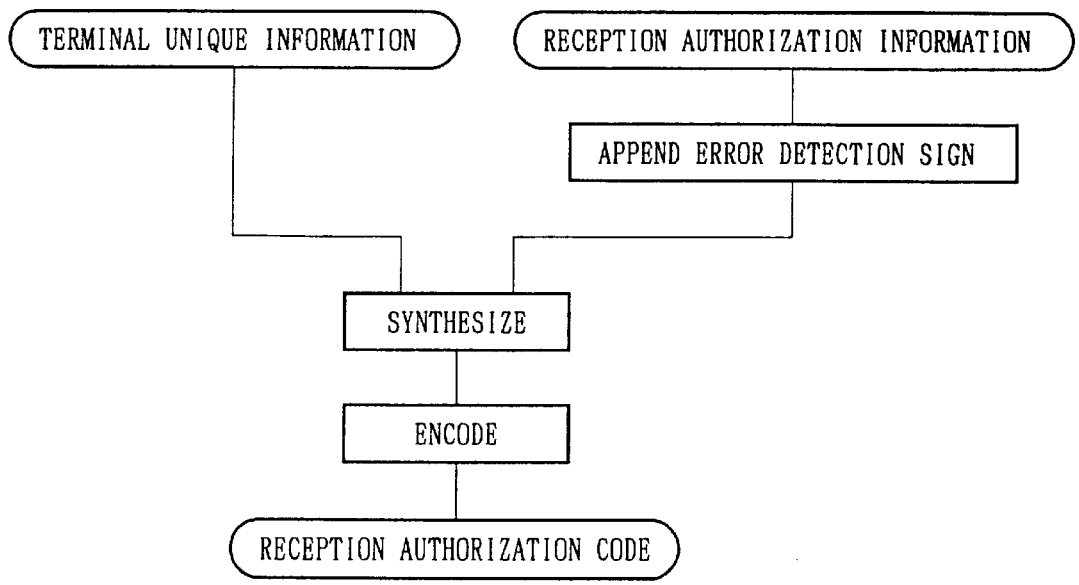
FIG. 23 is a view showing a procedure of generating a reception authorization code in accordance with a third embodiment of the present invention.
Figure 24:
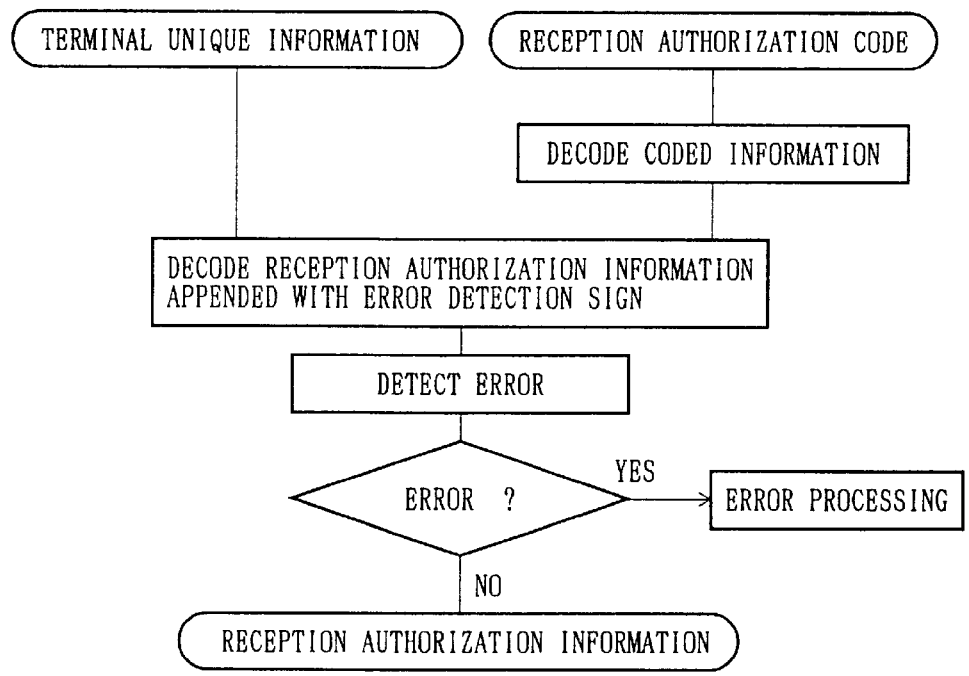
FIG. 24 is a view showing a procedure of decoding the reception authorization code generated in the manner of FIG. 23.

Referring to FIGS. 23 and 24, the following description will describe a third embodiment of the present invention. Hereinafter, like components are labeled with like reference numerals with respect to the above embodiments, and the description of these components is not repeated for the explanation's convenience.

FIG. 23 is a view showing a procedure for generating a reception authorization code in accordance with the third embodiment of the present invention. FIG. 24 is a view showing a procedure for decoding the reception authorization code. The procedures in FIGS. 23 and 24 are similar to those in FIGS. 19 and 20, respectively, and an explanation is omitted where the procedures are the same.

It should be noted that, in the present embodiment, the encoding processing is carried out after the terminal unique information and the reception authorization information appended with the error detection sign are synthesized, whereas an error of the input reception authorization code is detected based on the error detection sign after it is decoded.

Since the entire reception authorization code is encoded, unauthorized use can be prevented in a more secure manner even if the CRC sign or the like is found by some of the users with the knowledge of encoding/decoding technique.

Figure 25:
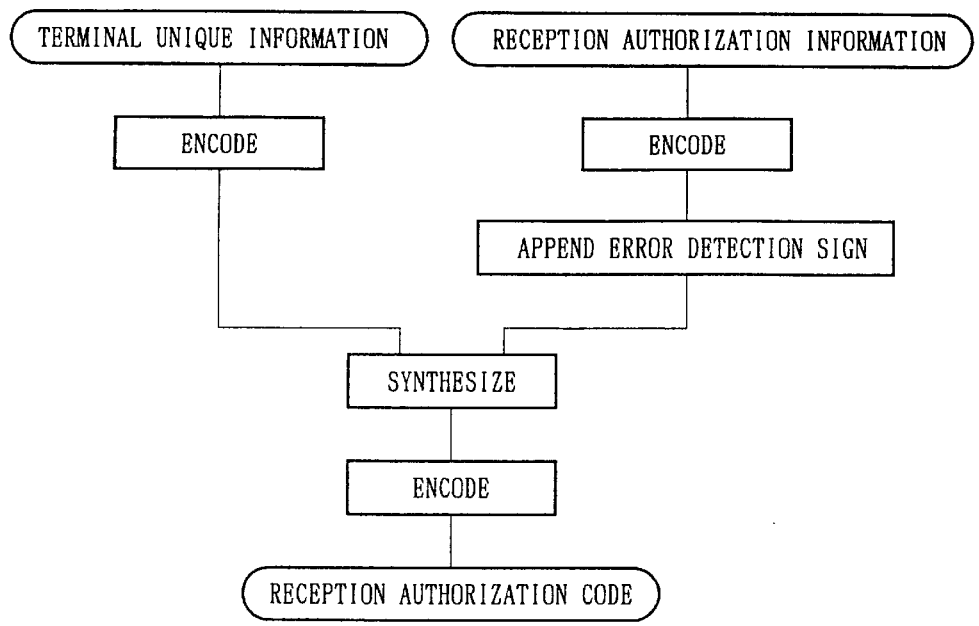
FIG. 25 is a view showing a procedure of generating a reception authorization code in accordance with a fourth embodiment of the present invention.
Figure 26:
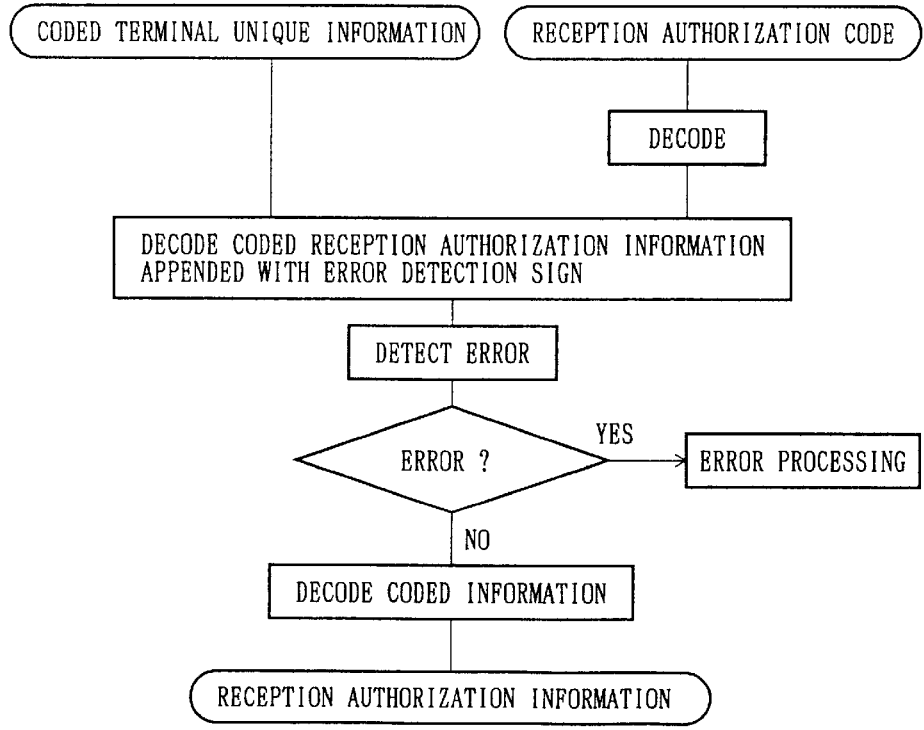
FIG. 26 is a view showing a procedure of decoding the reception authorization code generated in the manner of FIG. 25.

Further, to generate and decode the reception authorization code, the above technique may be adopted to the arrangement shown in FIGS. 21 and 22, respectively, and the resulting techniques are shown in FIGS. 25 and 26, respectively, as a fourth embodiment of the present invention.

The present invention is not limited to the restricted broadcasting using the FM teletext multiplex broadcasting, and is also available to other kinds of multiplex broadcasting for providing the service information using the blank periods (intervals) among the broadcasting waves, such as multiplex broadcasting for a television set.

Referring to FIGS. 3 through 18, and 27 through 31, the following description will describe a fifth embodiment of the present invention. Hereinafter, like components are labeled with like reference numerals with respect to the above embodiments, and the description of these components is not repeated for the explanation's convenience.

Figure 27:
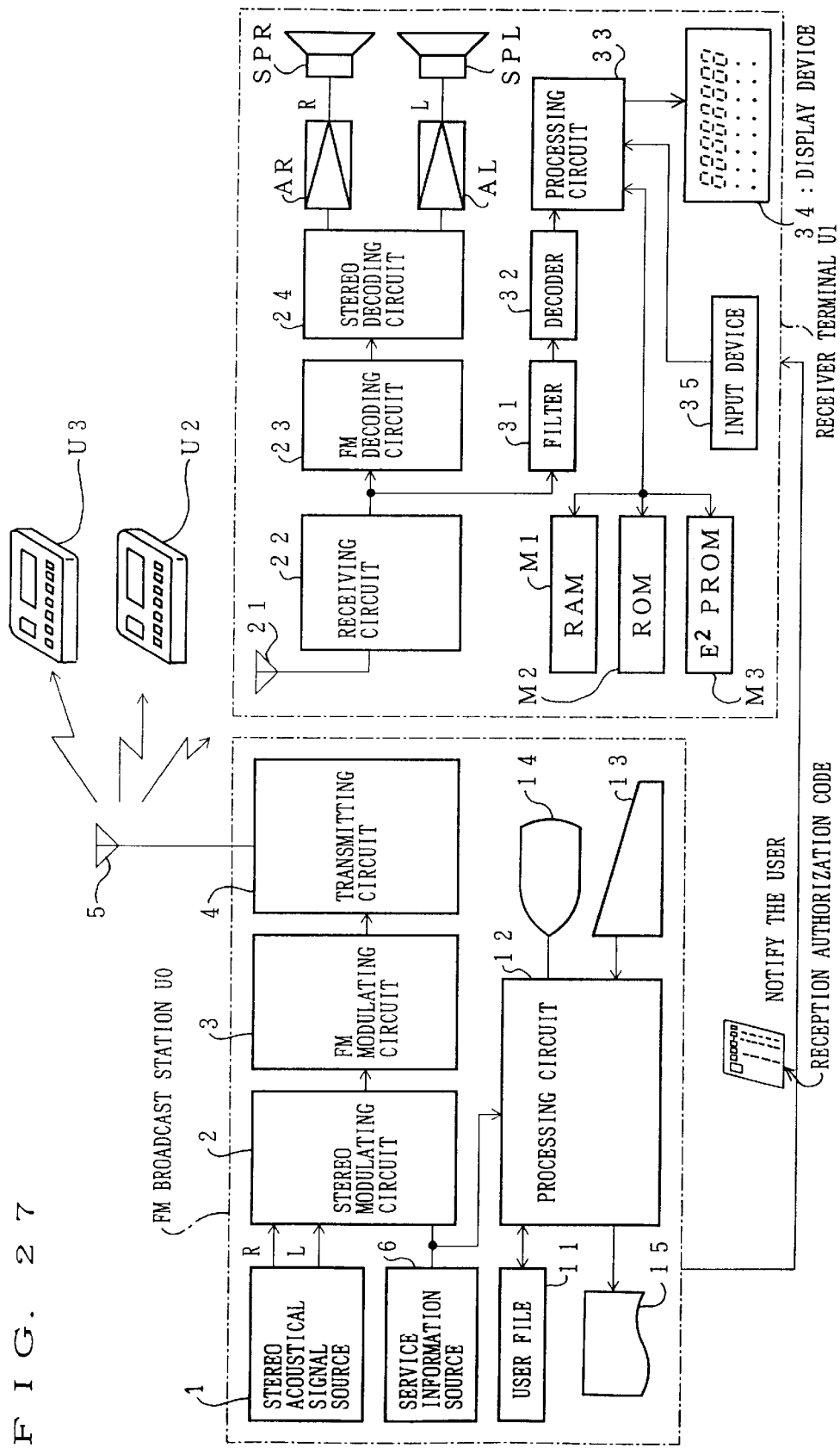
FIG. 27 is a view showing a system arrangement of a restricted broadcasting using an FM teletext multiplex broadcasting in accordance with a fifth embodiment of the present invention.

As shown in FIG. 27, the system of the restricted broadcasting using the FM teletext multiplex broadcasting of the present embodiment is similar to its counterpart in the first embodiment, and an explanation is omitted where the arrangements are the same.

In the present embodiment, the processing circuit 12 provided in the FM broadcast station U0, which is the provider of the restricted broadcasting, is arranged to generate the reception authorization code for each user in response to not only the stored data in the user file 11, but also generally available transmission information which changes periodically.

At the receiver terminal U's end, the processing circuit 33 is arranged to also capture the generally available additional information, such as date information, which can be used as the above transmission information, in the teletext multiplex data from the decoder 32.

Accordingly, the memory M1 is arranged to store the teletext multiplex data including the received additional information, manage the teletext multiplex data, store the display data, manage the key switch data, etc.

At the same time, the processing circuit 33 is arranged to decode the reception authorization code inputted through the input device 35 to the reception authorization information by carrying out the decoding processing stored in the memory M2 using not only the terminal unique information unique to the receiver terminal U stored in the memory M3, but also the received transmission information stored in the memory M1.

Figure 28:
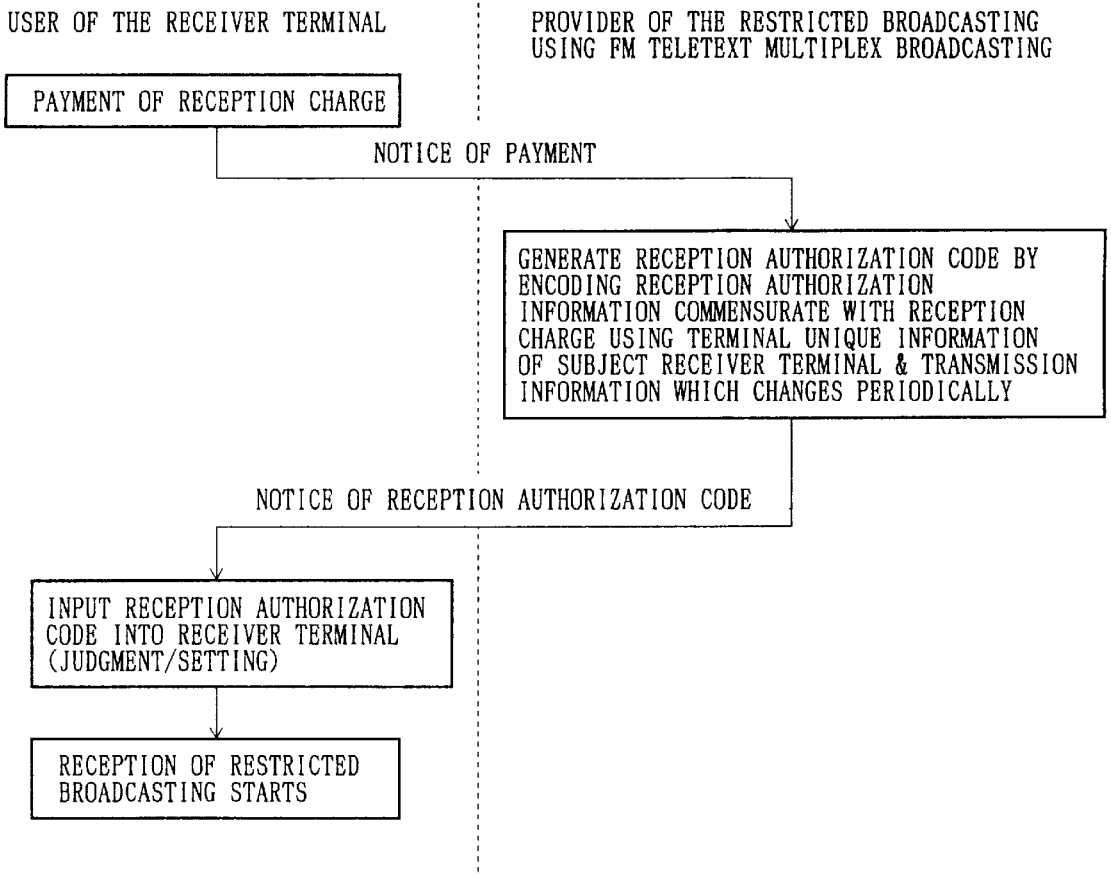
FIG. 28 is a view showing an operation flow of the restricted broadcasting using the FM teletext multiplex broadcasting of the present invention.

FIG. 28 is a an operation flow of the restricted broadcasting using the above-arranged FM teletext multiplex broadcasting. The user of the receiver terminal U pays the predetermined reception charge commensurate with his desired service contents, that is, the kinds of programs he wishes to see and the desired expiration date of the reception authorization period, to the provider through the financial institutions or the like.

Upon receipt of the notice of payment of the reception charge from the financial institutions, the provider generates the reception authorization information for the contract contents commensurate with the paid reception charge, and generates the reception authorization code from the reception authorization information using the terminal unique information of the subject receiver terminal and the transmission information currently on the air in the manner described below, and notifies the user of the reception authorization code via mail or through the personal computer communications. Thus, the reception authorization code can not be used to obtain the correctly decoded reception authorization information with a receiver terminal other than the subject receiver terminal because the terminal unique information is different.

In addition, the transmission information referred herein can be realized by generally available additional information which periodically changes, such as the date (day, month, and year) information used in the FM teletext multiplex broadcasting.

Upon receipt of the reception authorization code, the user inputs the reception authorization code through the input device 35 also serving as the station selection key or the like. In response to the input, the processing circuit 33 in the receiver terminal U reads out the terminal unique information from the memory M3 as has been explained, and also reads out the received transmission information stored in the memory M1. Then, the processing circuit 33 decodes the reception authorization code to the reception authorization information in accordance with the procedure read out from the memory M2, and judges the correctness of the decoded information. The processing circuit 33 stores the new reception authorization information into the memory M3 when the decoded information is judged as being correct, whereby the reception of the restricted broadcasting with the service identification corresponding to the reception authorization information becomes possible.

Figure 3:
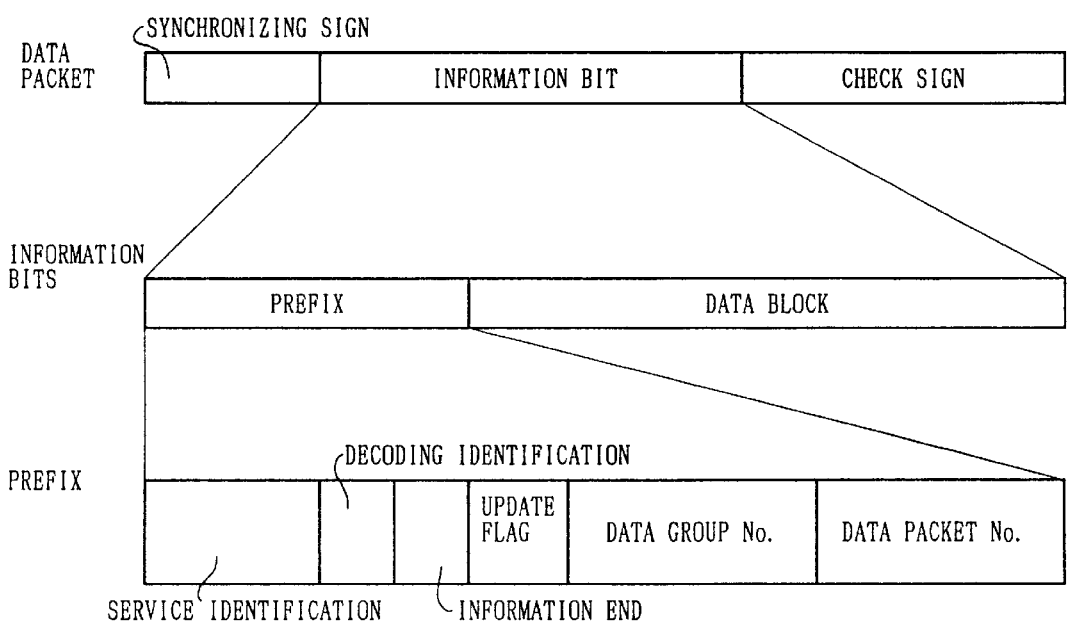
FIG. 3 is a view showing a data structure for the FM teletext multiplex broadcasting.

The data structure for the FM teletext multiplex broadcasting is the same as the one shown in FIG. 3 in the first embodiment.

The receiving actions of the FM teletext multiplex broadcasting are basically the same as those shown in FIGS. 4 through 7 in the first embodiment.

The arrangements of the terminal unique information are basically the same as those shown in FIGS. 8 through 14 in the first embodiment.

The arrangement of the reception authorization information is basically the same as the one shown in FIG. 15 in the first embodiment.

The arrangement of the expiry date of the reception authorization period is basically the same as the one shown in FIG. 16 in the first embodiment.

In the present embodiment, the receiver terminal U decodes the reception authorization code to the reception authorization information using the reception authorization information arranged as shown in FIG. 15 and the terminal unique information arranged as shown in FIG. 8 as well as the transmission information, and carries out the receiving actions of the corresponding restricted broadcasting. At this point, the receiver terminal U judges the authorization/ inhibition of the reception by comparing the expiry date information with the date information managed therein. Thus, if the date information is incorrect, the receiver terminal U can not control the judgment of the authorization/ inhibition in a correct manner. For example, in case that the user sets the date information, if the user backdates the date information fraudulently, a receiver terminal whose reception authorization period has already expired can receive the restricted broadcasting. If the user sets incorrect date information erroneously, for example, if the user sets the date information ahead of the expiration date of the valid period, a receiver terminal can not receive the restricted broadcasting even when its reception authorization period is still valid.

Thus, in the present invention, to solve the above problems and ensure the reliability of the date information managed by each receiver terminal U, information which can not be changed by the user is used as the date information. More specifically, the date information transmitted through the FM teletext multiplex broadcasting is used, or in case that the receiver terminal U is furnished with a calendar function, the calendar dates are calibrated with the date information transmitted through the FM teletext multiplex broadcasting.

The date information transmitted through the FM teletext multiplex broadcasting is stored in the data packet of the additional information with the service identification 13, and transmitted as time information in the arrangement shown in FIG. 17. In the present embodiment, the processing circuit 33 captures the time information stored in the data packet of the additional information with the service identification 13 as the transmission information, and stores the same into the memory M1.

A method of generating the time information, a method of generating the calendar and clock data of the receiver terminal U using the time information, and comparison judging processing by the processing circuit 33 for checking whether the reception is possible or not are the same as those explained in the first embodiment, respectively.

Figure 29:
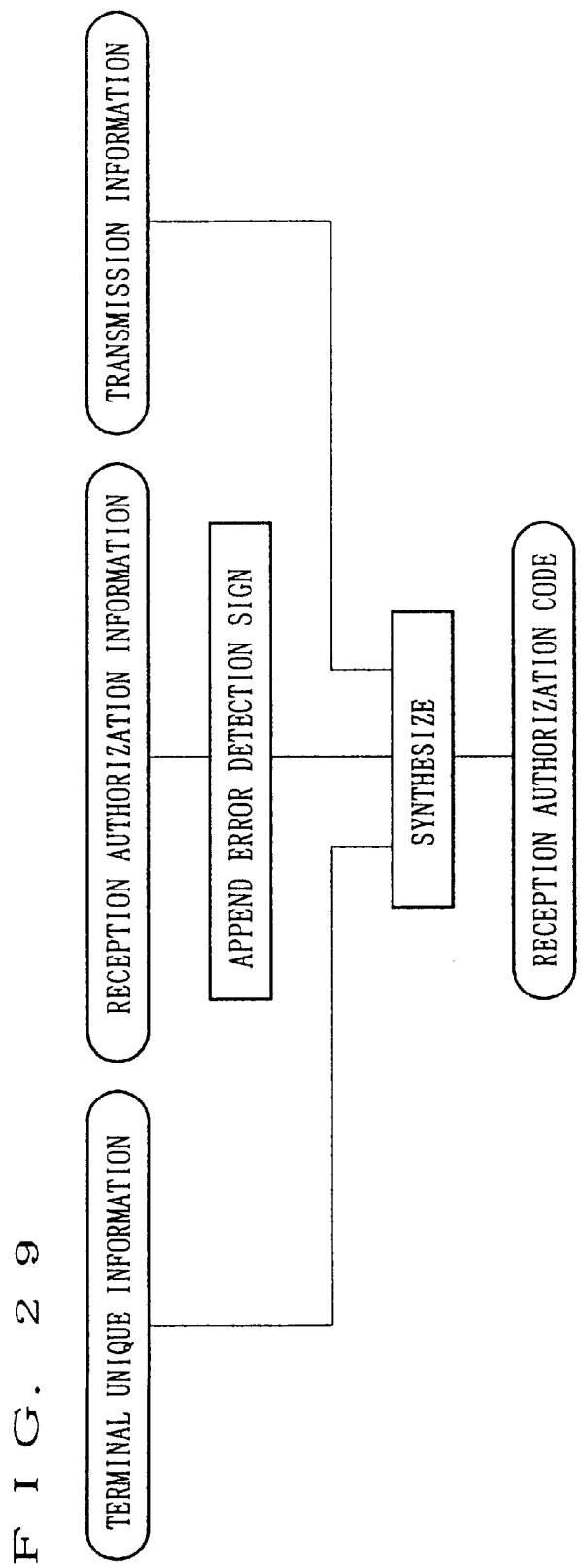
FIG. 29 is a view showing a procedure of generating a reception authorization code.
Figure 30:
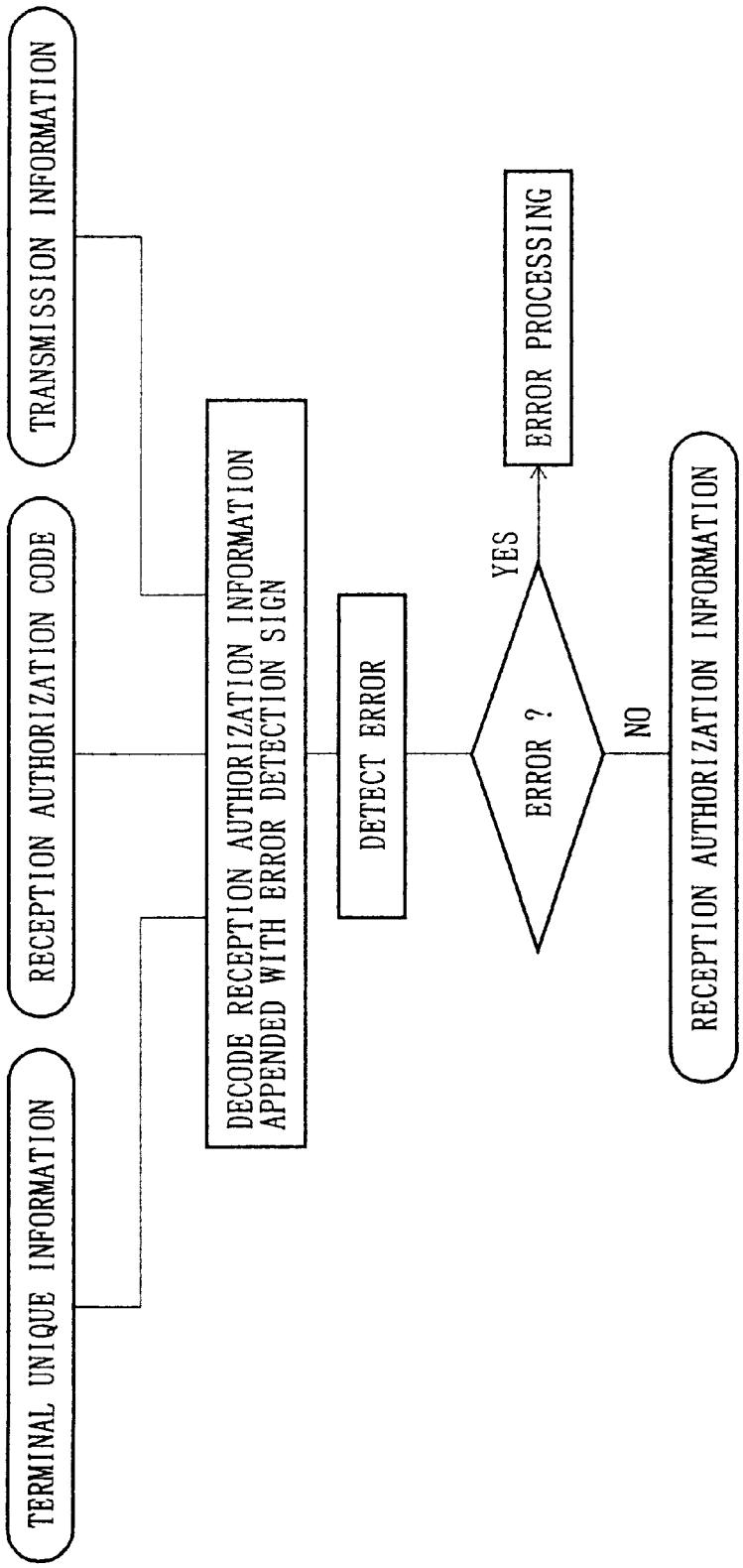
FIG. 30 is a view showing a procedure of decoding the reception authorization code generated in the manner of FIG. 29.

FIGS. 29 and 30 are the flowcharts detailing the procedures for generating and decoding the reception authorization code of the present embodiment used in the transmitting/receiving system of the restricted broadcasting using the above-arranged FM teletext multiplex broadcasting. FIG. 29 shows the procedure for producing the reception authorization code, which is carried out by the work station or the like at the provider's end in response to the receipt of the notice of payment of the reception charge from the financial institutions or the application from the user.

Like in the first embodiment, the terminal unique information shown in FIG. 8 is generated based on the information shown in FIGS. 9 through 14 unique to each receiver terminal U, and stored into the user file 11 at the provider's end. In the present embodiment, the month and year data obtained from the time information in the transmitted additional information is used as the transmission information.

On the other hand, like in the first embodiment, the expiration date of the reception authorization period found in the manner shown in FIG. 16 using the paid reception charge and the contract contents are read out from the user file 11, based on which the reception authorization information shown in FIG. 15 is generated. An error detection sign, such as a CRC sign, is appended to the reception authorization information thus generated.

In addition, in the present embodiment, the reception authorization information appended with the error detection sign is synthesized with the terminal unique information and transmission information, whereby the reception authorization code is generated. The reception authorization code is, for example, a 48-bit code composed 12-digit hexadecimal 4 bits, 0h–Fh. The provider notifies the user of the reception authorization code via mail or through the data communications using the personal computer communications or telephone lines.

The reception authorization information appended with the error detection sign, terminal unique information, and transmission information may be synthesized by finding an exclusive-OR, or they may be synthesized directly. The reception authorization code found in this manner is used as a unique code to each receiver terminal. FIG. 30 shows the procedure for decoding the reception authorization code, which is carried out in response to the input of the reception authorization code from the user through the input device 35. In the present embodiment, upon input of the reception authorization code, the processing circuit 33 reads out the terminal unique information stored in the memory M3 and transmission information stored in the memory M1, and decodes the reception authorization code to the reception authorization information appended with the error detection sign by carrying out the signal processing in a manner reverse to the one carried out at the synthesizing shown in FIG. 29. Like in the first embodiment, the error detection is carried out with the decoded reception authorization information using the error detection sign. When no error is detected, the decoded reception authorization information is stored into the memory M3. On the other hand, when an error is detected, error processing, such as making an error sound or showing an error display, is carried out to notify the user of the error.

Figure 31:
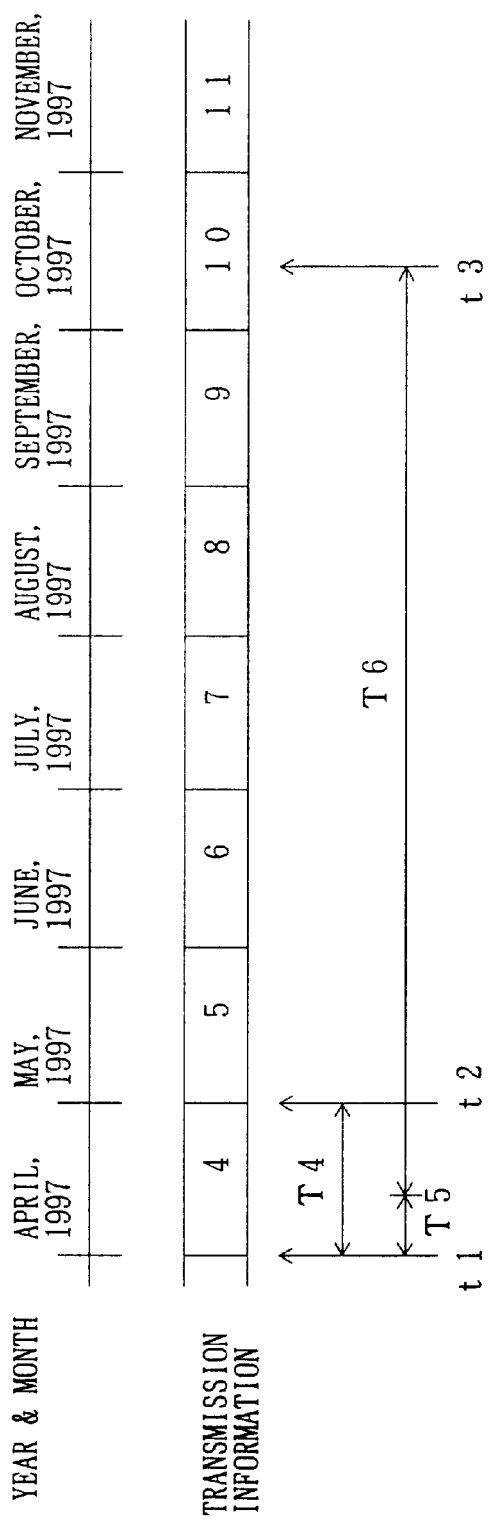
FIG. 31 is a timing chart of an example operation with the reception authorization code.

FIG. 31 is a timing chart showing an example operation with the reception authorization code generated and used in the above manner. To begin with, upon confirmation of the payment of the reception charge from the user, the provider synthesizes the reception authorization code at the timing denoted as t1, and issues the same to the user. The transmission information used in the synthesizing in case of FIG. 31 is month and year information, that is, April, 1997. Since the transmission information changes when the month changes to May, the end of April denoted as t2 is the expiration date of the input valid period for the reception authorization code, and a period from the issuing date to the expiry date of the input valid period denoted as T4 is the input valid period for the reception authorization code.

When a correct reception authorization code is inputted within the input valid period T4 for the reception authorization code, the expiration date of the reception authorization period set in the expiration date information in the reception authorization information is updated to a point denoted as t3, which is a sum of the transmission period T5 of the reception authorization period and the reception valid period T6 from the issuing date t1.

Therefore, even when the terminal unique information matches with each other, the reception authorization information can not be set correctly if the transmission information changes. This can set the input valid period of a certain time length into the reception authorization code. Thus, if the user tries to set the reception authorization code with the passed expiration date of the reception authorization period used once, an error is detected in the reception authorization code because the transmission information is different, and the error detection is notified to the user by making an error sound or showing an error display. Consequently, it has become possible to prevent an inconvenience such as disability the user from receiving the service information when the user erroneously sets the old reception authorization code of the expired reception authorization period. At the same time, the occurrence of such an inconvenience is notified to the user, so that the user can input a correct reception authorization code again.

As has been explained, like in the first embodiment, the reception authorization information is transmitted to each receiver terminal U not by using the broadcast waves of the FM teletext multiplex broadcasting, but via mail or through the personal computer communications. Consequently, it has become possible to provide more amount of service information or more accurate service information without reducing the transmission capacity of the restricted broadcasting. In addition, when the user has to set the reception authorization code in the above manner, an erroneous input can be prevented in a secure manner because the error detection sign is appended to the reception authorization information.

Further, in the present embodiment, the reception authorization information is encoded with the terminal unique information and transmission information. Thus, if the terminal unique information is generated based on the information the user can learn, such as the production number, and user finds out the terminal unique information and use the same fraudulently, he can not obtain correctly decoded reception authorization information because it is also encoded with the transmission information, and such a user is not authorized to receive the service information. Consequently, only the service information under contract can be received from the provider at the contracted receiver terminal for exactly the contracted period, thereby ensuring high security.

Further, like in the first embodiment, the processing circuit 33 for assembling the character data by decoding the data of the restricted broadcasting using the FM teletext multiplex broadcasting is used to decode the reception authorization code to the reception authorization information, and the input device 35 realized by a switch key for station selection or volume control is used to input the reception authorization code. Thus, a typical receiver terminal for the FM teletext multiplex broadcasting can be used without providing any additional component, thereby suppressing an increase of the cost.

Figure 33:
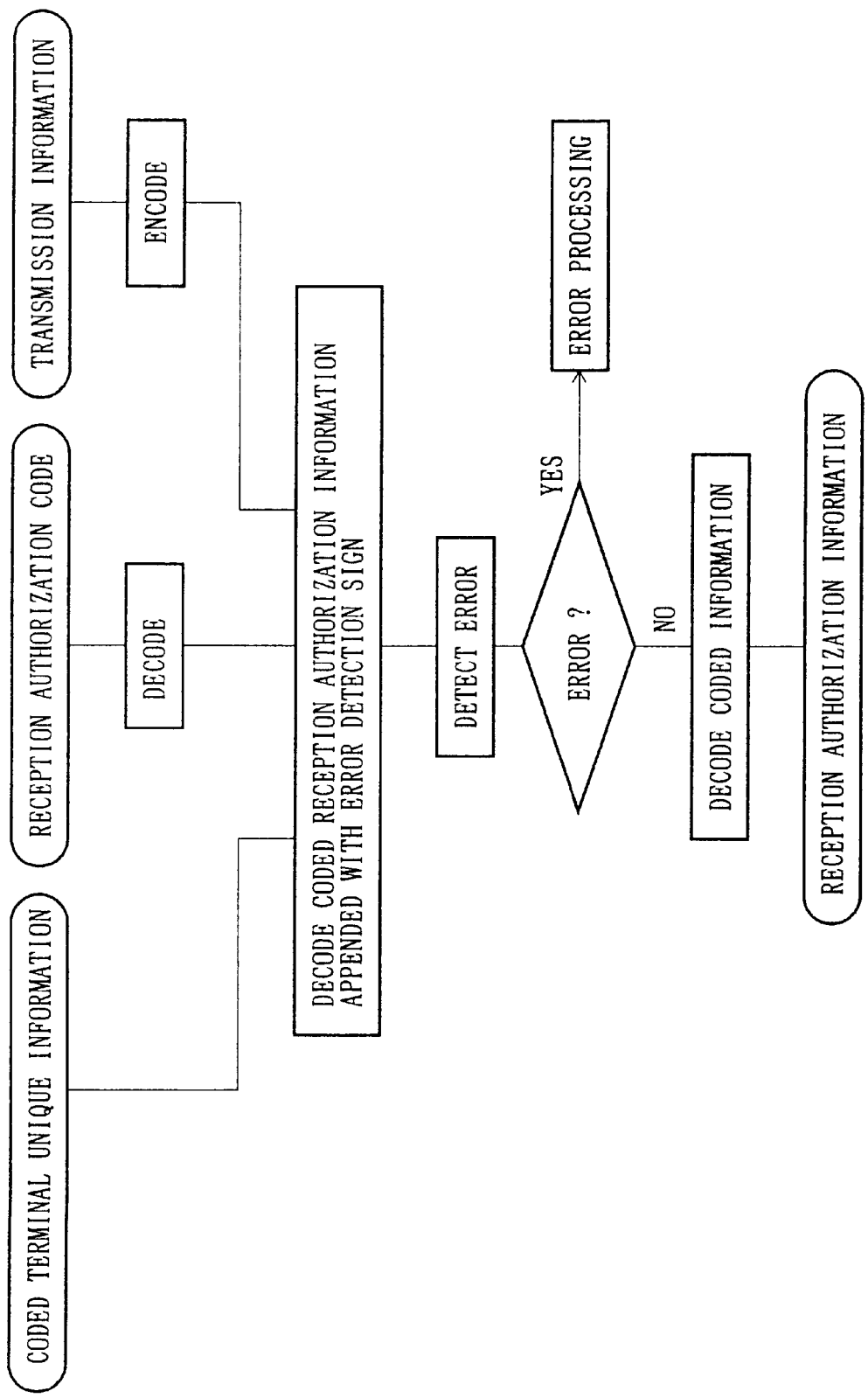
FIG. 33 is a view showing a procedure of decoding the reception authorization code generated in the manner of FIG. 32.

Referring to FIGS. 32 and 33, the following description will describe a sixth embodiment of the present invention. Hereinafter, like components are labeled with like reference numerals with respect to the above embodiments, and the description of these components is not repeated for the explanation's convenience.

The arrangement of the present embodiment is substantially the same as the arrangement of the fifth embodiment, and the difference will be explained mainly in the following.

FIG. 32 is a view showing a procedure for generating a reception authorization code used in the present embodiment, and FIG. 33 is a view showing a procedure for decoding the transmission authorization code. In the present embodiment, the reception authorization information, terminal unique information, and transmission information are encoded separately, and then used to generate the reception authorization code. In addition, the synthesized reception authorization code is encoded entirely.

Accordingly, the terminal unique information set in each receiver terminal U is encoded in the same manner, and the received transmission information is encoded as well. In addition, after the error judgment, the decoded reception authorization information is subjected to decoding processing in a manner reverse to the encoding processing.

The encoding processing is carried out by, for example, rearranging the data rows of the terminal unique information and reception authorization information in a predetermined order, or by logically synthesizing the data rows and a pattern generated by a PN code generating circuit, which is in effect a predetermined random number generating circuit. In short, any method will do as long as the reception authorization code is not readily decoded to the reception authorization information.

When arranged in the above manner, even if the terminal unique information is generated based on the information the user can learn, such as the production number, and the user finds out the error detection sign, such as the CRC sign, he can not obtain the correctly decoded reception authorization information, thereby making it possible to improve the confidentiality and further ensure the prevention of unauthorized use.

In the above example, the reception authorization information, terminal unique information, and transmission information are all subjected to the encoding processing; however, not all of them have to be encoded, and encoding at least one of them one will do. In addition, the similar effect can be obtained when the encoding processing of the reception authorization information is carried out after the error detection sign is appended. However, if the error detection sign is appended after the reception authorization information is encoded as has been described above, the reception authorization information is decoded after the error is judged. Hence, an erroneous input of the reception authorization code can be judged faster.

The present invention is not limited to the restricted broadcasting using the FM teletext multiplex broadcasting, and is also available to other kinds of multiplex broadcasting for providing the service information using the blank periods (intervals) among the broadcasting waves, such as multiplex broadcasting for a television set. Further, the transmission information is not limited to the time information of the additional information, and for example, the program index information can be used if it is updated periodically.

Referring to FIGS. 3 through 18, 27, 28, and 34 through 40, the following description will describe a seventh example embodiment of the present invention. Hereinafter, like components are labeled with like reference numerals with respect to the above embodiments, and the description of these components is not repeated for the explanation's convenience.

As shown in FIG. 27, the system for the restrict broadcasting using the FM teletext multiplex broadcasting of the present embodiment is substantially the same as its counterpart in the fifth embodiment. Thus, the explanation is omitted when the descriptions are the same.

In the present embodiment, the processing circuit 12 provided in the FM broadcast station U0, which is the provider of the restricted broadcasting, is arranged to generate the reception authorization code for each user using not only the data stored in the user file 11, but also the transmission information that changes periodically.

The processing circuit 33 at the receiver terminal U's end is arranged to capture the generally available additional information, such as the date information, which can be used as the transmission information, out of the teletext multiplex data from the decoder 32.

Accordingly, the memory M1 is arranged to store the received teletext multiplex data including the additional information, manage the teletext multiplex data, store the display data, manage the key switch data, etc.

At the same time, the processing circuit 33 is arranged to decode the reception authorization code inputted from the input device 35 to the reception authorization information by carrying out the decoding processing stored in the memory M2 using not only the terminal unique information unique to the receiver terminal U and stored in the memory M3, but also the received transmission information stored in the memory M1.

In the present embodiment, the restricted broadcasting is operated in accordance with the operation flow shown in FIG. 28. The user of the receiver terminal U pays a predetermined reception charge commensurate with the desired service contents, that is, the kinds of the programs he wishes to see and the desired expiration date of the reception authorization period, to the provider through the financial institutions or the like.

Upon receipt of the notice of payment of the reception charge from the financial institutions, the provider generates the reception authorization information for the contract contents commensurate with the paid reception charge, and generates the reception authorization code from the reception authorization information using the terminal unique information of the subject receiver terminal and the current transmission information in the manner described below, and notifies the user of the reception authorization code via mail or through the personal computer communications. Thus, the reception authorization code can not be decoded to the reception authorization information correctly when used for a receiver terminal other than the subject receiver terminal because the terminal unique information is different.

Also, the transmission information changes periodically, and the information related to such a change is known to both the FM broadcasting station U0 and each receiver terminal U. For example, the transmission information can be realized by the additional information, such as the date information, used in the FM teletext multiplex broadcasting.

Upon receipt of the reception authorization code, the user inputs the reception authorization code through the input device 35 also serving as the station selection key. In response to the input, the processing circuit 33 in the receiver terminal U reads out the terminal unique information from the memory M3 as has been explained, and also reads out the received transmission information stored in the memory M1. Then, the processing circuit 33 decodes the reception authorization code to the reception authorization information in accordance with the procedure read out from the memory M2 with the terminal unique information and transmission information, and judges the correctness of the decoded information. The processing circuit 33 stores the new reception authorization information into the memory M3 when the decoded information is judged as being correct, whereby the reception of the restricted broadcasting of the service identification corresponding to the reception authorization information becomes possible.

The data structure for the FM teletext multiplex broadcasting is the same as the one shown in FIG. 3 in the first embodiment.

The receiving actions of the FM teletext multiplex broadcasting are basically the same as those shown in FIGS. 4 through 7 in the first embodiment.

The arrangements of the terminal unique information is basically the same as those shown in FIGS. 8 through 14 in the first embodiment.

The arrangement of the reception authorization information is the one shown in FIG. 15 in the first embodiment appended with the reception authorization code input valid period information, which will be described below. The reception authorization code input valid period information is used in the procedure for decoding the reception authorization code shown in FIG. 36, which will be also described below, and is in effect the information representing a period in which each user can input the reception authorization code. For example, the reception authorization code input valid period information is the data, such as "four months".

The arrangement of the expiry date of the reception authorization period is basically the same as the one shown in FIG. 16 in the first embodiment.

In the present embodiment, the receiver terminal U decodes the reception authorization code to the reception authorization information using the reception authorization information arranged as above, the terminal unique information arranged as shown in FIG. 8, and the transmission information, and carries out the receiving action of the corresponding restricted broadcasting. At this point, the receiver terminal U judges the authorization/inhibition of the reception by comparing the expiration date information with the date information managed therein. Thus, if the date information is incorrect, the receiver terminal U can not control the judgment of the authorization/inhibition in a correct manner. For example, in case that the user sets the date information, if the user backdates the date information fraudulently, a receiver terminal whose expiration date of the reception authorization period has already passed is authorized to receive the restricted broadcasting. If the user sets incorrect date information erroneously, for example, if he sets the date information ahead of the expiration date, a receiver terminal can not receive the restricted broadcasting even when its reception authorization period is still valid.

Thus, in the present invention, to solve the above problems and ensure the reliability of the date information managed by each receiver terminal U, information which can not be changed by the user is used as the date information. More specifically, the date information transmitted through the FM teletext multiplex broadcasting is used, or in case that the receiver terminal U is furnished with a calendar function, the calendar dates are calibrated with the date information of the FM teletext multiplex broadcasting.

The date information transmitted through the FM teletext multiplex broadcasting is stored in the data packet of the additional information with the service identification 13, and transmitted as time information in the arrangement shown in FIG. 17. In the present embodiment, the processing circuit 33 captures the time information stored in the data packet of the additional information with the service identification 13 as the transmission information, and stores the same into the memory M1.

A method of generating the time information, a method of generating the calendar and clock data using the time information shown in FIG. 18 at the receiver terminal U's end, and comparison judging processing by the processing circuit 33 for checking whether the reception is authorized or not are the same as those explained in the first embodiment, respectively.

Figure 35:
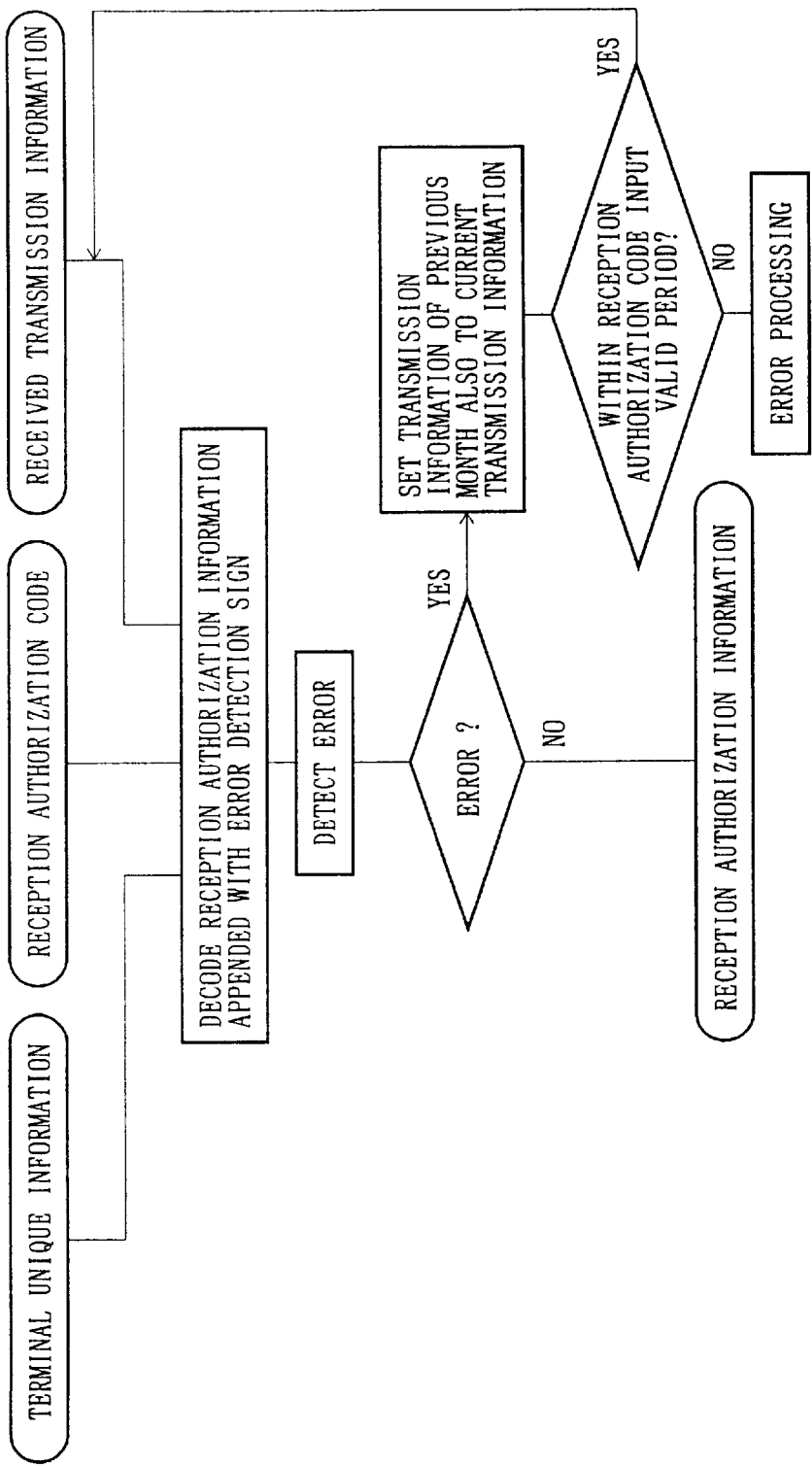
FIG. 35 is a view showing a procedure of decoding the reception authorization code generated in the manner of FIG. 34.

FIGS. 34 and 35 are the flowcharts detailing the procedures for generating and decoding the reception authorization code of the present invention used in the transmitting/receiving system of the restricted broadcasting using the above-arranged FM teletext multiplex broadcasting. FIG. 34 shows the procedure for producing the reception authorization code, which is carried out by the work station or the like at the provider's end in response to the receipt of the notice of payment of the reception charge from the financial institutions or the application from the user.

Like in the first embodiment, the terminal unique information shown in FIG. 8 is generated based on the information shown in FIGS. 9 through 14 for each receiver terminal U. and stored into the user file 11. In the present embodiment, the month and year data obtained from the time information in the transmitted additional information is used as the transmission information.

On the other hand, like in the first embodiment, the expiry date of the reception authorization period found in the manner shown in FIG. 16 using the paid reception charge and the contract contents are read out from the user file 11, based on which the reception authorization information shown in FIG. 15 is generated. An error detection sign, such as a CRC sign, is appended to the reception authorization information thus generated.

In addition, in the present embodiment, the reception authorization information appended with the error detection sign is synthesized with the terminal unique information and transmission information, whereby the transmission authorization code is generated. The reception authorization code is, for example, a 48-bit code composed 12-digit hexadecimal of 4 bits, 0h–Fh. The provider notifies the user of the reception authorization code via mail or through data communications using the personal computer communications or telephone lines.

The reception authorization information appended with the error detection sign, terminal unique information, and transmission information may be synthesized by finding an exclusive-OR, or they may be synthesized directly. The reception authorization code found in this manner is used as a unique code to each receiver terminal.

FIG. 35 shows the procedure for decoding the reception authorization code, which is carried out in response to the input of the reception authorization code from the user through the input device 35. In the present embodiment, upon input of the reception authorization code, the processing circuit 33 reads out the terminal unique information stored in the memory M3 and transmission information stored in the memory M1, and decodes the reception authorization code to the reception authorization information appended with the error detection sign by carrying out the signal processing in a manner reverse to the one carried out at the synthesizing shown in FIG. 34. Like in the first embodiment, the error detection is carried out with the decoded reception authorization information using the error detection sign. When no error is detected, the decoded reception authorization information is stored into the memory M3.

On the other hand, when an error is detected, the transmission information of the previous month is computed from the transmission information stored in the memory M1, and the content of the memory M1 is updated with the computed transmission information. When the computed transmission information is the one transmitted within the predetermined reception authorization code input valid period, the reception authorization code is decoded again using the updated transmission information and the terminal unique information. When the updated transmission information is the one before the reception authorization code input valid period, error processing, such as making an error sound or showing an error display, is carried out to notify the user of the error.

Thus, let SK be a transmission period when the transmission of the transmission information begins till it is updated, and SN be the number of kinds of the transmission information used to decode the reception authorization code, then a maximum value ND of the reception authorization code input valid period is found by:

ND=SK×SN.

Also, let NS be the minimum guaranteed period for the reception authorization code input valid period (the shortest period when the reception authorization code is issued till the reception authorization code input valid period expires), then NS is found by:

NS=SK×(SN−1).

Figure 36:
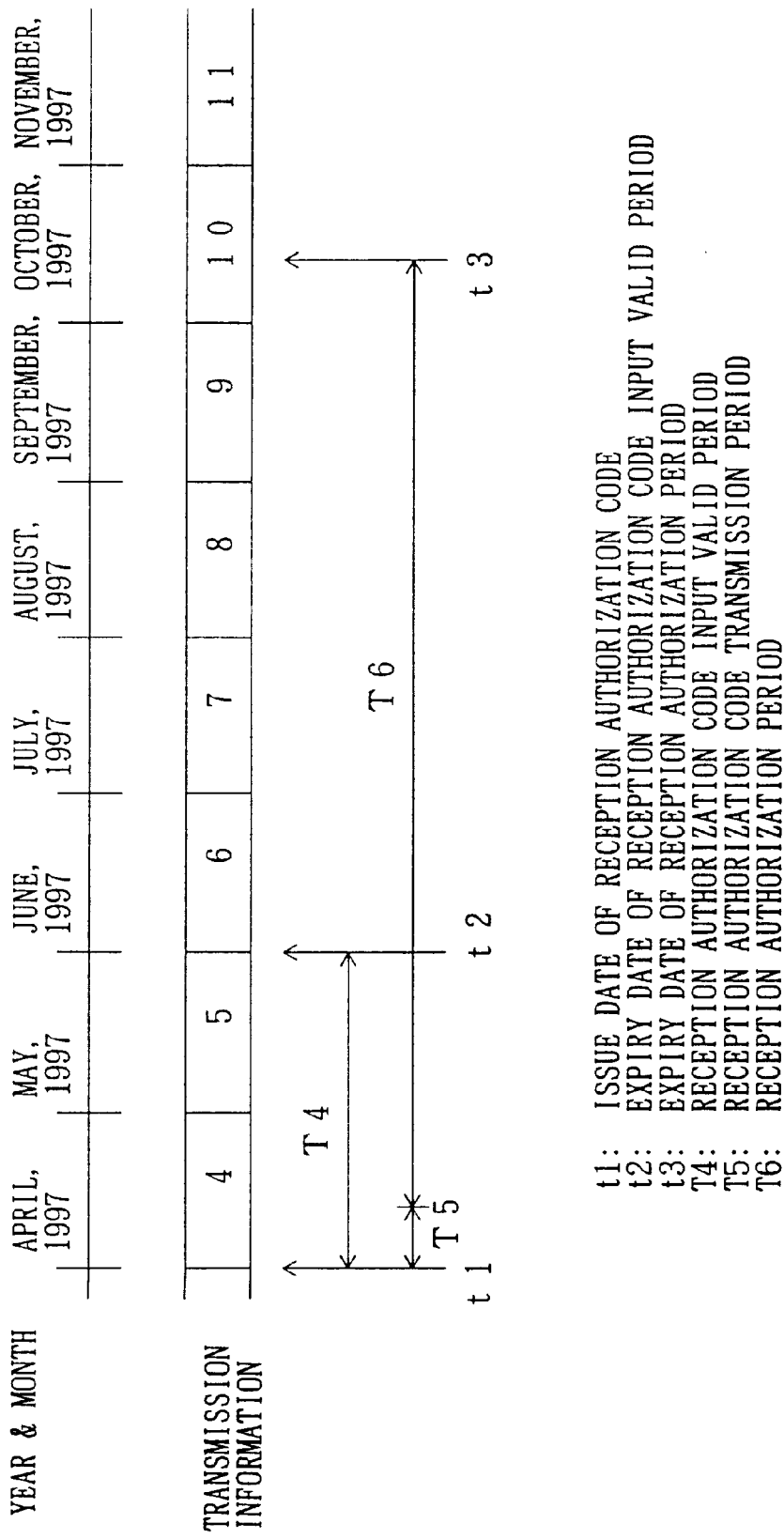
FIG. 36 is a timing chart of an example operation with the reception authorization code.

FIG. 36 is a timing chart showing an example operation with the reception authorization code generated and used in the above manner. To begin with, upon confirmation of the payment of the reception charge from the user, the provider synthesizes the reception authorization code at the timing denoted as t1, and issues the same to the user. The transmission information used in the synthesizing in case of FIG. 36 is month and year information, that is, April, 1997. Thus, the transmission information changes when the month changes to May.

However, in the present embodiment, as previously shown in FIG. 35, the previous transmission information within the predetermined reception authorization code input valid period is computed and used to decode the reception authorization code. Therefore, the reception authorization code input valid period is determined depending on how many months the date should be backdated to compute the transmission information. In case of the example in FIG. 36, the transmission information is computed by backdating one month. Thus, the end of May denoted as t2 is the expiry date of the reception authorization code input valid period, and a period denoted as T4 since the issuing date till the expiry date of the input valid period is the reception authorization code input valid information period.

In other words, since the transmission information is the month and year information, the transmission information is updated monthly. If the reception authorization code input valid period is, for example, "4 months from the issuing date of the reception authorization code", the decoding is allowed up to 4 times from the equation, (4 months)÷(1 month), that is, the computation of the transmission information with the backdating is allowed up to 3 times. In case of FIG. 36, the reception authorization code input valid period is "2 months from the issuing date of the reception authorization code", and the decoding is allowed up to 2 times from the equation, (2 months) ÷(1 month), that is, the computation of the transmission information in the past at the receiver terminal's end is allowed once.

Then, even if the reception authorization code is inputted in May, the backdated transmission information in April computed based on the transmission information in May is also used to decode the reception authorization code to the reception authorization information in a correct manner.

When a correct reception authorization code is inputted within the reception authorization code input valid period T4, the expiration date of the reception authorization period set in the expiration date information in the reception authorization information is updated to a point denoted as t3, which is a sum of the transmission period T5 and the reception valid period T6 from the issuing date t1 of the reception authorization code.

Since a predetermined reception authorization code input valid period is set in the reception authorization code, if the user erroneously tries to set the reception authorization code whose expiry date has already passed the reception authorization code input valid period used once, an error is detected because the transmission information used for the reception authorization code is different, and the error is notified to the user by making an error sound or showing an error display as explained above. Consequently, it has become possible to prevent an inconvenience such that disables the user to receive the service information when the user erroneously sets the reception authorization code with the expired validity. At the same time, the occurrence of such an inconvenience is notified to the user, so that the user can input a correct reception authorization code again.

In addition, the reception authorization code input valid period can be set over the predetermined period for the transmission information that changes periodically. Thus, for example, when the reception authorization code is issued at the end of the month and the transmission information is going to change shortly, the reception authorization code can be inputted within the reception authorization code input valid period extended to the next month, or two months later. Consequently, it has become possible to set the reception authorization code input valid period by adding an input guarantee period to the original reception authorization code input valid period set for the transmission information used when the reception authorization code was issued.

The reception authorization code can be produced with the transmission information modified in such a manner that the reception authorization code input valid period is set as the provider desires by pre-setting the number of computation times of the transmission information at the receiver terminal U's end to a predetermined number. For example, the number of times of updating is set to once, that is, the number of computation times is set to twice. Then, when the reception authorization code is issued at the beginning of the month, the transmission information of the previous month is used in synthesizing the reception authorization code, and when the reception authorization code is issued at the end of the month, the transmission information of the current month is used in synthesizing. According to this arrangement, the reception authorization code input valid period can be limited to a month or so regardless of the issuing date. Consequently, the reception authorization code input valid period can be set arbitrarily without modifying the arrangement of the receiver terminal U.

As has been explained, like in the first embodiment, the reception authorization information is transmitted to each receiver terminal U not by using the broadcast waves of the FM teletext multiplex broadcasting, but via mail or through the personal computer communications. Consequently, it has become possible to provide more amount of service information or more accurate service information without reducing the transmission capacity of the restricted broadcasting. In addition, when the user has to set the reception authorization code in the above manner, an erroneous input can be prevented in a secure manner because the error detection sign is appended to the reception authorization information.

Further, in the present embodiment, the reception authorization information is encoded with the terminal unique information and transmission information. Thus, if the terminal unique information is generated based on the information the user can learn, such as the production number, and the user finds out the terminal unique information and tries to use the same fraudulently, he can not obtain correctly decoded reception authorization information because the reception authorization information is also encoded with the transmission information, and such a user is not authorized to receive the service information. Consequently, only the service information under contract can be received from the provider at the contracted receiver terminal for exactly the contracted period, thereby ensuring high security.

Further, like in the first embodiment, the processing circuit 33 for assembling the character data by decoding the data of the restricted broadcasting using the FM teletext multiplex broadcasting is used to decode the reception authorization code to the reception authorization information, and the input device 35 realized by a switch key for station selection or volume control is used to input the reception authorization code. Thus, a typical receiver terminal for the FM teletext multiplex broadcasting can be used without providing any additional component, thereby suppressing an increase of the cost.

Referring to FIGS. 37 through 40, the following description will describe an eighth embodiment of the present invention. Hereinafter, like components are labeled with like reference numerals with respect to the above embodiments, and the description of these components is not repeated for the explanation's convenience.

The arrangement of the present embodiment is substantially the same as that of the seventh embodiment, and the difference will be explained mainly in the following.

The arrangement of the reception authorization information is basically the same as the arrangement shown in FIG. 15 in the first embodiment.

FIG. 37 is a view showing an example arrangement of a reception authorization code used in the present embodiment. In the present embodiment, the reception authorization code is composed of more than one (herein, two) unit reception authorization code.

Figure 38:
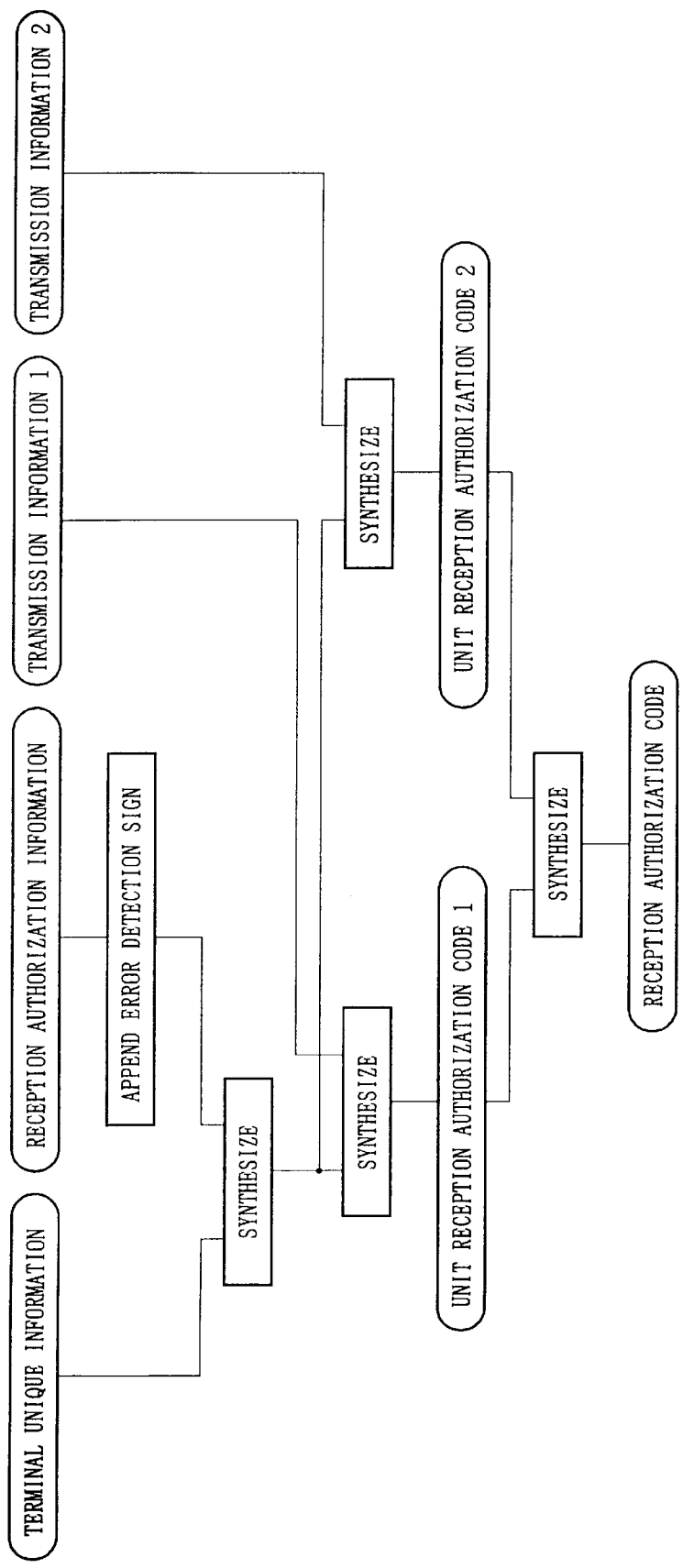
FIG. 38 is a view showing a procedure of generating the reception authorization code of FIG. 37.

As shown in FIG. 38, each unit reception authorization code is assembled by synthesizing a different kind of transmission information and a result of the synthesizing of the reception authorization information appended with the error detection sign and the terminal unique information. The change of the transmission information is known to the provider at least, and can be realized by date (month and year) information in the additional information. The unit reception authorization codes are synthesized in the manner shown in FIG. 37, whereby a reception authorization code to be allocated to each user is generated.

For example, assume that the transmission information represents the month and year, thereby changing monthly, and the reception authorization code is issued in April, 1997. Then, the transmission information stored in the first unit reception authorization code shows April, 1997, and the transmission information stored in the second unit reception code shows the next period, that is, May, 1997. This arrangement allows the user to input the reception authorization code over more than one period (herein, two periods in April and May, 1997) as will be described below.

Figure 39:
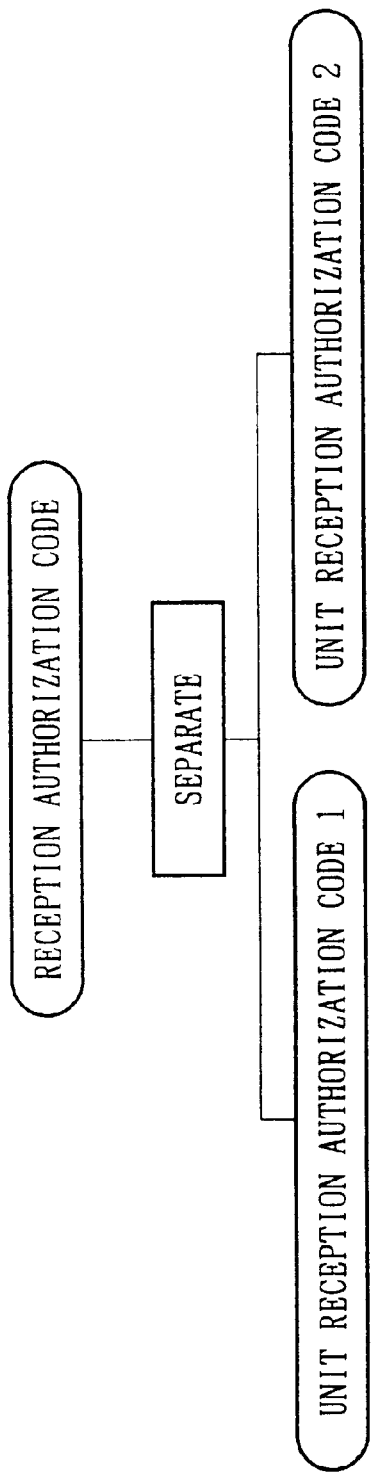
FIG. 39 is a view showing processing prior to the decoding of the reception authorization code of FIG. 37.
Figure 40:
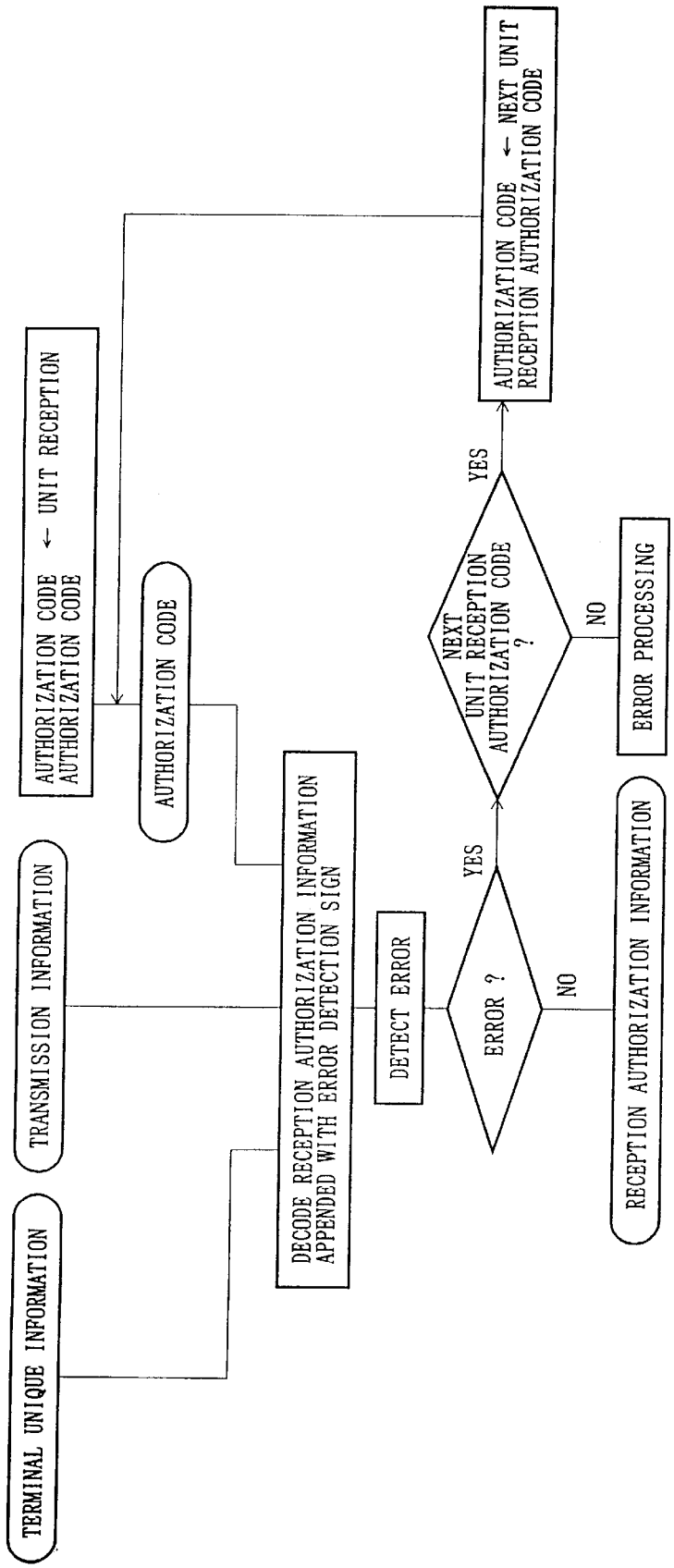
FIG. 40 is a view showing a procedure of decoding the reception authorization code of FIG. 37.

Upon receipt of the reception authorization code, the reception authorization code is separated to each unit reception authorization code at the receiver terminal U's end as shown in FIG. 39. Then, as shown in FIG. 40, each reception authorization code is decoded to the reception authorization information sequentially.

More specifically, the first unit reception authorization code is set to an authorization code, which is decoded to the reception authorization information with the terminal unique information and transmission information. When no error is detected, the decoded reception authorization information is set into the memory M1 as correct reception authorization information. When an error is detected, the next unit reception authorization code is read out. When there is no next unit reception authorization code, the error processing is carried out. When the next unit reception authorization code is read out, the unit reception authorization code is set to the authorization code, and the decoding is carried out again. If the decoding is carried out using the same transmission information as the one used when generating any of the unit reception authorization code in the above manner. In other words, if a correct reception authorization code is set within the reception authorization code input valid period, which is determined by the number of separated unit reception authorization codes and the number of times of the decoding processing, correctly decoded reception authorization information can be obtained.

Like in the seventh embodiment, the input valid period can be also set in the reception authorization code herein. The reception authorization code may be composed of at least three unit reception authorization codes having up to a predetermined number of bits. Further, the transmission information does not have to change monthly, and it can change bimonthly or quarterly, for example.

Furthermore, not all of the reception authorization information, terminal unique information, and transmission information have to be encoded and encoding at least one of them will do, or the synthesized reception authorization code may be encoded. The encoding processing is carried out by, for example, rearranging the data rows in a predetermined order, or by logically synthesizing the data rows and a pattern generated by a PN code generating circuit, which is in effect a predetermined random number generating circuit. In short, any method will do as long as the reception authorization information is not readily decoded from the reception authorization code.

When arranged in the above manner, even if the terminal unique information is generated based on the information the user can learn, such as the production number, and the user finds out the error detection sign, such as the CRC sign, he can not obtain correctly decoded reception authorization information, thereby making it possible to improve the confidentiality and further ensure the prevention of a fraudulent use.

The present invention is not limited to the restricted broadcasting using the FM teletext multiplex broadcasting, and is also available to other kinds of multiplex broadcasting for providing the service information using the blank periods (intervals) among the broadcasting waves, such as multiplex broadcasting for a TV set. Further, the transmission information is not limited to the time information in the additional information, and for example, the program index information can be used if it is updated periodically.

As has been explained, a first method of transmitting/receiving service information of the present invention is a method for enabling a certain receiver terminal to receive the service information transmitted from a provider, characterized in that:

at the provider's end, a reception authorization code is generated by appending a predetermined error detection sign to reception authorization information authorizing the reception of the service information, and then synthesizing the above reception authorization information and terminal unique information unique to each authorized receiver terminal, which is given to each user of the authorized receiver terminal; and at the receiver terminal's end, after the user sets the given reception authorization code to the receiver terminal, the set reception authorization code is decoded to the reception authorization information using the prestored terminal unique information and the error detection is carried out, so that the receiver terminal is enabled to receive the service information when the decoded reception authorization information shows the reception authorization and no error is detected.

According to the above arrangement, in the method of transmitting/receiving the service information suitably applied to the restricted broadcasting using the FM teletext multiplex broadcasting, at the provider's end, such as a broadcast station, the payment condition of the reception charge or contract contents of each user, for example, whether the user wishes to use all kinds or particular kinds of the service information, are stored, and the reception authorization information is generated based on the expiration date of a reception authorization period or available service contents corresponding to the payment condition. Then, after an error detection sign is appended to the reception authorization information thus generated, the reception authorization information is synthesized with terminal unique information unique to the receiver terminal each user owns, such as a production number, whereby a reception authorization code is generated. The reception authorization code is notified to the user via mail or through personal computer communications.

At the receiver terminal's end, such as a listener, upon receipt of the reception authorization code, the user inputs the reception authorization code using input means, such as station selection buttons, whereby the reception authorization code is set to the receiver terminal. In response to the input, the receiver terminal decodes the reception authorization code to the reception authorization information using the terminal unique information pre-stored therein, and carries out the error detection using the error detection sign. The receiver terminal is enabled to receive the service information with the service identification corresponding to the reception authorization information when the decoded reception authorization information shows the reception authorization and no error is detected.

Thus, the reception authorization code is not transmitted with the service information, more specifically, in case of the FM teletext multiplex broadcasting, the reception authorization code is not transmitted on the broadcasting waves, but notified to the authorized users only via mail or through personal computer communications. Consequently, a transmission capacity of the service information is not reduced. In addition, a microcomputer or the like, which decodes and converts the service information received at receiving means to the data like character data usable by the user, is used to decode the reception authorization code to the reception authorization information, and the station selection buttons or the like are used to input the reception authorization code. Thus, the cost increase of the receiver terminal can be curbed.

Further, the reception authorization information is encoded with the terminal unique information. Therefore, if the user inputs the reception authorization code erroneously, or tries to use the same fraudulently, the user is not authorized to receive the service information unless he inputs a correct reception authorization code. Consequently, only the service information under contract can be received from the provider for exactly the contracted period, thereby ensuring high security.

A second method of transmitting/receiving service information is characterized in that at least one of the reception authorization information and terminal unique information is encoded.

According to the above arrangement, if the terminal unique information is generated based on the information the user can learn, such as a production number, and the user finds out the terminal unique information and tries to obtain the decoded reception authorization information using the terminal unique information thus found arid set the reception authorization code fraudulently after the validity expires, the user can not find a correct reception authorization code because at least one of the terminal unique information and reception authorization information is encoded. Consequently, it has become possible to prevent unauthorized use even when the terminal unique information is generated based on the information the user can learn, such as the production number.

Further, a third method of transmitting/receiving service information is characterized in that the reception authorization code is also encoded.

According to the above arrangement, even if the user with the knowledge of the encoding/decoding technique finds a cyclic code used for the encoding in the second method, unauthorized use can be prevented in a more secure manner because the reception authorization code is encoded entirely.

Also, a fourth method of transmitting/receiving service information is characterized in that a transmitting medium of the service information is a restricted broadcasting using a teletext multiplex broadcasting in a frequency modulation broadcasting.

According to the above arrangement, the technique of the present invention is quite advantageous in the teletext multiplex broadcasting in the frequency modulation broadcasting having a very small transmission capacity of the service information compared with the satellite broadcasting and the like. This is because the reception authorization code does not have to be transmitted.

A first system of transmitting/receiving service information is a system for enabling a certain receiver terminal to receive the service information transmitted from a provider, characterized in that:

the provider includes, an information generating source of the service information to be transmitted, transmitting means for transmitting the service information after appending service identification indicating that only a predetermined user is authorized to receive the service information, a user file for storing terminal unique information unique to the receiver terminal owned by each user and available service contents to each user, and reception authorization code generating means for generating a reception authorization code by reading out the terminal unique information and service contents stored in the user file, generating reception authorization information corresponding to the service contents, and synthesizing the reception authorization information appended with an error detection sign with the terminal unique information, and also for giving the reception authorization code to each user of the authorized receiver terminal; and each receiver terminal includes, receiving means for receiving the service information having the same service identification and notifying the receipt of the service information to the user, input means for enabling the user to input the reception authorization code, storage means for pre-storing the terminal unique information unique to each receiver terminal, and reception authorization code decoding means for decoding the input reception authorization code to the reception authorization information using the terminal unique information stored in the storage means and carrying out the error detection to enable the receiving means to receive the service information when the decoded reception authorization information shows the reception authorization and no error is detected.

According to the above arrangement, in a system for transmitting/receiving the service information suitably used as a transmitting/receiving system for the restricted broadcasting using the FM teletext multiplex broadcasting, at the provider's end, such as a broadcast station, the payment condition of the reception charge or contract contents of each user, for example, whether the user wishes to use all kinds or particular kinds of the service information, are stored, and the reception authorization code generating means generates the reception authorization information based on the expiry date of a reception authorization period or available service contents corresponding to the payment condition. Then, after appending an error detection sign to the reception authorization information thus generated, the reception authorization code generating means synthesizes the reception authorization information with terminal unique information unique to the receiver terminal owned by each user, such as a production number, whereby a reception authorization code is generated. The reception authorization code is notified to the user via mail or through personal computer communications.

At the receiver terminal's end, such as a listener, upon receipt of the reception authorization code, the user inputs the reception authorization code using input means. In response to the input, the reception authorization code decoding means decodes the reception authorization code to the reception authorization information using the terminal unique information pre-stored in the storage means, and carries out the error detection using the error detection sign. The reception authorization code decoding means enables the receiving means to receive the service information with the service identification corresponding to the reception authorization information when the decoded reception authorization information shows the reception authorization and no error is detected.

Thus, the reception authorization code is not transmitted with the service information, more specifically, in case of the FM teletext multiplex broadcasting, the reception authorization code is not transmitted on the broadcasting waves, but notified to the authorized users only via mail or through personal computer communications. Consequently, a transmission capacity of the service information is not reduced. In addition, a microcomputer or the like, which decodes and converts the service information received at the receiving means to the data like character data usable by the user, is used to decode the reception authorization code to the reception authorization information, and the station selection buttons or the like are used to input the reception authorization code. Thus, the cost increase of the receiver terminal can be curbed.

Further, the reception authorization information is encoded with the terminal unique information. Therefore, if the user inputs the reception authorization code erroneously, or tries to use the same fraudulently, the user is not authorized to receive the service information unless he inputs a correct reception authorization code. Consequently, only the service information under contract can be received from the provider for exactly the contracted period, thereby ensuring high security.

A second system of transmitting/receiving service information is characterized in that:

the provider further includes first encoding means for encoding at least one of the reception authorization information and terminal unique information; and each receiver terminal further includes first decoding means for decoding the reception authorization information and/or terminal unique information encoded by the first encoding means.

According to the above arrangement, if the terminal unique information is generated based on the information the user can learn, such as a production number, and the user finds out the terminal unique information and tries to obtain the decoded reception authorization information using the terminal unique information thus found and set the reception authorization code fraudulently after the validity expires, the user can not find a correct reception authorization code because at least one of the terminal unique information and reception authorization information is encoded. Consequently, it has become possible to prevent unauthorized use even when the terminal unique information is generated based on the information the user can learn, such as the production number.

Further, a third system of transmitting/receiving service information is characterized in that:

the provider further includes second encoding means for encoding the reception authorization code; and each receiver terminal further includes second decoding means for decoding the reception authorization code encoded by said second encoding means.

According to the above arrangement, even if the user with the knowledge of the encoding/decoding technique finds a cyclic code used for the encoding in the second system, unauthorized use can be prevented in a more secure manner because the reception authorization code is encoded entirely.

Also, a fourth system of transmitting/receiving service information is characterized in that a transmitting medium of the service information is a restricted broadcasting using a teletext multiplex broadcasting in a frequency modulation broadcasting.

According to the above arrangement, the technique of the present invention is quite advantageous in the teletext multiplex broadcasting in the frequency modulation broadcasting having a very small transmission capacity of the service information compared with the satellite broadcasting and the like, because the reception authorization code does not have to be transmitted.

A first receiving apparatus of service information is an apparatus for receiving the service information transmitted from a provider characterized by comprising:

receiving means for receiving the service information with service identification indicating that only a predetermined user is authorized to receive the service information and notifying the receipt of the service information;

input means through which a reception authorization code given to each user is inputted;

storage means for storing pre-assigned terminal unique information; and reception authorization code decoding means for decoding the input reception authorization code to the reception authorization information using the terminal unique information stored in the storage means and carrying out the detection error, and also for enabling the receiving means to receive the service information when the decoded reception authorization information shows reception authorization and no error is detected.

According to the above arrangement, in a receiving apparatus of the service information suitably used as a receiving apparatus for the restricted broadcasting using the FM teletext multiplex broadcasting, upon receipt of the reception authorization code given from the provider, such as a broadcast station, via mail or personal computer communications, the user inputs the reception authorization code through the input means. In response to the input, the reception authorization code decoding means decodes the reception authorization code to the reception authorization information using the terminal unique information stored the storage means, and carries out the error detection using the error detection sign. The reception authorization code decoding means enables the receiving means to receive the service information with the service identification corresponding to the reception authorization information when the decoded reception authorization information shows the reception authorization and no error is detected.

Thus, the reception authorization code is not transmitted with the service information, more specifically, in case of the FM teletext multiplex broadcasting, the reception authorization code is not transmitted on the broadcasting waves, but notified to the authorized users only via mail or through personal computer communications. Consequently, a transmission capacity of the service information is not reduced. In addition, a microcomputer or the like, which decodes and converts the service information received at the receiving means to the data like character data usable by the user, is used to decode the reception authorization code to the reception authorization information, and the station selection buttons or the like are used to input the reception authorization code. Thus, the cost increase of the receiver terminal can be curbed.

Further, the reception authorization information is encoded with the terminal unique information. Therefore, if the user inputs the reception authorization code erroneously, or tries to use the same fraudulently, the user is not authorized to receive the service information unless he inputs a correct reception authorization code. Consequently, only the service information under contract can be received from the provider for exactly the contracted period, thereby ensuring high security.

A fifth method of transmitting/receiving service information is a method of enabling a certain receiver terminal to receive the service information transmitted on multiplex broadcast waves from a provider, characterized in that:

at the provider's end, a reception authorization code is generated by synthesizing reception authorization information authorizing the reception of the service information and appended with a predetermined error detection sign, terminal unique information unique to each authorized receiver terminal, and generally available transmission information that changes periodically, which is given to the user of each authorized receiver terminal; and at the receiver terminal's end, after the given reception authorization code is set to the receiver terminal by the user, the receiver terminal decodes the set reception authorization code using the terminal unique information pre-stored therein and the received transmission information, and then carries out the error detection, and is enabled to receive the service information when the decoded reception authorization information shows the reception authorization and no error is detected.

According to the above arrangement, in a method of transmitting/receiving the service information suitably applied to the restricted broadcasting using the FM teletext multiplex broadcasting, at the provider's end, such as a broadcast station, the payment condition of the reception charge or contract contents of each user, for example, whether the user wishes to use all kinds or particular kinds of the service information, are stored, and the reception authorization information is generated based on the expiration date of a reception authorization period or available service contents corresponding to the payment condition. Then, after an error detection sign is appended to the reception authorization information thus generated, the reception authorization information is synthesized with terminal unique information unique to each receiver terminal, such as a production number, and the generally available transmission information that changes periodically, such as date (month and year) information, whereby a reception authorization code is generated. The reception authorization code is notified to the user via mail or through personal computer communications.

At the receiver terminal's end, such as a listener, upon receipt of the reception authorization code, the user inputs the reception authorization code using input means, such as station selection buttons, whereby the reception authorization code is set to the receiver terminal. In response to the input, the receiver terminal decodes the reception authorization code to the reception authorization information using the terminal unique information pre-stored therein and the received transmission information, and carries out the error detection using the error detection sign. The receiver terminal is enabled to receive the service information with the service identification corresponding to the reception authorization information when the decoded reception authorization information shows the reception authorization and no error is detected.

Thus, the reception authorization code is not transmitted with the service information. More specifically, in the case of the FM teletext multiplex broadcasting, the reception authorization code is not transmitted on the broadcasting waves, but is notified to the authorized users only via mail or through personal computer communications. Consequently, a transmission capacity of the service information is not reduced. In addition, a microcomputer or the like, which decodes and converts the service information received at receiving means to the data like character data usable by the user, is used to decode the reception authorization code to the reception authorization information, and the station selection buttons or the like are used to input the reception authorization code. Thus, the cost increase of the receiver terminal can be curbed.

Further, the reception authorization information is encoded with the terminal unique information and the transmission information. Therefore, if the terminal unique information is generated based on the information the user can learn, such as a production number, and the user finds out the terminal unique information and tries to use the same fraudulently, the user can not obtain correctly decoded reception authorization information because the reception authorization information is also encoded with the transmission information. Thus, the user is not authorized to receive the service information. Consequently, only the service information under contract can be received from the provider for exactly the contracted period, thereby ensuring high security.

If the transmission information changes, the user can not obtain the correct reception authorization information even when the same terminal unique information is used. This sets a certain input valid period for the reception authorization code, and therefore, can prevent an inconvenience such that disables the user to receive the service information because he has erroneously set the reception authorization code whose reception authorization period has already expired. Moreover, the occurrence of such an inconvenience is notified to the user, so that he can input a correct reception authorization code again.

A sixth method of transmitting/receiving service information is characterized in that at least one of the reception authorization information, terminal unique information, and transmission information is encoded.

According to the above arrangement, if the terminal unique information is generated based on the information the user can learn, such as a production number, and the user finds out the terminal unique information and tries to obtain the decoded reception authorization information using the terminal unique information thus found and set the reception authorization code fraudulently after the validity expires, the user can not find a correct reception authorization code because at least one of the terminal unique information, transmission information, and reception authorization information is encoded. Consequently, it has become possible to prevent unauthorized use even when the terminal unique information is generated based on the information the user can learn, such as the production number.

A seventh method of transmitting/receiving service information is characterized in that the reception authorization code is also encoded.

According to the above arrangement, even if the user with the knowledge of the encoding/decoding technique finds a cyclic code used for the encoding in the sixth method, unauthorized use can be prevented in a more secure manner because the reception authorization code is encoded entirely.

Also, an eighth method of transmitting/receiving service information is characterized in that a transmitting medium of the service information is a restricted broadcasting using a teletext multiplex broadcasting in a frequency modulation broadcasting.

According to the above arrangement, the technique of the present invention is quite advantageous in the teletext multiplex broadcasting in the frequency modulation broadcasting having a very small transmission capacity of the service information compared with the satellite broadcasting and the like, because the reception authorization code does not have to be transmitted.

A fifth system of transmitting/receiving service information is a system for enabling a certain receiver terminal to receive the service information transmitted on multiplex broadcasting waves from a provider, characterized in that:

the provider includes, an information generating source for the service information to be transmitted, transmitting means for transmitting the service information after appending service identification indicating that only a predetermined user is authorized to receive the service information, a user file for storing terminal unique information unique to the receiver terminal owned by each user and available service contents to each user, and reception authorization code generating means for generating a reception authorization code by reading out the terminal unique information and service contents stored in the user file, generating reception authorization information corresponding to the service contents, synthesizing the reception authorization information thus generated and appended with a predetermined error detection sign with the terminal unique information and generally available transmission information which changes periodically, and also for giving the reception authorization code to each user of the authorized receiver terminal; and each receiver terminal includes,
  receiving means for receiving the service information with the same service identification and notifying the receipt of the service information,
  input means for enabling the user to input the reception authorization code;
  storage means for pre-storing the terminal unique information unique to each receiver terminal, and reception authorization code decoding means for decoding the input reception authorization code to the reception authorization information using the terminal unique information stored in the storage means and the received transmission information, carrying out the error detection, and enabling the receiving means to receive the service information when the decoded reception authorization information shows the reception authorization and no error is detected.

According to the above arrangement, in a system for transmitting/receiving the service information suitably used as a transmitting/receiving system for a restricted broadcasting using the FM teletext multiplex broadcasting, at the provider's end, such as a broadcast station, the payment condition of the reception charge or contract contents of each user, for example, whether the user wishes to use all kinds or particular kinds of the service information, are stored, and the reception authorization information is generated based on the expiry date of a reception authorization period or available service contents corresponding to the payment condition. Then, after an error detection sign is appended to the reception authorization information thus generated, the reception authorization information is synthesized with terminal unique information unique to each receiver terminal, such as a production number, and the generally available transmission information which changes periodically, such as date (month and year) information, whereby a reception authorization code is generated. The reception authorization code is notified to the user via mail or through personal computer communications.

At the receiver terminal's end, such as a listener, upon receipt of the reception authorization code, the user inputs the reception authorization code using input means. In response to the input, the reception authorization code decoding means decodes the reception authorization code to the reception authorization information using the terminal unique information pre-stored in the storage means and the received transmission information, and carries out the error detection using the error detection sign. The reception authorization code decoding means enables the receiving means to receive the service information with the service identification corresponding to the reception authorization information when the decoded reception authorization information shows the reception authorization and no error is detected.

Thus, the reception authorization code is not transmitted with the service information, more specifically, in case of the FM teletext multiplex broadcasting, the reception authorization code is not transmitted on the broadcasting waves, but notified to the authorized users only via mail or through personal computer communications. Consequently, a transmission capacity of the service information is not reduced. In addition, a microcomputer or the like, which decodes converts the service information received at receiving means to the data like character data usable by the user, is used to decode the reception authorization code to the reception authorization information, and the station selection buttons or the like are used to input the reception authorization code. Thus, the cost increase of the receiver terminal can be curbed.

Further, the reception authorization information is encoded with the terminal unique information and transmission information. Therefore, if the terminal unique information is generated based on the information the user can learn, such as a production number, and the user finds out the terminal unique information and tries to use the same fraudulently, the user can not obtain correctly decoded reception authorization information because the reception authorization information is also encoded with the transmission information. Thus, the user is not authorized to receive the service information. Consequently, only the service information under contract can be received from the provider for exactly the contracted period, thereby ensuring high security.

If the transmission information changes, the user can not obtain the correct reception authorization information even when the same terminal unique information is used. This sets a certain input valid period for the reception authorization code, and therefore, can prevent an inconvenience such that disables the user to receive the service information because he has erroneously set the reception authorization code whose reception authorization period has already expired. Moreover, the occurrence of such an inconvenience is notified to the user, so that he can input a correct reception authorization code again.

A sixth system of transmitting/receiving service information is characterized in that:
  the provider further includes first encoding means for encoding at least one of the reception authorization information, terminal unique information, and transmission information; and
  each receiver terminal further includes first decoding means for decoding the reception authorization information and/or terminal unique information when the reception authorization information and/or terminal unique information are encoded by the first encoding means, and when the transmission information is encoded by the first encoding means, for encoding the received transmission information in the same manner as the first encoding means.

According to the above arrangement, if the terminal unique information is generated based on the information the user can learn, such as a production number, and the user finds out the terminal unique information and tries to obtain the decoded reception authorization information using the terminal unique information thus found and set the reception authorization code fraudulently after the validity expires, the user can not find a correct reception authorization code because at least one of the terminal unique information, transmission information, and reception authorization information is encoded. Consequently, it has become possible to prevent unauthorized use even when the terminal unique information is generated based on the information the user can learn, such as the production number.

Further, a seventh system of transmitting/receiving the service information is characterized in that:
  the provider further includes second encoding means for encoding the reception authorization code; and
  each receiver terminal further includes second decoding means for decoding the reception authorization code encoded by said second encoding means.

According to the above arrangement, even if the user with the knowledge of the encoding/decoding technique finds a cyclic code used for the encoding in the sixth system, unauthorized use can be prevented in a more secure manner because the reception authorization code is encoded entirely.

Also, an eighth system of transmitting/receiving service information is characterized in that a transmitting medium of the service information is a restricted broadcasting using a teletext multiplex broadcasting in a frequency modulation broadcasting.

According to the above arrangement, the technique of the present invention is quite advantageous in the teletext multiplex broadcasting in the frequency modulation broadcasting having a very small transmission capacity of the service information compared with the satellite broadcasting and the like, because the reception authorization code does not have to be transmitted.

A second receiving apparatus of service information is an apparatus for receiving the service information transmitted from a provider, characterized by comprising:

receiving means for receiving the service information with service identification indicating that only a predetermined user is authorized to receive the service information and notifying the receipt of the service information;

input means through which a reception authorization code given to each user is inputted;

storage means for storing pre-assigned terminal unique information; and reception authorization code decoding means for decoding the input reception authorization code to the reception authorization information using the terminal unique information stored in the storage means and received generally available transmission information that changes periodically, and carrying out the error detection, and also for enabling the receiving means to receive the service information when the decoded reception authorization information shows reception authorization and no error is detected.

According to the above arrangement, in a receiving apparatus of the service information suitable used as a receiving apparatus for a restricted broadcasting using an FM teletext multiplex broadcasting, upon receipt of the reception authorization code given from the provider, such as a broadcast station, via mail or through personal computer communications, the user inputs the reception authorization code through the input means. In response to the input, the reception authorization code decoding means decodes the reception authorization code to the reception authorization information using the terminal unique information pre-stored in the storage means and the received transmission information that changes periodically, and carries out the error detection using the error detection sign. The reception authorization code decoding means enables the receiving means to receive the service information with the service identification corresponding to the reception authorization information when the decoded reception authorization information shows the reception authorization and no error is detected.

Thus, the reception authorization code is not transmitted with the service information, more specifically, in case of the FM teletext multiplex broadcasting, the reception authorization code is not transmitted on the broadcasting waves, but notified to authorized users only via mail or through personal computer communications. Consequently, a transmission capacity of the service information is not reduced. In addition, a microcomputer or the like, which converts the service information received at the receiving means to the data usable by the user, is used to decode the reception authorization code to the reception authorization information. Thus, the cost increase of the receiver terminal can be curbed.

Further, the reception authorization information is encoded with the terminal unique information and transmission information. Therefore, if the terminal unique information is generated based on the information the user can learn, such as a production number, and the user finds out the terminal unique information and tries to use the same fraudulently, the user can not obtain correctly decoded reception authorization information because the reception authorization information is encoded also with the transmission information. Consequently, only the service information under contract can be received from the provider for exactly the contracted period, thereby ensuring high security.

If the transmission information changes, the user can not obtain the correct reception authorization information even when the same terminal unique information is used. This sets a certain valid input period for the reception authorization code, and therefore, can prevent an inconvenience such that disables the user to receive the service information because he has erroneously set the reception authorization code whose reception authorization period has already expired. Moreover, the occurrence of such an inconvenience is notified to the user, so that he can input a correct reception authorization code again.

A ninth method of transmitting/receiving service information is a method of enabling a certain receiver terminal to receive the service information transmitted on multiplex broadcasting waves from the provider, characterized in that:

at the provider's end, a reception authorization code is generated by synthesizing reception authorization information authorizing the receipt of the service information and appended with a predetermined error detection sign, terminal unique information unique to each authorized receiver terminal, and transmission information that changes periodically, such a change being known to both the provider and receiver terminal, and the reception authorization code is given to the user of each authorized receiver terminal; and at the receiver terminal's end, the user sets the given reception authorization code to the receiver terminal, and the receiver terminal decodes the set reception authorization code to the reception authorization information using the pre-stored terminal unique information, received transmission information, and the transmission information which can be computed from the received transmission information or the transmission information used in each of periodic cycles preceding up to a certain allowed number, after which the error detection is carried out, and the receiver terminal is enabled to receive the service information when any of the decoded reception authorization information shows the reception authorization a nd no error is detected.

According to the above arrangement, in a method of transmitting/receiving the service information suitably applied to the restricted broadcasting using the FM teletext multiplex broadcasting, at the provider's end, such as a broadcast station, the payment condition of the reception charge or contract contents of each user, for example, whether the user wishes to use all kinds or particular kinds of the service information, are stored, and the reception authorization information is generated based on the expiry date of a reception authorization period or available service contents corresponding to the payment condition. Then, after an error detection sign is appended to the reception authorization information thus generated, the reception authorization information is synthesized with terminal unique information unique to each receiver terminal, such as a production number, and the transmission information that changes periodically, such a change being known to both the provider and receiver terminal, such as date (month and year) information, whereby a reception authorization code is generated. The reception authorization code is notified to the user via mail or through personal computer communications.

At the receiver terminal's end, such as a listener, upon receipt of the reception authorization code, the user inputs the reception authorization code using input means, such as station selection buttons, whereby the reception authorization code is set to the receiver terminal. In response to this input, the receiver terminal decodes the reception authorization code to the reception authorization information using the terminal unique information pre-stored therein and the received transmission information, and carries out the error detection using the error detection sign. The receiver terminal is enabled to receive the service information with the service identification corresponding to the reception authorization information when the decoded reception authorization information shows the reception authorization and no error is detected.

If there is an error and correctly decoded reception authorization information can not be obtained, the receiver terminal computes the transmission information in the cyclic period preceding to the current cyclic period for the received transmission information, and decodes the reception authorization code to the reception authorization information using the preceding transmission information and terminal unique information. If correctly decoded reception authorization information still can not be obtained, the transmission information in each of the cyclic periods preceding up to a certain allowed number is computed sequentially, and the decoding processing is carried out in the same manner.

Thus, the reception authorization code is not transmitted with the service information. More specifically, in the case of the FM teletext multiplex broadcasting, the reception authorization code is not transmitted on the broadcasting waves, but notified to authorized users only via mail or through personal computer communications. Consequently, a transmission capacity of the service information is not reduced. In addition, a microcomputer or the like, which decodes and converts the service information received at receiving means to the data like character data usable by the user, is used to decode the reception authorization code to the reception authorization information, and the station selection buttons or the like are used to input the reception authorization code. Thus, the cost increase of the receiver terminal can be curbed.

Further, the reception authorization information is encoded with the terminal unique information and transmission information. Therefore, if the terminal unique information is generated based on the information the user can learn, such as a production number, and the user finds out the terminal unique information and tries to use the same fraudulently, he can not obtain correctly decoded reception authorization information because the reception authorization information is encoded also with the transmission information. Thus, the user is not authorized to receive the service information. Consequently, only the service information under contract can be received from the provider for exactly the contracted period, thereby ensuring high security.

If the transmission information changes, the user can not obtain the correct reception authorization information even when the same terminal unique information is used. This sets a certain input valid period for the reception authorization code, and therefore, can prevent an inconvenience such that disables the user to receive the service information because he has erroneously set the reception authorization code whose reception authorization period has already expired. Moreover, the occurrence of such an inconvenience is notified to the user, so that he can input a correct reception authorization code again.

Further, the reception authorization code can be inputted in a period corresponding to a product of the cyclic period and a certain number. For example, if the transmission information changes monthly, and the user inputs the reception authorization code given in the last month, given the constant number=1, then the transmission information in the last month when the reception authorization code was issued can be computed using the transmission information actually received in the current month. Consequently, apart from the cyclic period at which the transmission information changes, an input valid period for the reception authorization code can be set arbitrarily. For example, if the reception authorization code is issued at the end of the month, a minimum period can be guaranteed as the input valid period for the reception authorization code.

A tenth method of transmitting/receiving service information is a method of enabling a certain receiver terminal to receive the service information transmitted on multiplex broadcasting waves from a provider, characterized in that:

at the provider's end, a unit reception authorization code is generated by synthesizing reception authorization information authorizing the receipt of the service information and appended with a predetermined error detection sign, terminal unique information unique to each authorized receiver terminal, and transmission information within a certain period later, which changes periodically, such a change being known at least to the provider, and a reception authorization code, composed of a combination of the unit reception authorization codes for more than one period, is given to the user of each authorized receiver terminal; and at the receiver terminal's end, the user sets the given reception authorization code to the receiver terminal, and the receiver terminal decodes the each unit reception authorization code obtained, by separating the reception authorization code thus set, to the reception authorization information using the pre-stored terminal unique information and the received transmission information, after which the error detection is carried out, and the receiver terminal is enabled to receive the service information when any of the decoded reception authorization information shows the reception authorization and no error is detected.

According to the above arrangement, in a method of transmitting/receiving the service information suitably applied to the restricted broadcasting using the FM teletext multiplex broadcasting, at the provider's end, such as a broadcast station, the payment condition of the reception charge or contract contents of each user, for example, whether the user wishes to use all kinds or particular kinds of the service information, are stored, and the reception authorization information is generated based on the expiration date of a reception authorization period or available service contents corresponding to the payment condition. Then, after an error detection sign is appended to the reception authorization information thus generated, the reception authorization information is synthesized with terminal unique information unique to each receiver terminal, such as a production number, and the transmission information within a certain period later that changes periodically, such a change being known at least to the provider, such as date (month and year) information, whereby a unit reception authorization code is generated. The unit reception authorization codes are combined for the predetermined certain period and made into the reception authorization code, which is notified to the user via mail or through personal computer communications.

At the receiver terminal's end, such as a listener, upon receipt of the reception authorization code, the user inputs the reception authorization code using input means, such as station selection buttons, whereby the reception authorization code is set to the receiver terminal. In response to this input, the receiver terminal separates the reception authorization code to each unit reception authorization code, and decodes the first unit reception authorization code to the reception authorization information using the terminal unique information pre-stored therein and the received transmission information, and carries out the error detection using the error detection sign. The receiver terminal is enabled to receive the service information with the service identification corresponding to the reception authorization information when the decoded reception authorization information shows the reception authorization and no error is detected.

If there is an error and correctly decoded reception authorization information can not be obtained, the receiver terminal decodes the second unit reception authorization code to the reception authorization information using the terminal unique information and transmission information. If there is still an error, the same processing is carried out sequentially for the rest of the unit reception authorization codes.

Thus, the reception authorization code is not transmitted with the service information. More specifically, in the case of the FM teletext multiplex broadcasting, the reception authorization code is not transmitted on the broadcasting waves, but notified to authorized users only via mail or through personal computer communications. Consequently, a transmission capacity of the service information is not reduced. In addition, a microcomputer or the like, which decodes converts the service information received at receiving means to the data like character data usable by the user, is used to decode the reception authorization code to the reception authorization information, and the station selection buttons or the like are used to input the reception authorization code. Thus, the cost increase of the receiver terminal can be curbed.

Further, the reception authorization information is encoded with the terminal unique information and transmission information. Therefore, if the terminal unique information is generated based on the information the user can learn, such as a production number, and the user finds out the terminal unique information and tries to use the same fraudulently, he can not obtain correctly decoded reception authorization information because the reception authorization information is encoded also with the transmission information. Thus, the user is not authorized to receive the service information. Consequently, only the service information under contract can be received from the provider for exactly the contracted period, thereby ensuring high security.

If the transmission information changes, the user can not obtain the correct reception authorization information even when the same terminal unique information is used. This sets a certain input valid period for the reception authorization code, and therefore, can prevent an inconvenience such that disables the user to receive the service information because he has erroneously set the reception authorization code whose reception authorization period has already expired. Moreover, the occurrence of such an inconvenience is notified to the user, so that he can input a correct reception authorization code again.

Further, the reception authorization code can be inputted in a period corresponding to a product of the cyclic period and the number of unit reception authorization codes. For example, assume that the transmission information changes monthly, and the user inputs the reception authorization code given in the last month. Then, the first unit reception authorization code corresponding to the transmission information of the last month when the reception authorization code was issued can not be decoded correctly, but the second unit reception authorization code corresponding to the transmission information of the current month can be decoded correctly. Consequently, apart from the cyclic period at which the transmission information changes, an input valid period for the reception authorization code can be set arbitrarily. For example, if the reception authorization code is issued at the end of the month, a minimum period can be guaranteed as the input valid period for the reception authorization code.

An eleventh method of transmitting/receiving service information is characterized in that a transmitting medium of the service information is a restricted broadcasting using a teletext multiplex broadcasting in a frequency modulation broadcasting.

According to the above arrangement, the technique of the present invention is quite advantageous in the teletext multiplex broadcasting in the frequency modulation broadcasting having a very small transmission capacity compared with the satellite broadcasting and the like, because the reception authorization code does not have to be transmitted.

A ninth system of transmitting/receiving the service information is a system for enabling a certain receiver terminal to receive the service information transmitted on multiplex broadcasting waves from a provider, characterized in that:

the provider includes, an information generating source for the service information to be transmitted, transmitting means for transmitting the service information after appending service identification indicating that only a predetermined user is authorized to receive the service information, a user file for storing terminal unique information unique to the receiver terminal owned by each user and available service contents to each user, reception authorization code generating means for generating a reception authorization code by reading out the terminal unique information and service contents stored in the user file, generating reception authorization information corresponding to the service contents, and synthesizing the reception authorization information thus generated and appended with a predetermined error detection sign with the terminal unique information and transmission information which changes periodically, such a change being known to both the provider and receiver terminal, and for giving the reception authorization code to each user of the authorized receiver terminal; and each receiver terminal includes, receiving means for receiving the service information with the same service identification and notifying the receipt of the service information, input means for enabling the user to input the reception authorization code;

storage means for pre-storing the terminal unique information unique to each receiver terminal, and reception authorization code decoding means for decoding the input reception authorization code to the reception authorization information using the terminal unique information stored in the storage means, the received transmission information, and the transmission information which can be computed from the received transmission information or the transmission information used in each of the periodic cycles preceding up to a certain allowed number, and carrying out the error detection, and for enabling the receiving means to receive the service information when any of the decoded reception authorization information shows the reception authorization and no error is detected.

According to the above arrangement, in a system for transmitting/receiving the service information suitably used as a transmitting/receiving system for the restricted broadcasting using the FM teletext multiplex broadcasting, at the provider's end, such as a broadcast station, the payment condition of the reception charge or contract contents of each user, for example, whether the user wishes to use all kinds or particular kinds of the service information, are stored, and the reception authorization information is generated based on the expiration date of a reception authorization period or available service contents corresponding to the payment condition. Then, after an error detection sign is appended to the reception authorization information thus generated, the reception authorization information is synthesized with terminal unique information unique to each receiver terminal, such as a production number, and the transmission information which changes periodically, such a change being known to both the provider and receiver terminal, such as date (month and year) information, whereby a reception authorization code is generated. The reception authorization code is notified to the user via mail or through personal computer communications.

At the receiver terminal's end, such as a listener, upon receipt of the receipt authorization code, the user inputs the reception authorization code using input means, such as station selection buttons. In response to this input, the receiver terminal decodes the reception authorization code to the reception authorization information using the terminal unique information pre-stored in the storage means and the received transmission information, and carries out the error detection using the error detection sign. The receiver terminal enables the receiving means to receive the service information with the service identification corresponding to the reception authorization information when the decoded reception authorization information shows the reception authorization and no error is detected.

If there is an error and correctly decoded reception authorization information can not be obtained, the receiver terminal computes the transmission information in the cyclic period preceding to the current cyclic period for the received transmission information, and decodes the reception authorization code to the reception authorization information using the preceding transmission information and terminal unique information. If there is still an error, the same processing is carried out by sequentially computing the transmission information in the preceding cyclic periods up to a certain allowed number.

Thus, the reception authorization code is not transmitted with the service information. More specifically, in the case of the FM teletext multiplex broadcasting, the reception authorization code is not transmitted on the broadcasting waves, but notified to authorized users only via mail or through personal computer communications. Consequently, a transmission capacity of the service information is not reduced. In addition, a microcomputer or the like, which decodes and converts the service information received at the receiving means to the data like character data usable by the user, is used to decode the reception authorization code to the reception authorization information, and the station selection buttons or the like are used to input the reception authorization code. Thus, the cost increase of the receiver terminal can be curbed.

Further, the reception authorization information is encoded with the terminal unique information and transmission information. Therefore, if the terminal unique information is generated based on the information the user can learn, such as a production number, and the user finds out the terminal unique information and tries to use the same fraudulently, he can not obtain correctly decoded reception authorization information because the reception authorization information is encoded also with the transmission information. Thus, the user is not authorized to receive the service information. Consequently, only the service information under contract can be received from the provider for exactly the contracted period, thereby ensuring high security.

If the transmission information changes, the user can not obtain the correct reception authorization information even when the same terminal unique information is used. This sets a certain input valid period for the reception authorization code, and therefore, can prevent an inconvenience such that disables the user to receive the service information because he has erroneously set the reception authorization code whose reception authorization period has already expired. Moreover, the occurrence of such an inconvenience is notified to the user, so that he can input a correct reception authorization code again.

Further, the reception authorization code can be inputted in a period corresponding to a product of the cyclic period and a certain number. For example, if the transmission information changes monthly, and the user inputs the reception authorization code given in the last month, given the constant number=1, then the transmission information in the last month when the reception authorization code was issued can be computed using the transmission information actually received in the current month. Consequently, apart from the cyclic period at which the transmission information changes, an input valid period for the reception authorization code can be set arbitrarily. For example, if the reception authorization code is issued at the end of the month, a minimum period can be guaranteed as the input valid period for the reception authorization code.

A tenth system of transmitting/receiving service information is a system for enabling a certain receiver terminal to receive the service information transmitted on multiplex broadcasting waves from a provider, characterized in that:

the provider includes, an information generating source for the service information to be transmitted, transmitting means for transmitting the service information after appending service identification indicating that only a predetermined user is authorized to receive the service information, a user file for storing terminal unique information unique to the receiver terminal owned by each user and available service contents to each user, reception authorization code generating means for generating a unit reception authorization code by reading out the terminal unique information and service contents stored in the user file, generating reception authorization information corresponding to the service contents, and synthesizing the reception authorization information thus generated and appended with a predetermined error detection sign with the terminal unique information and transmission information within a certain period later which changes periodically, such a change being known at least to the provider, and for giving a reception authorization code, composed of the unit reception authorization codes for more than one period, to the user of each authorized receiver terminal; and each receiver terminal includes, receiving means for receiving the service information with the same service identification and notifying the receipt of the service information, input means for enabling the user to input the reception authorization code;

storage means for pre-storing the terminal unique information unique to each receiver terminal, and reception authorization code decoding means for decoding each unit reception authorization code, obtained by separating the input reception authorization code, to the reception authorization information using the terminal unique information stored in the storage means and the received transmission information, and carrying out the error detection, and for enabling the receiving means to receive the service information when any of the decoded reception authorization information shows the reception authorization and no error is detected.

According to the above arrangement, in a system for transmitting/receiving the service information suitably used as a transmitting/receiving system for the restricted broadcasting using the FM teletext multiplex broadcasting, at the provider's end, such as a broadcast station, the payment condition of the reception charge or contract contents of each user, for example, whether the user wishes to use all kinds or particular kinds of the service information, are stored in the user file, and the reception authorization code generating means generates the reception authorization information based on the expiration date of a reception authorization period or available service contents corresponding to the payment condition. Then, after appending an error detection sign to the reception authorization information thus generated, the reception authorization code generating means generates a unit reception authorization code by synthesizing the reception authorization information with terminal unique information unique to each receiver terminal, such as a production number, and the transmission information within a certain period later which changes periodically and such a notice is known at least to the provider, such as date (month and year) information. The unit reception authorization codes for the certain period are combined and made into a reception authorization code, which is notified to the user via mail or through personal computer communications.

At the receiver terminal's end, such as a listener, upon receipt of the reception authorization code, the user inputs the reception authorization code using input means, such as station selection buttons. In response to this input, the reception authorization code decoding means separates the reception authorization code into each unit reception authorization code. Then, the reception authorization code decoding means decodes the first unit reception authorization code to the reception authorization information using the terminal unique information pre-stored in the storage means and the received transmission information, and carries out the error detection using the error detection sign. The receiver terminal enables the receiving means to receive the service information with the service identification corresponding to the reception authorization information when the decoded reception authorization information shows the reception authorization and no error is detected.

If there is an error and correctly decoded reception authorization information can not be obtained, the reception authorization code decoding means subsequently decodes the second unit reception authorization code using the terminal unique information and the received transmission information. If there is still an error, the same processing is carried out sequentially for the rest of the unit reception authorization codes.

Thus, the reception authorization code is not transmitted with the service information. More specifically, in the case of the FM teletext multiplex broadcasting, the reception authorization code is not transmitted on the broadcasting waves, but notified to authorized users only via mail or through personal computer communications. Consequently, a transmission capacity of the service information is not reduced. In addition, a microcomputer or the like, which decodes and converts the service information received at the receiving means to the data like character data usable by the user, is used to decode the reception authorization code to the reception authorization information, and the station selection buttons or the like are used to input the reception authorization code. Thus, the cost increase of the receiver terminal can be curbed.

Further, the reception authorization information is encoded with the terminal unique information and transmission information. Therefore, if the terminal unique information is generated based on the information the user can learn, such as a production number, and the user finds out the terminal unique information and tries to use the same fraudulently, he can not obtain correctly decoded reception authorization information because the reception authorization information is encoded also with the transmission information. Thus, the user is not authorized to receive the service information. Consequently, only the service information under contract can be received from the provider for exactly the contracted period, thereby ensuring high security.

If the transmission information changes, the user can not obtain the correct reception authorization information even when the same terminal unique information is used. This sets a certain input valid period for the reception authorization code, and therefore, can prevent an inconvenience such that disables the user to receive the service information because he has erroneously set the reception authorization code whose reception authorization period has already expired. Moreover, the occurrence of such an inconvenience is notified to the user, so that he can input a correct reception authorization code again.

Further, the reception authorization code can be inputted in a period corresponding to a product of the cyclic period and the number of unit reception authorization codes. For example, assume that the transmission information changes monthly, and the user inputs the reception authorization code given in the last month. Then, the first unit reception authorization code corresponding to the transmission information of the last month when the reception authorization code was issued can not be decoded correctly, but the second unit reception authorization code corresponding to the transmission information of the current month can be decoded correctly. Consequently, apart from the cyclic period at which the transmission information changes, an input valid period for the reception authorization code can be set arbitrarily. For example, if the reception authorization code is issued at the end of the month, a minimum period can be guaranteed as the input valid period for the reception authorization code.

An eleventh system of transmitting/receiving service information is characterized in that a transmitting medium of the service information is a restricted broadcasting using a teletext multiplex broadcasting in a frequency modulation broadcasting.

According to the above arrangement, the technique of the present invention is quite advantageous in the teletext multiplex broadcasting in the frequency modulation broadcasting having a very small transmission capacity compared with the satellite broadcasting and the like, because the reception authorization code does not have to be transmitted.

A third receiving apparatus for the service information is an apparatus for receiving the service information transmitted from a provider characterized by comprising:

receiving means for receiving the service information with service identification indicating that only a predetermined user is authorized to receive the service information and notifying the receipt of the service information;

input means through which a reception authorization code given to each user is inputted;

storage means for storing pre-assigned terminal unique information; and reception authorization code decoding means for decoding the input reception authorization code to the reception authorization information using the terminal unique information stored in the storage means, received transmission information that changes periodically, and the transmission information which can be computed from the received transmission information or the transmission information used in each of the periodic cycles preceding up to a certain allowed number, and carrying out the detection error, and also for enabling the receiving means to receive the service information when any of the decoded reception authorization information shows reception authorization and no error is detected.

According to the above arrangement, in a receiving apparatus of the service information suitable used as a receiving apparatus for the restricted broadcasting using the FM teletext multiplex broadcasting, upon receipt of the reception authorization code given from the provider, such as a broadcast station, via mail or through personal computer communications, the user inputs the reception authorization code through the input means, such as the station selection buttons. In response to the input, the reception authorization code decoding means decodes the reception authorization code to the reception authorization information using the terminal unique information stored in the storage means and the received transmission information, and carries out the error detection using the error detection sign. The reception authorization code decoding means enables the receiving means to receive the service information with the service identification corresponding to the reception authorization information when the decoded reception authorization information shows the reception authorization and no error is detected.

If there is an error and correctly decoded reception authorization information can not be obtained, the reception authorization code decoding means computes the transmission information in the cyclic period preceding to the current cyclic period for the received transmission information, and decodes the reception authorization code to the reception authorization information using the preceding transmission information and terminal unique information. If there is still an error, the same processing is carried out by sequentially computing the transmission information of each of the cyclic periods preceding up to a certain allowed number.

A fourth receiving apparatus for the service information is an apparatus for receiving the service information transmitted from a provider characterized by comprising:

receiving means for receiving the service information with service identification indicating that only a predetermined user is authorized to receive the service information and notifying the receipt of the service information;

input means through which a reception authorization code given to each user is inputted;

storage means for storing pre-assigned terminal unique information; and reception authorization code decoding means for decoding each unit reception authorization code, obtained by separating the reception authorization code, to the input reception authorization information using the terminal unique information stored in the storage means and received transmission information, and carrying out the detection error, and also for enabling the receiving means to receive the service information when any of the decoded reception authorization information shows reception authorization and no error is detected.

According to the above arrangement, in a receiving apparatus of the service information suitable used as a receiving apparatus for the restricted broadcasting using the FM teletext multiplex broadcasting, upon receipt of the reception authorization code given from the provider, such as a broadcast station, via mail or through personal computer communications, the user inputs the reception authorization code through the input means, such as the station selection buttons. In response to the input, the reception authorization code decoding means separates the reception authorization code to each unit reception authorization code, and decodes the first unit reception authorization code to the reception authorization information using the terminal unique information stored in the storage means and the received transmission information, and carries out the error detection using the error detection sign. The reception authorization code decoding means enables the receiving means to receive the service information with the service identification corresponding to the reception authorization information when the decoded reception authorization information shows the reception authorization and no error is detected.

If there is an error and correctly decoded reception authorization information can not be obtained, the reception authorization code decoding means subsequently decodes the second unit reception authorization code using the terminal unique information and the received transmission information. If there is still an error, the same processing is carried out sequentially for the rest of the unit reception authorization codes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of transmitting/receiving of service information in which the service information from a transmitter is received only by a receiver terminal authorized by the transmitter, comprising the steps of:

generating a reception authorization code at a transmitter end by appending an error detection code to reception authorization information indicating reception authorization of said service information, and synthesizing said reception authorization information appended with the error detection code and terminal unique information unique to each receiver terminal to be authorized;

providing said reception authorization code to each receiver terminal from said transmitter;

inputting said reception authorization code at said each receiver terminal end;

obtaining said reception authorization information by decoding said input reception authorization code using said terminal unique information pre-stored in said each receiver terminal;

detecting whether or not an error exists in said reception authorization information; and enabling said each authorized receiver terminal to receive said service information when said reception authorization information indicates the reception authorization and no error is detected, wherein:

in said reception authorization code generating step, said reception authorization code is generated by synthesizing said reception authorization information appended with the error detection code, said terminal unique information, and transmission information which changes periodically; and said reception authorization code decoding step includes the sub-steps of, transmitting a current value of said transmission information from said transmitter, and receiving the current value of said transmission information at said each receiver terminal, so that said reception authorization code is decoded using said terminal unique information and the current value of said transmission information received.

2. The method of transmitting/receiving of service information of claim 1, wherein said reception authorization code generating step includes the sub-step of encoding at least one of said reception authorization information and said terminal unique information.

3. The method of transmitting/receiving of service information of claim 1, wherein said reception authorization code generating step includes the sub-step of encoding said reception authorization code.

4. The method of transmitting/receiving of service information of claim 1, wherein a transmitting medium of said service information is restricted broadcasting using a teletext multiplex broadcasting in a frequency modulation broadcasting.

5. The method of transmitting/receiving of service information of claim 1, wherein said transmission information indicates a current date including day, month and year.

6. The method of transmitting/receiving of service information of claim 1, wherein said transmission information includes a program index information which is updated periodically and is contained in said service information.

7. The method of transmitting/receiving of service information of claim 1, wherein:

in said reception authorization code decoding step, said reception authorization code is decoded using said terminal unique information, the current value of said transmission information received, and one of (1) value of the transmission information computed from the current value of the transmission information and (2) a value of the transmission information used in preceding periodic cycles, up to a predetermined number.

8. The method of transmitting/receiving of service information of claim 1, wherein:

said reception authorization code generating step includes the sub-steps of, generating a unit reception authorization code by synthesizing said reception authorization information appended with the error detection code, said terminal unique information, and a value of the transmission information of each kind within a certain period later, said transmission information changing periodically and such a change being known at least to said transmitter, and generating said reception authorization code by combining the unit reception codes for more than one period;

said reception authorization code decoding step includes the sub-step of decoding said reception authorization code using said terminal unique information and the current value of said transmission information received after separating said reception authorization code into said each unit reception authorization code.

9. The method of transmitting/receiving of service information of claim 1, wherein, in said reception authorization code providing step, said reception authorization code is provided to said each receiver terminal not by using a medium for transmitting/receiving said service information, but by transporting a reception authorization code recording medium to said each receiver terminal having the terminal unique information corresponding to said reception authorization code, said reception authorization code recording medium recording said reception authorization code in a manner recognizable by said each receiver terminal.

10. The method of transmitting/receiving of service information of claim 9, wherein, in said reception authorization code providing step, said reception authorization code recording medium is sent to said each receiver terminal via mail.

11. The method of transmitting/receiving of service information of claim 9, wherein, in said reception authorization code providing step, a paper medium is used as said reception authorization code recording medium.

12. The method of transmitting/receiving of service information of claim 9, wherein, in said reception authorization code providing step, a telephone line is used as said reception authorization code recording medium.

13. The method of transmitting/receiving of service information of claim 1, wherein, in said reception authorization code providing step, said reception authorization code is notified to said each receiver terminal having the terminal unique information corresponding to said reception authorization code, not by using a medium for transmitting/receiving said service information, but by notifying means selected from a group consisting of personal computer communications, a computer inter-network, a telephone, and a facsimile.

14. A method of transmitting/receiving of service information, in which the service information from a transmitter is received only by a receiver terminal authorized by the transmitter, comprising the steps of:

generating a reception authorization code at a transmitter end by appending an error detection code to reception authorization information indicating reception authorization of said service information, and synthesizing said reception authorization information appended with the error detection code and terminal unique information unique to each receiver terminal to be authorized;

providing said reception authorization code to each receiver terminal from said transmitter;

inputting said reception authorization code at said each receiver terminal end;

obtaining said reception authorization information by decoding said input reception authorization code using said terminal unique information pre-stored in said each receiver terminal;

detecting whether or not an error exists in said reception authorization information; and enabling said each authorized receiver terminal to receive said service information when said reception authorization information indicates the reception authorization and no error is detected, wherein:

said reception authorization code generating step includes the sub-steps of, incorporating an expiration date of a reception authorization period into said reception authorization information, and transmitting time information showing a current time including day and hour from said transmitter; and said service information receiving step includes the sub-steps of, receiving said time information at said each receiver terminal end, and comparing said current time shown by said time information with said expiration date of the reception authorization period, said each receiver terminal being enabled to receive said service information when said current time shown by said time information is before said expiration date of the reception authorization period, said each receiver terminal being disabled to receive said service information when said time shown by said current time information exceeds said expiration date of the reception authorization period.

15. A system of transmitting/receiving service information, in which the service information from a transmitter is received only by a receiver terminal authorized by the transmitter, said transmitter comprising:

an information generating source of the service information to be transmitted;

transmitting means for transmitting said service information after adding service identification data indicating that only a predetermined receiver terminal is authorized to receive said service information;

a user file for storing terminal unique information unique to said each authorized receiver terminal and service contents that said each authorized receiver terminal is authorized to receive; and reception authorization code generating means for generating and providing a reception authorization code to said each receiver terminal by reading out said terminal unique information and said service contents stored in said user file to generate reception authorization information corresponding to said service contents, and for synthesizing said reception authorization information appended with an error detection code and said terminal unique information, and said each receiver terminal comprising:

receiving means for receiving the service information whose service identification data matches service identification data of receivable service information;

input means for inputting said reception authorization code;

storage means for storing said terminal unique information unique to said each authorized receiver terminal; and reception authorization code decoding means for decoding said input reception authorization code using said terminal unique information stored in said storage means and for detecting whether or not an error exists in decoded reception authorization information, said reception authorization code decoding means also for authorizing reception of said service information by said receiving means when said decoded reception authorization information indicates reception authorization and no error is detected wherein:

said reception authorization code generating means generates said reception authorization code by synthesizing said reception authorization information appended with the error detection code, said terminal unique information stored in said user file, and transmission information which changes periodically;

said transmitting means transmits a current value of said transmission information from said transmitter;

said receiving means receives the current value of said transmission information; and said reception authorization code decoding means decodes said input reception authorization code using said terminal unique information stored in said storage means and the current value of said transmission information received.

16. The system of transmitting/receiving service information of claim 15, wherein:

said transmitter further comprises first encoding means for encoding at least one of said reception authorization information and said terminal unique information; and said each receiver terminal further comprises first decoding means for decoding said reception authorization information and/or terminal unique information encoded by said first encoding means.

17. The system of transmitting/receiving service information of claim 15 wherein:

said transmitter further comprises second encoding means for encoding said reception authorization code; and said each receiver terminal further comprises second decoding means for decoding said reception authorization code encoded by said second encoding means.

18. The system of transmitting/receiving service information of claim 15, wherein a transmitting medium of said service information is restricted broadcasting using a teletext multiplex broadcasting in a frequency modulation broadcasting.

19. The system of transmitting/receiving service information of claim 15, wherein said transmission information indicates a current date including day, month, and year.

20. The system of transmitting/receiving service information of claim 15, wherein said transmission information includes program index information which is updated periodically and is contained in said service information.

21. The system of transmitting/receiving service information of claim 15, wherein:

said reception authorization code generating means generates said reception authorization code by synthesizing said reception authorization information appended with the error detection code, said terminal unique information stored in said user file, and said transmission information which changes periodically, such a change being known to both said transmitter and said each authorized receiver terminal;

reception authorization code decoding means decodes said input reception authorization code using said terminal unique information stored in said storage means, the current value of said transmission information received, and one of (1) a value of the transmission information computed from the current value of said transmission information and (2) a value of the transmission information used in preceding periodic cycles, up to a predetermined number, and detects whether or not an error exists.

22. The system of transmitting/receiving service information of claim 15, wherein:

said reception authorization code generating means generates a unit reception authorization code by synthesizing said input reception authorization information appended with the error detection code, said terminal unique information stored in said user file, and a value of the transmission information of each kind within a certain period later, said transmission information changing periodically and such a change being known at least to said transmitter, and generates said reception authorization code by combining said unit reception authorization codes for more than one period;

said reception authorization code decoding means, after separating said reception authorization code into said each unit reception authorization code, decodes said input reception authorization code using said terminal unique information stored in said storage means and the current value of said transmission information received, detects whether or not an error exists.

23. The system of transmitting/receiving of service information of claim 15, wherein said reception authorization code generating means gives said reception authorization code to said each receiver terminal not by using a medium for transmitting/receiving said service information, but by transporting a reception authorization code recording medium to said each receiver terminal having the terminal unique information corresponding to said reception authorization code, said reception authorization code recording medium recording said reception authorization code in a manner recognizable by said each receiver terminal.

24. The system of transmitting/receiving of service information of claim 23, wherein said reception authorization code generating means sends said reception authorization code recording medium to said each receiver terminal via mail.

25. The system of transmitting/receiving of service information of claim 23, wherein said reception authorization code generating means uses a paper medium as said reception authorization code recording medium.

26. The system of transmitting/receiving of service information of claim 23, wherein said reception authorization code generating means uses a telephone line as said reception authorization code recording medium.

27. The system of transmitting/receiving of service information of claim 15, wherein said reception authorization code generating means notifies said reception authorization code to said each receiver terminal having the terminal unique information corresponding to said reception authorization code not be using a medium for transmitting/receiving said service information, but by notifying means selected from a group consisting of personal computer communications, a computer inter-network, a telephone, and a facsimile.

28. A system of transmitting/receiving of service information in which the service information from a transmitter is received only by a receiver terminal authorized by the transmitter, said transmitter comprising:
an information generating source of the service information to be transmitted;
transmitting means for transmitting said service information after adding service identification data indicating that only a predetermined receiver terminal is authorized to receive said service information;
a user file for storing terminal unique information unique to said each authorized receiver terminal and service contents that said each authorized receiver terminal is authorized to receive; and
reception authorization code generating means for generating and providing a reception authorization code to said each receiver terminal by reading out said terminal unique information and said service contents stored in said user file to generate reception authorization information corresponding to said service contents, and for synthesizing said reception authorization information appended with an error detection code and said terminal unique information, and said each receiver terminal comprising:
receiving means for receiving the service information whose service identification data matches service identification data of receivable service information;
input means for inputting said reception authorization code;
storage means for storing said terminal unique information unique to said each authorized receiver terminal; and
reception authorization code decoding means for decoding said input reception authorization code using said terminal unique information stored in said storage means and for detecting whether or not an error exists in decoded reception authorization information said reception authorization code decoding means also for authorizing reception of said service information by said receiving means when said decoded reception authorization information indicates reception authorization and no error is detected wherein:

said transmitting means sends time information showing a current time including day and hour;
said reception authorization code generating means incorporates an expiration date of a reception authorization period into said reception authorization information;
said receiving means receives said time information;
said reception authorization code generating means compares said current time shown by said time information with said expiration date of the reception authorization period, and authorizes reception of said service information when said current time shown by said time information is before said expiration date of the reception authorization period, and inhibits the reception of said service information when said current time shown by said time information exceeds said expiration date of the reception authorization period.

29. A receiving apparatus for receiving service information having service identification data indicating that reception of said service information is authorized to only a certain receiver terminal in advance, comprising:
receiving means for receiving the service information whose service identification data matches service identification data of receivable service information;

input means for inputting a reception authorization code, said reception authorization code being provided to each receiver terminal to be authorized, said reception authorization code being generated by synthesizing reception authorization information indicating reception authorization of said service information and appended with an error detection code, and terminal unique information unique to said each receiver terminal:

storage means for storing said terminal unique information unique to said each receiver terminal; and reception authorization code decoding means for decoding said input reception authorization code using said terminal unique information stored in said storage means and for detecting whether or not an error exists in decoded reception authorization information, said reception authorization code decoding means also for authorizing reception of said service information by said receiving means when said decoded reception authorization information indicates reception authorization and no error is detected, wherein:

said receiving means receives a current value of transmission information which is transmitted from said transmitter and changes periodically; and said reception authorization code decoding means decodes said input reception authorization code using said terminal unique information stored in said storage means and the current value of said transmission information.

30. The receiving apparatus of claim 29, wherein said transmission information indicates a current date including day, month, and year.

31. The receiving apparatus of claim 29, wherein said transmission information includes program index information which is updated periodically and is contained in said service information.

32. The receiving apparatus of claim 29, wherein:

said receiving means receives the current value of said transmission information which is transmitted from said transmitter and changes periodically; and said reception authorization code decoding means decodes said input reception authorization code using said terminal unique information stored in said storage means, the current value of said transmission information, and one of (1) a value of the transmission information computed from the current value of said transmission information and (2) a value of the transmission information used in preceding periodic cycles, up to a predetermined number, and detects whether or not an error exists.

33. The receiving apparatus of claim 29, wherein:

said receiving means receives the current value of said transmission information which is transmitted from said transmitter and changes periodically;

said reception authorization code decoding means decodes said input reception authorization code using said terminal unique information stored in said storage means and the current value of said transmission information after separating said reception authorization code into each unit reception authorization code and detects whether or not an error exists.

34. A receiving apparatus for receiving service information having service identification data indicating that reception of said service information is authorized to only a certain receiver terminal in advance, comprising:

receiving means for receiving the service information whose service identification data matches service identification data of receivable service information;

input means for inputting a reception authorization code, said reception authorization code being provided to each receiver terminal to be authorized said reception authorization code being generated by synthesizing reception authorization information indicating reception authorization of said service information and appended with an error detection code, and terminal unique information unique to said each receiver terminal;

storage means for storing said terminal unique information unique to said each receiver terminal; and reception authorization code decoding means for decoding said input reception authorization code using said terminal unique information stored in said storage means and for detecting whether or not an error exists in decoded reception authorization information, said reception authorization code decoding means also for authorizing reception of said service information by said receiving means when said decoded reception authorization information indicates reception authorization and no error is detected, wherein:

said receiving means receives time information which is transmitted from said transmitter and shows a current time including day and hour; and said reception authorization code decoding means compares said current time shown by said time information with an expiration date of a reception authorization period incorporated into said reception authorization information, and authorizes reception of said service information when said current time shown by said time information is before said expiration date of the reception authorization period, and inhibits the reception of said service information when said current time shown by said time information exceeds said expiration date of the reception authorization period.

\* \* \* \* \*